US011863363B2

(12) United States Patent
Bertrand et al.

(10) Patent No.: US 11,863,363 B2
(45) Date of Patent: *Jan. 2, 2024

(54) SOUNDING REFERENCE SIGNAL PROCESSING FOR LTE

(71) Applicant: Texas Instruments Incorporated, Dallas, TX (US)

(72) Inventors: Pierre Bertrand, Antibes (FR); Anthony Edet Ekpenyong, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,221

(22) Filed: Mar. 14, 2022

(65) Prior Publication Data
US 2022/0200833 A1 Jun. 23, 2022

Related U.S. Application Data

(63) Continuation of application No. 16/792,812, filed on Feb. 17, 2020, now Pat. No. 11,277,290, which is a
(Continued)

(51) Int. Cl.
H04L 27/26 (2006.01)
H04J 13/00 (2011.01)
(Continued)

(52) U.S. Cl.
CPC ...... *H04L 27/2613* (2013.01); *H04J 13/0003* (2013.01); *H04J 13/0062* (2013.01);
(Continued)

(58) Field of Classification Search
CPC . H04L 27/26; H04L 25/02; H04L 5/00; H04L 25/0228; H04L 25/022;
(Continued)

(56) References Cited

U.S. PATENT DOCUMENTS 7,778,151 B2 * 8/2010 Bertrand ............. H04J 13/0062
370/328
8,000,273 B2 * 8/2011 He ........................ H04L 5/0048
370/480

(Continued)

OTHER PUBLICATIONS

Prosecution History, U.S. Appl. No. 13/280,959, filed Oct. 25, 2011, 339 pages.
(Continued)

Primary Examiner — Man U Phan
(74) Attorney, Agent, or Firm — Gregory J. Albin; Frank D. Cimino

(57) ABSTRACT

A wireless communication receiver including a serial to parallel converter receiving an radio frequency signal, a fast Fourier transform device connected to said serial to parallel converter converting $N_{FFT}$ corresponding serial signals into a frequency domain; an EZC root sequence unit generating a set of root sequence signals; an element-by-element multiply unit forming a set of products including a product of each of said frequency domain signals from said fast Fourier transform device and a corresponding root sequence signal, an $N_{SRS}$-length IDFT unit performing a group cyclic-shift de-multiplexing of the products and a discrete Fourier transform unit converting connected cyclic shift de-multiplexing signals back to frequency-domain.

12 Claims, 48 Drawing Sheets

Related U.S. Application Data continuation of application No. 15/489,255, filed on Apr. 17, 2017, now Pat. No. 10,567,204, which is a continuation of application No. 14/679,941, filed on Apr. 6, 2015, now Pat. No. 9,628,311, which is a continuation of application No. 13/280,959, filed on Oct. 25, 2011, now Pat. No. 9,001,641.

(60) Provisional application No. 61/437,744, filed on Jan. 31, 2011, provisional application No. 61/406,233, filed on Oct. 25, 2010.

(51) Int. Cl.
*H04L 25/02* (2006.01)
*H04L 5/00* (2006.01)

(52) U.S. Cl.
CPC .......... *H04L 5/0048* (2013.01); *H04L 25/022* (2013.01); *H04L 25/0226* (2013.01); *H04L 25/0228* (2013.01)

(58) Field of Classification Search
CPC ............. H04L 27/2613; H04L 25/0226; H04L 5/0048; H04J 13/00; H04J 13/0003; H04J 13/0062
USPC ........................................................ 370/329
See application file for complete search history.

(56) References Cited

U.S. PATENT DOCUMENTS

| | | | | |
|---|---|---|---|---|
| 8,599,819 B2* | 12/2013 | Kim | ...................... | H04L 5/0048 370/344 |
| 8,780,843 B2* | 7/2014 | Kim | ...................... | H04L 5/0048 370/328 |
| 8,831,042 B2* | 9/2014 | Kim | ...................... | H04W 72/21 370/344 |
| 8,867,499 B2* | 10/2014 | Kim | .................. | H04W 72/1263 370/336 |
| 8,902,876 B2* | 12/2014 | Kim | ...................... | H04L 5/0055 370/344 |
| 9,001,641 B2* | 4/2015 | Bertrand | ............. | H04L 25/0226 370/314 |
| 9,014,082 B2* | 4/2015 | Kim | ...................... | H04L 5/0044 370/315 |
| 9,300,455 B2* | 3/2016 | Kim | ...................... | H04L 5/0048 |
| 9,628,311 B2* | 4/2017 | Bertrand | ............. | H04J 13/0062 |

OTHER PUBLICATIONS

Prosecution History, U.S. Appl. No. 14/679,941, filed Apr. 6, 2015, 222 pages.

Prosecution History, U.S. Appl. No. 15/489,255, filed Apr. 17, 2017, 416 pages.

Prosecution History, U.S. Appl. No. 16/792,812, filed Feb. 17, 2020, 368 pages.

* cited by examiner

SOUNDING REFERENCE SIGNAL PROCESSING FOR LTE

CLAIM OF PRIORITY

This application is a continuation application of U.S. application Ser. No. 16/792,812 filed Feb. 17, 2020 (now U.S. Pat. No. 11,227,290), which is a continuation of U.S. application Ser. No. 15/489,255 filed Apr. 17, 2017 (now U.S. Pat. No. 10,567,204), which is a continuation of U.S. patent application Ser. No. 14/679,941 filed Apr. 6, 2015 (now U.S. Pat. No. 9,628,311), which is a continuation of U.S. patent application Ser. No. 13/280,959 filed Oct. 25, 2011 (now U.S. Pat. No. 9,001,641), which claims the benefit of U.S. Provisional Application No. 61/406,233 filed Oct. 25, 2010 and U.S. Provisional Application No. 61/437,744 filed Jan. 31, 2011.

TECHNICAL FIELD OF THE INVENTION

The technical field of this invention is wireless communication.

BACKGROUND OF THE INVENTION

Evolved Universal Terrestrial Radio Access Network (E-UTRAN) Long Term Evolution (LTE) wireless networks were standardized by the 3GPP working groups (WG). Orthogonal Frequency Division Multiple Access (OFDMA) and single carrier Frequency Division Multiple Access (SC-FDMA) access schemes were chosen for the down-link (DL) and up-link (UL) of E-UTRAN, respectively. User Equipments (UE's) are time and frequency multiplexed on a physical uplink shared channel (PUSCH) and a physical uplink control channel (PUCCH), and time and frequency synchronization between UE's guarantees optimal intra-cell orthogonality. An important UL reference signal, the Sounding Reference Signal (SRS) is defined in support of frequency dependent scheduling, link adaptation, power control and UL synchronization maintenance, which are functions handled above the Physical Layer, mainly at layer 2. Indeed, the main purpose of this signal is to allow the Base Station, also referred to as eNodeB, estimating a UE's radio channel information on time and frequency resources possibly different from those where it is scheduled. SRS processing occurs at the Physical Layer though and delivers to upper layers mainly three metrics estimated from the SRS:
  Channel estimates and gains across the system bandwidth;
  Noise variance; and
  Timing offset.
SRS processing may compute and deliver from the first two items a signal to interference plus noise ratio (SINR) measurement.

Both UL MU-MIMO/SIMO and DL eigen-beamforming based schedulers rely on the SRS to get the UE's channel estimates and derive the relevant scheduling metric. In particular, for the broadly deployed baseline SIMO UL scheduler, the scheduler makes use of the UE's signal to interference plus noise ratio (SINR) information to compute the scheduling metric and perform link adaptation. The UE's SINR can be directly derived from the first two above metrics or can use additional interference estimates from other reference signals such as the Demodulation Reference Signal (DMRS). The MAC sub-layer uses and potentially accumulates over time the timing offset estimates to issue a Timing Advance (TA) command to the UE, as a MAC control element. Sounding reference signal is also referred to as sounding reference symbol. Within this patent application the term channel quality indicator (CQI) is interchangeable with channel state indicator (CSI), channel state and channel value.

SUMMARY OF THE INVENTION

This invention is an algorithm to estimate the above metrics, assess their performance and analyze the different ways to estimate UE's SNR based on these metrics. This invention describes details in the design choices for the LTE SRS channel, channel gain, noise variance and timing offset estimators, from theoretical derivations and performance evaluations. In particular, this invention shows that the proposed time-domain based channel estimation with group-UE cyclic shift de-multiplexing is a low-complexity approach that allows sharing the same upfront computation for users' channels and timing offset estimations, as well as noise variance estimation. Unbiased channel gain estimation requires estimating and removing the noise variance by means of one reserved cyclic shift per SRS comb. Performance results obtained from realistic multi-user link-level simulations over a wide SNR range are presented and can be used for further reference in system simulations, such as UL scheduling, to model the channel estimation error from SRS. This invention includes:
1. A time-domain based SRS receiver at the eNB with group-UE cyclic shift de-multiplexing formulated as per Equations (2) and (3) producing for each SRS comb the concatenated CIRs sequence y of all UEs multiplexed on the same root sequence and which structure is defined in FIG. 4;
2. A per-antenna per-sub-carrier frequency-domain channel estimation algorithm formulated as per Equations (4) and (5) involving zeroing-out y samples outside the cyclic shift window of user u and last stage $N_{SRS}$-length DFT-based frequency interpolation;
3. User cyclic shift window design coping with spill-over effects user u as well as adjacent users and timing uncertainties, as shown in FIG. 5 and FIG. 37;
4. Collecting the channel estimates over the SRS bandwidth shrunk by an amount typically set to 10% to minimize the interpolation errors;
5. A non-biased per-antenna per-sub-carrier channel gain estimator formulated as per Equation (14) involving estimating and removing the noise variance;
6. A noise removal technique with negative gain avoidance by applying a simple clipping threshold of 0.01, as shown in Equation (16);
7. A per-antenna time domain noise variance estimator formulated as per Equation (18) involving reserving a cyclic shift per SRS comb, and averaging the squared noise samples across a noise window selected from y;
8. A noise window design maximizing the number of noise samples while not including samples carrying adjacent users' energy such as e.g. in spill-over regions, as shown in FIG. 10;
9. A noise reduction technique consisting in UE-geometry-based selective cyclic shift window reduction as shown in Table 3;
10. A per-chunk SNR estimator from the achieved per-antenna per-subcarrier channel gain estimates based on selectively using low-complexity arithmetic averaging (33) or harmonic averaging (32) depending on both the channel type and the UE's SNR;
11. A timing offset estimator combining the amplitude delay profiles across antennas from the concatenated delay profiles sequence y and searching for the highest peak in the user's timing offset window, as shown in Equation (35);

12. A timing offset window design taking the main energy region within the delay spread window, enlarged on both sides by the maximum expected timing offset, as shown in Equation (36);

13. The above are not restricted to LTE, but can be applied to any wireless network.

BRIEF DESCRIPTION OF THE DRAWINGS

These and other aspects of this invention are illustrated in the drawings, in which:

FIG. 19A is the TU channel, FIG. 19B is the PA channel;

FIG. 20A is the TU channel, FIG. 20B is the PA channel.

FIG. 21A is the TU channel, FIG. 21B is the PA channel;

FIG. 33A is the TU channel, FIG. 33B is the PA channel;

FIG. 34B is the PA channel;

FIG. 40A is the mean chunk SNR error, FIG. 40B is the standard deviation of the chunk SNR error;

FIG. 41A is the mean chunk SNR error and FIG. 41B is the standard deviation of the mean chunk SNR error;

FIG. 44A shows the timing offset mean and FIG. 44B shows the timing offset standard deviation;

DETAILED DESCRIPTION OF PREFERRED EMBODIMENTS

Figure 1:
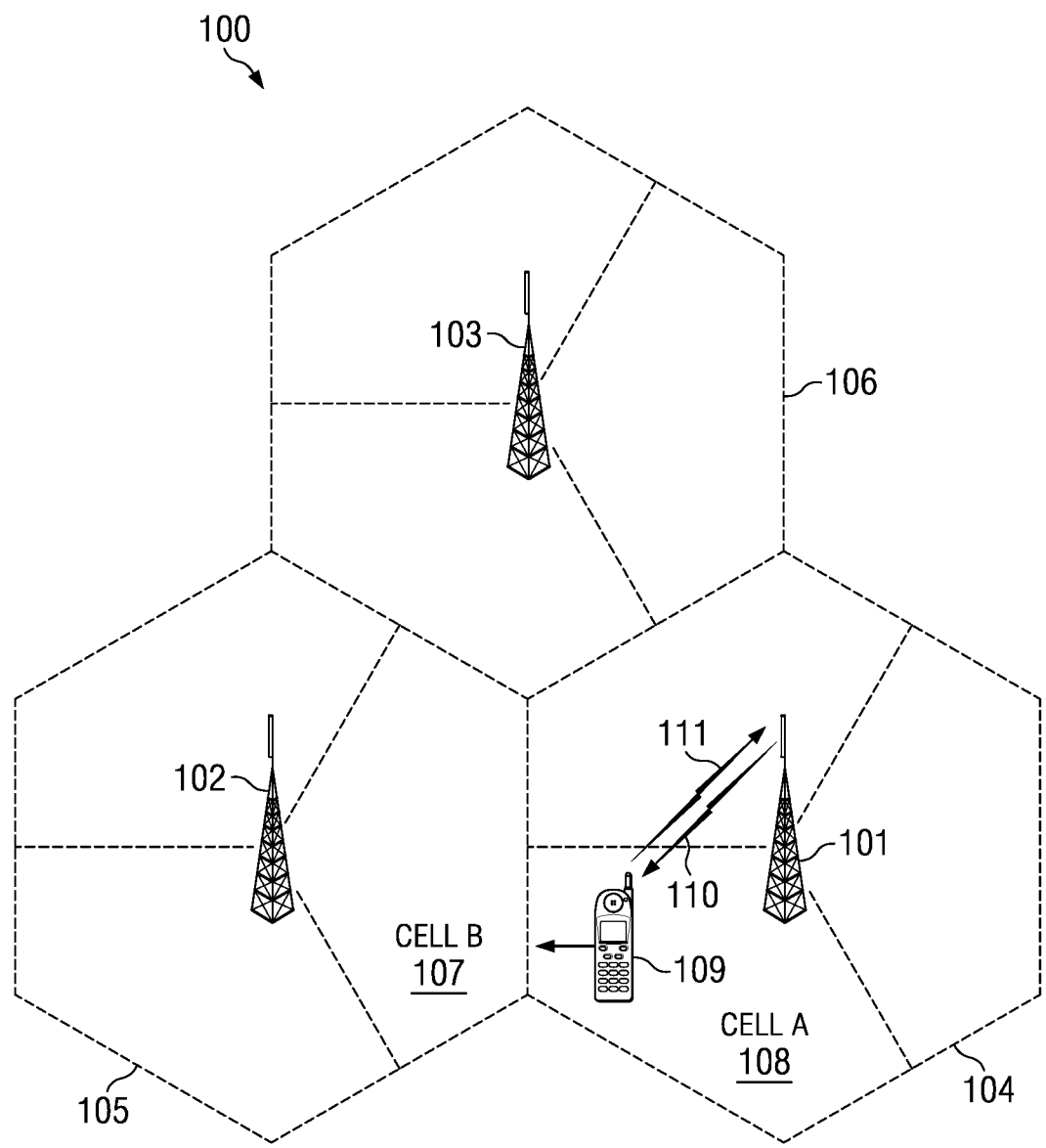
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel state information (CSI) from the SRS transmission.

Figure 2:
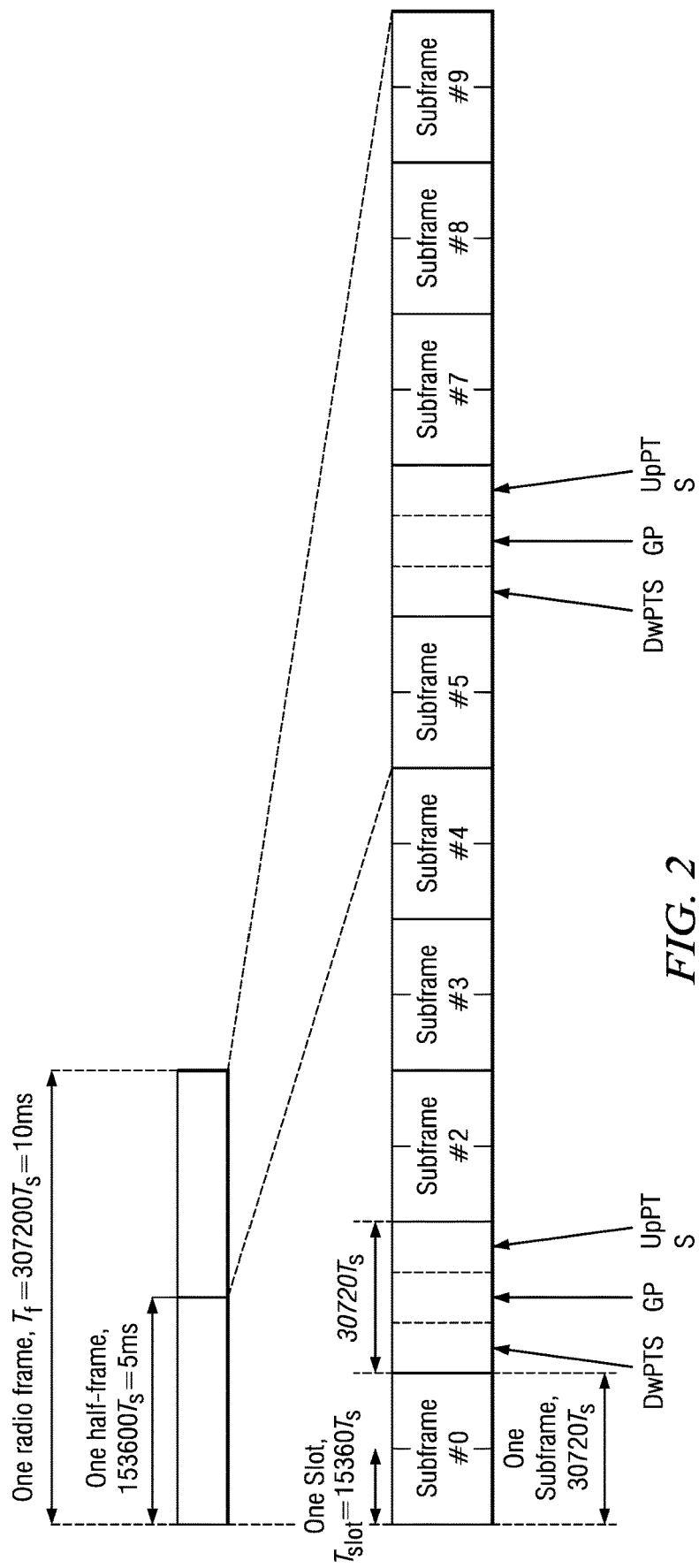
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Config-uration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Table 1

Sounding Reference Signal Bandwidths Configurations

In LTE, a UE can be Radio Resource Control (RRC) assigned either of the four possible sounding bandwidths for a given cell-specific SRS bandwidth configuration $C_{SRS}$ and system bandwidth. For each group of system bandwidths, there are eight SRS bandwidth configurations $C_{SRS}$ corresponding to different system bandwidths and/or ratios of PUCCH/PUSCH region sizes. The larger $C_{SRS}$ the smaller the total SRS bandwidth. For each SRS bandwidth configuration the four possible sounding bandwidths are denoted $m_{SRS,0}$, $m_{SRS,1}$, $m_{SRS,2}$, $m_{SRS,3}$ ordered by decreasing size and are expressed in physical resource blocks (PRB) of size $N_{sc}^{RB}=12$ sub-carriers. The quantity $m_{SRS,0}$ defines the largest possible SRS bandwidth. The quantity $m_{SRS,0}$ along with the sub-carrier offset $k'_0$ defines the bandwidth region. No combination of smaller bandwidths exceeds this region. The quantities $m_{SRS,0}$, $m_{SRS,1}$ and $m_{SRS,2}$ are defined to allow some kind of dichotomy providing a way to split the total sounding bandwidth into 2, 3, 4 or 6 scheduling bandwidths (FIG. 3). This allows splitting the total number of UEs in the scheduler pool into equally spaced bandwidths and running as many parallel schedulers concurrently. The quantity $m_{SRS,3}$ is always 4 PRBs and is mainly for power limited UEs.

Figure 3B:
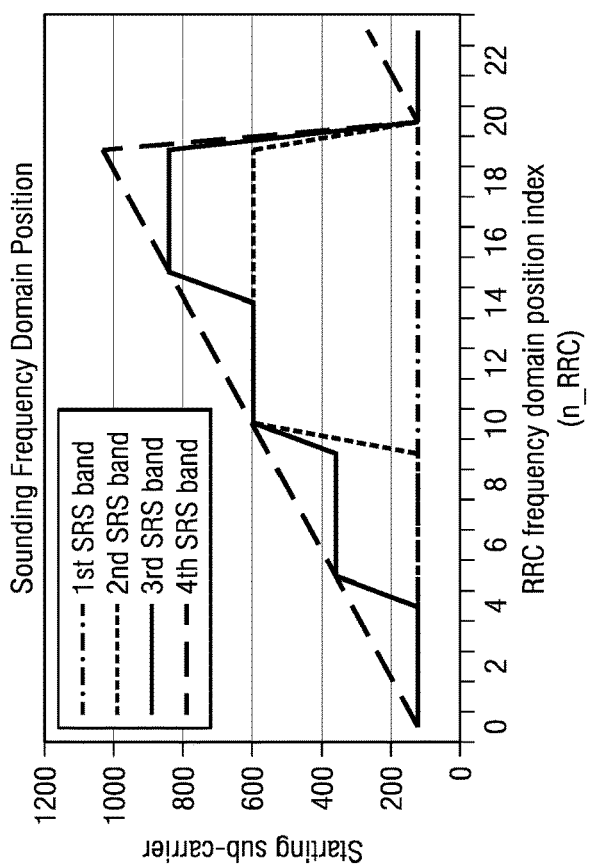
FIGS. 3A and 3B illustrate SRS frequency configurations in 20 MHz system bandwidth for $C_{SRS}=1$ and $C_{SRS}=2$.
Figure 3A:
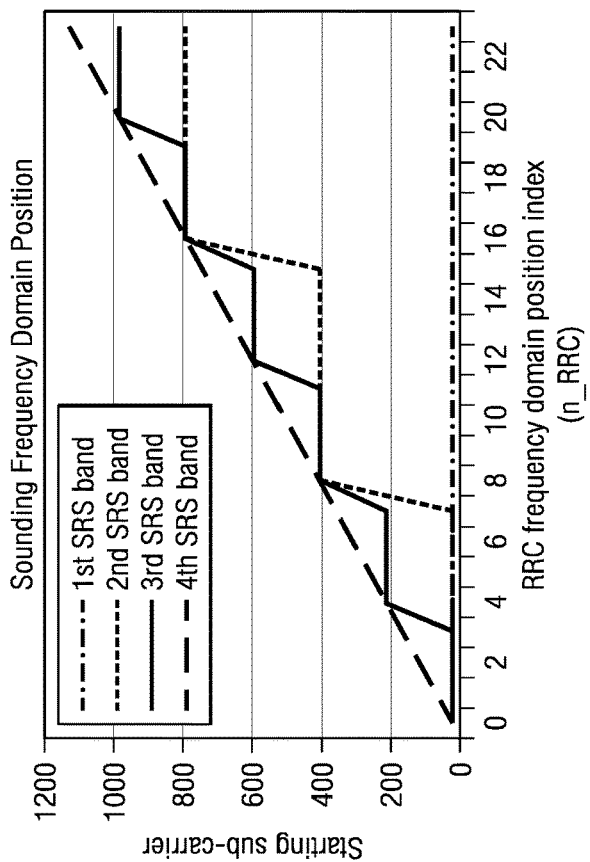

FIGS. 3A and 3B together illustrate two plots of RRC frequency domain position index (n_RRC) versus starting subcarrier. FIGS. 3A and 3B illustrate SRS frequency configurations in 20 MHz system bandwidth with $C_{SRS}=1$ (FIG. 3A) and $C_{SRS}=2$ (FIG. 3B). Each plot has curves for 1 SRS band, 2 SRS bands, 3 SRS bands and 4 SRS bands.

For scenarios reflecting peak data rates situations, it is safe to assume no power limitation at the UE from the sounding perspective and stick to the combinations of $m_{SRS,0}$, $m_{SRS,1}$ and $m_{SRS,2}$. For a 20 MHz spectrum and PUCCH occupying 8 PRBs, an appropriate combination of $m_{SRS,0}$, $m_{SRS,1}$ and $m_{SRS,2}$ is 80/40/20 PRBs ($C_{SRS}=2$). This allows multiplexing the largest number of SRSs per sub-frame by splitting the total bandwidth into four 20-PRB scheduling bandwidths each of large-enough size (3.6 MHz) to provide sufficient frequency selective gains. For tougher propagation conditions, such as LTE Case 1, configurations allowing smaller SRS bandwidths for $m_{SRS,0}$, $m_{SRS,1}$ and $m_{SRS,2}$ might be preferred to provide more flexibility in allocating UEs with different levels of power limitations. For example, $C_{SRS}=7$ specifies 48/16/8/4 PRBs for respective SRS bandwidths $m_{SRS,0}$, $m_{SRS,1}$, and $m_{SRS,3}$.

SRS Design for LTE

Figure 4:
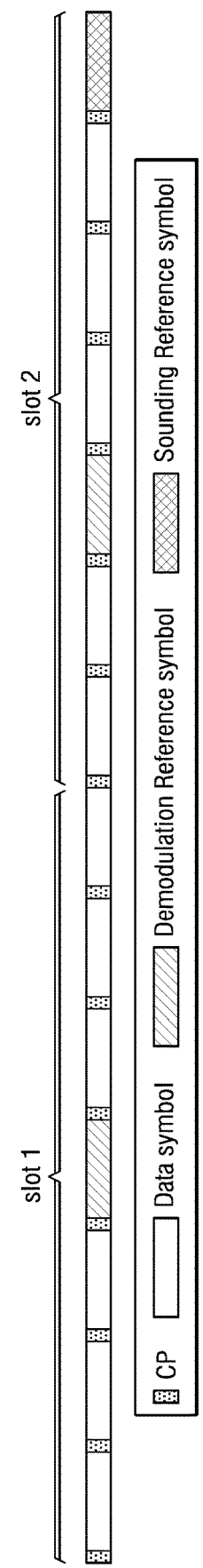
FIG. 4 is an LTE sub-frame structure.

An LTE sub-frame structure is depicted in FIG. 4. Each sub-frame 410 includes two 0.5 ms slots. 401 and 402. Each slot 401 and 402 is made of six Discrete Fourier Transform (DFT) Spread Orthogonal Frequency Division Multiplexing (SOFDM) data symbols and one central demodulation reference symbol (DMRS). When the sub-frame 410 is configured for SRS transmission, the last symbol number 14 is reserved for SRS transmission.

Figure 5:
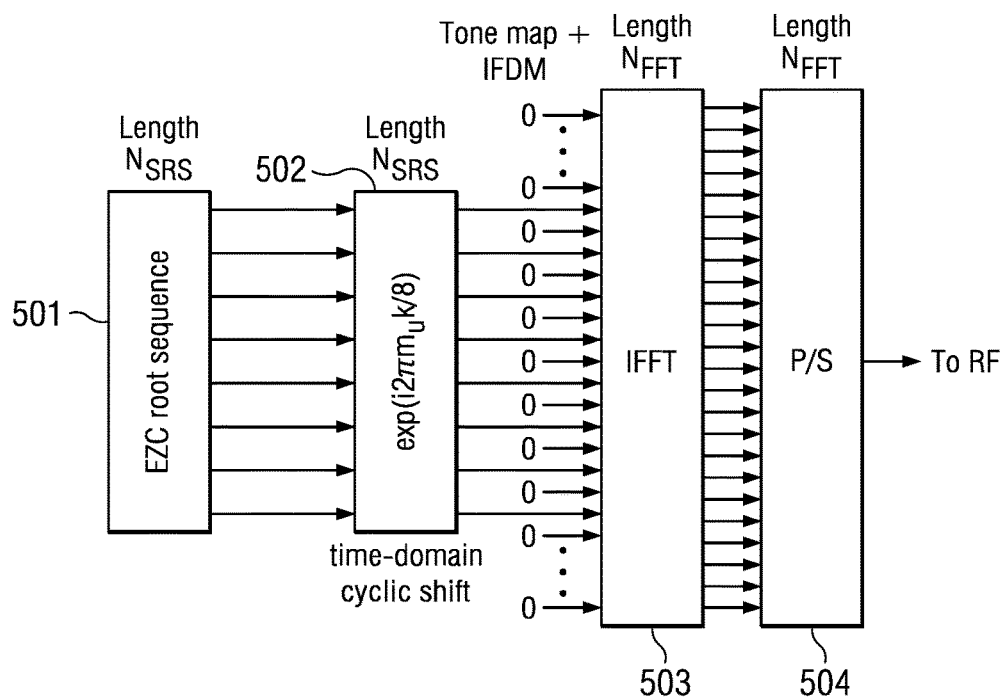
FIG. 5 illustrates the transmitter of this invention.

Multiple UEs can be multiplexed in the same SRS symbol. The multiplexing scheme is a combination of FDM and Code Division Multiplexing (CDM). FIG. 5 illustrates this transmission technique. The sounding signal is built from a pilot root sequence of length NSRS from EZC root sequence unit 501. EZC root sequence unit 501 generates an extended Zadoff-Chu (EZC) sequence constructed by extending the closest prime-length Zadoff-Chu (ZC) sequence to the SRS sequence length $N_{SRS}$ providing the configured SRS bandwidth. Such sequence has Constant Amplitude Zero Autocorrelation (CAZAC) properties. This property guarantees discrete periodic autocorrelations are zero for all non-zero lags, allowing orthogonal code multiplexing by duplicating and cyclic shifting the same root sequence. The constant amplitude property allows controlling the Peak-to-Average Power Ratio (PAPR) and generates bounded and time-flat interference to other users. In a given sub-frame, all UEs in the same cell and with the same SRS bandwidth share the same root EZC sequence $X=(X_0, X_1, \ldots, X_{N_{SRS}-1})^T$, defined in frequency domain. Then, the sequence is modified per Equation (1) in time-domain cyclic shift unit 502 so as to produce a cyclic shift $C_u=N_{SRS}m(u)/8$ in time-domain, configured for user u, and where 8 is the CDM multiplexing capacity:

$$X_{u,k} = X_k e^{j2\pi km(u)/8}; m(u) \in \{0 \ldots 7\} \quad (1)$$

The resulting sequence is further mapped to the $N_{SRS}$ sub-carriers allocated to SRS out of $N_{FFT}$ in inverse Fast Fourier Transform (IFFT) unit 503. Here $N_{FFT}$ is the total amount of sub-carriers of the system bandwidth. $N_{FFT}=2048$ for a 20 MHz LTE system bandwidth. The tone mapping also reflects the Single Carrier Interleaved Frequency Division Multiple Access (SC-IFDMA) transmission scheme of the SRS. Within its allocated bandwidth, a UE's SRS sequence is mapped on every other tone, leaving in-between tones to zero. This produces the two combs per SRS bandwidth illustrated in FIG. 7. This is one aspect of the FDM multiplex, the other aspect being that different UEs can send their SRS on different bandwidths. As a result, the total SRS multiplexing capacity for a given SRS bandwidth is 8 (CDM) times 2 (FDM)=16. With the IFDM multiplexing scheme, the sequence duration equals half the OFDM symbol duration T. Hence, in LTE where T=66.67 μs, the minimum cyclic shift increment between two CDM'ed users is T/2/8=4.17 μs. Parallel to serial converter 504 generates that radio frequency (RF) coupled to the antenna (not shown).

SRS Receive Structure

Figure 6:
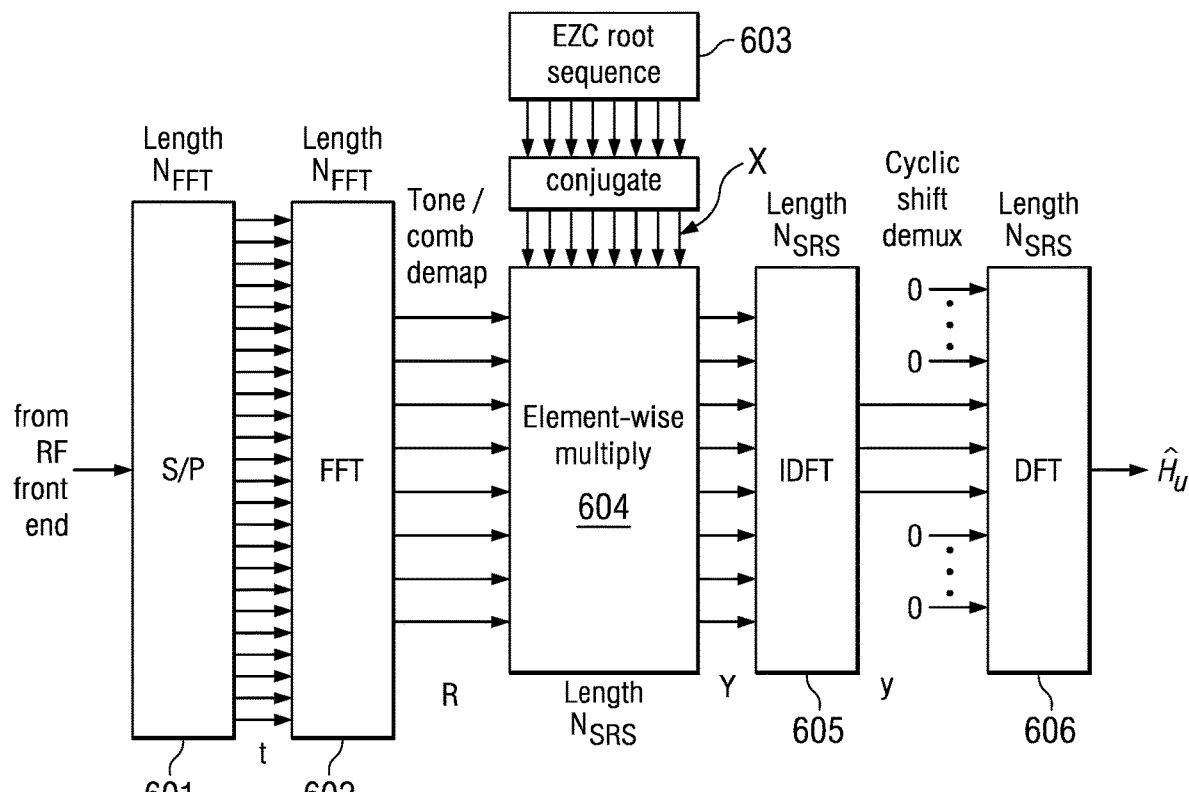
FIG. 6 illustrates a SRS receiver of this invention.

FIG. 6 illustrates a SRS receiver. Serial to parallel converter 601 converts the received RF into serial data streams. Each received time sample sequence r is converted in frequency domain through an $N_{FFT}$-length FFT (FFT 602). EZC root sequence unit 603 generates a root sequence corresponding to the root sequence of EZC root sequence unit 501. Element-wise multiply unit 604 multiplies corresponding elements of the RF input with the root sequence. This de-maps SRS-relevant sub-carriers to produce a frequency-domain sequence Y carrying all CDM users. Y is then converted back to time domain sequence y through $N_{SRS}$-length IDFT 605. This performs cyclic-shift de-multiplexing for each of the 8 CDM'ed users. In particular, this proposed system takes profit of the SRS OFDM symbol structure and CAZAC sequence to compute each multiplexed UE's channel impulse response (CIR) through a frequency-domain computed periodic correlation (matched filter). Frequency-domain channel estimates are then obtained by extracting each user's relevant samples from the total CIR samples and converting them back to frequency-domain through $N_{SRS}$-length DFT 606. This method is referred to as time-domain based channel estimation.

The SRS receiver of this invention (FIG. 6) follows the same principle as the prior art with an additional complexity reduction achieved from group-UE cyclic shift de-multiplexing. Rather than correlating y with each UE's sequence, the received frequency-domain sequence Y is element-wise multiplied with the complex conjugate of the expected root sequence X (element-wise multiply unit 604) before the IDFT, as illustrated in FIG. 6. This provides in one shot the concatenated CIRs of all UEs multiplexed on the same root sequence. Cyclic-shift de-multiplexing reduces to selecting the relevant samples for each UE. This method can be expressed as:

$$Y = F_{N_{SRS}N_{FFT}} r \quad (2)$$

$$y = F_{N_{SRS}}^{-1} \text{diag}(X * Y^T) \quad (3)$$

$$y_u(0, \ldots, 0, y_{n_1}, y_{n_2}, \ldots, y_{n_L(u)}, 0, \ldots, 0)^T \quad (4)$$

$$\hat{H}_u = F_{N_{SRS}} y_u \quad (5)$$

where: $N_{SRS}$ by $N_{FFT}$ matrix $F_{N_{SRS}N_{FFT}}$ corresponds to $N_{FFT}$-point FFT and $N_{SRS}$ sub-carriers de-mapping; $N_{SRS}$ by $N_{SRS}$ matrixes $F_{N_{SRS}}$ and $F_{N_{SRS}}^{-1}$ correspond to $N_{SRS}$-point DFT and IDFT respectively; $n_1(u), \ldots, n_L(u)$ are the samples defining the cyclic shift window of user u; and L is the number of time samples corresponding to the maximum expected delay spread among users derived from the delay spread $\tau$, the pad $\delta$ taken to account for the delay spread spill-over in the window, the symbol duration T and the number of SRS sub-carriers per comb $N_{SRS}$ as:

$$L = \lceil 2(\tau + \delta)N_{SRS}/T \rceil \tag{6}$$

Table 2 shows the resulting values of L for different channels and SRS bandwidths examples assuming a spill-over pad $\delta=0.55$ μS (measured empirically). Table 2 shows the number of cyclic shift window samples for various configurations.

TABLE 2

| | SRS BANDWIDTH (PRBS) | | | | | |
|---|---|---|---|---|---|---|
| | 20 | | 8 | | 4 | |
| | Delay spread $\tau$ (μS) | | | | | |
| | 5 (TU) | 0.9 (PA) | 5 (TU) | 0.9 (PA) | 5 (TU) | 0.9 (PA) |
| L (samples) | 20 | 6 | 8 | 3 | 4 | 2 |

Figure 7A:
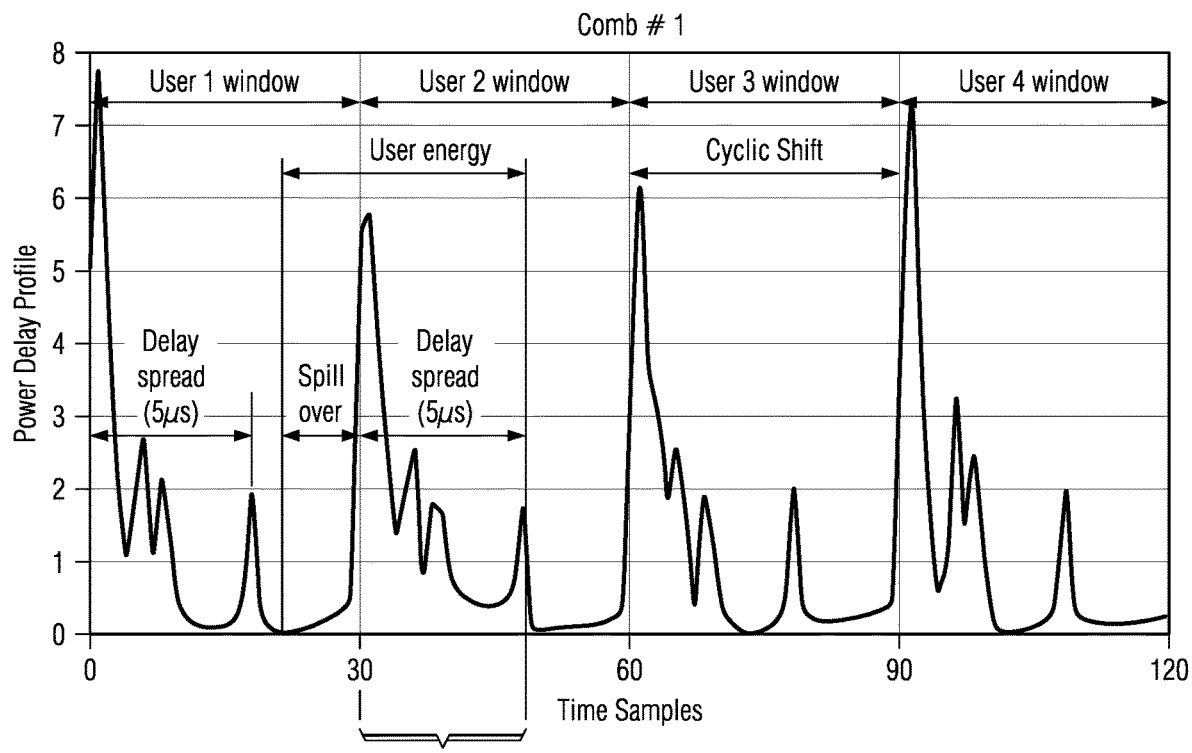
FIGS. 7A and 7B illustrate the case of four cyclic-shift multiplexed UEs per SRS comb with 5 µS delay spread TU channel.
Figure 7B:
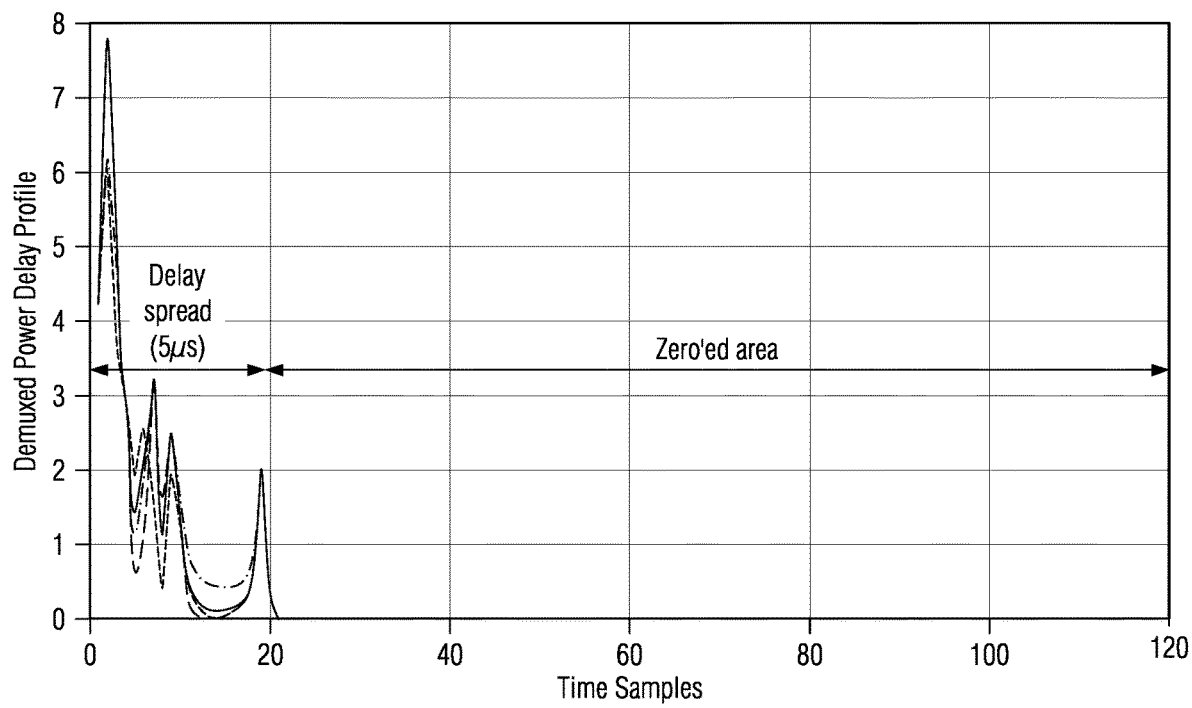

FIG. 7 illustrates the case of four cyclic-shift multiplexed UEs per SRS comb with 5 μS delay spread TU channel. The top part of FIG. 7 shows a plot of power delay profile versus time sample for four user windows. The bottom part of FIG. 7 shows a plot of demultiplexed power delay profile versus the same time samples. In FIG. 7 the user CIR extraction and cyclic shift de-multiplexing are performed simultaneously by selecting the appropriate user's cyclic shift window from the concatenated time-domain CIRs sequence y of all multiplexed UEs. This method is compared with the conventional frequency-domain channel estimation approach, where the cyclic shift de-multiplexing is performed directly onto the de-mapped frequency-domain sequence Y across sub-carrier chunks to produce channel estimate chunks as follows:

$$\hat{H}_u(c) = X_u^H(c)F_{N_cN_{FFT}}r \tag{7}$$

where: $\hat{H}_u(c)$ is the channel estimate across chunk c spanning sub-carriers $n_1(c), \ldots, n_c(c)$; C is the chunk size $X_u(c) = (0, \ldots, 0, X_{n_1(c)}, X_{n_2(c)}, \ldots, X_{n_c(d)}, 0, \ldots, 0)^T$; and the $N_c$ by $N_{FFT}$ matrix $F_{N_cN_{FFT}}$ corresponds to $N_{FFT}$-point FFT and $N_c$ sub-carriers de-mapping.

Compared to the frequency-domain channel estimation approach, zeroing-out samples outside the user's energy window in this invention achieve multiple benefits.

Channel Estimates Per Sub-Carrier

The last stage $N_{SRS}$-length DFT-based frequency interpolation provides channel estimates on each of the $N_{SRS}$ sub-carriers. Per-chunk channel estimates obtained with the frequency-domain approach are averaged arithmetically across the chunk sub-carriers. This disallows harmonic averaging of the user's SINR as requested by the UL scheduler to estimate the user's throughput with MMSE receiver.

Channel Estimation MSE Reduction

With the last stage $N_{SRS}$-length DFT, the energy of the Additive White Gaussian Noise (AWGN) samples in the user's window is spread across the $N_{SRS}$ sub-carriers. Since the user's energy is all contained in its cyclic shift window, this represents a reduction factor $G_{\sigma_H^2}$ on the channel estimation mean square error (MSE) $\sigma_H^2$ of $N_{SRS}/L$ corresponding to the ratio of half the OFDM symbol duration T/2 (due to IFDM with 2 combs per symbol) over the maximum expected delay spread $\tau$ among users:

$$G_{\sigma_H^2} = \frac{T}{2\tau} \tag{8}$$

With a LTE symbol duration of 66.67 μS and TU channel delay spread of 5 μS, an MSE improvement close to 8 dB is achieved for the channel estimation.

Channel Estimation Performance

The following is an evaluation of the performance of the invention in a realistic multi-user SC-FDMA multiplex simulation. The simulator models a number of UEs multiplexed on a configurable SRS bandwidth within the total bandwidth (25 PRBs) available in 5 MHz spectrum. The root sequence, cyclic shift and frequency mapping of the UEs are re-selected randomly every sub-frame. The simulator models timing errors of the UEs chosen randomly within a maximum time uncertainty window. The SNR is measured in time domain and is representative of the average signal power across the SRS bandwidth, not in the user's comb only. Table 3 below includes all parameters of the simulation.

TABLE 3

| Parameter | Value or range |
|---|---|
| System Bandwidth | 5 MHz |
| Number of antennas | 2 |
| Number of SRS users | 2-16 |
| SRS bandwidths | 4-8-20 PRBs |
| Scheduled sub-frames per UE | All |
| SRS sequences | EZC with random selection of ZC index and cyclic shift every sub-frame |
| Max timing uncertainty window | +/− 1 μs |
| Channels | AWGN, TU6, PA |
| UE speed | 3 km/h |

This evaluation uses for performance criterions the normalized mean square error of the channel estimates $\hat{H}$ per sub-carrier per antenna:

$$\sigma_H^2 = \frac{E\{|\hat{H} - H|^2\}}{a^2} \tag{9}$$

where: $a^2 = E\{|H|^2\}$ is the averaged received power from the user.

Channel Estimator Distortions

A first simulation assesses the performance of the proposed estimator in absence of noise. The time-domain approach of this invention requires that the channel be first down-sampled to time domain and then interpolated to frequency domain. The former acts as a sinc band-pass filter on the channel, which has two consequences:

- The narrower the SRS bandwidth, the coarser the CIR and therefore the channel estimates; and
- Some spill-over effects should be accounted for when designing the user window for cyclic shift de-multiplexing. This spill-over leads to non-perfect orthogonality between cyclic shifts.

Figure 8B:
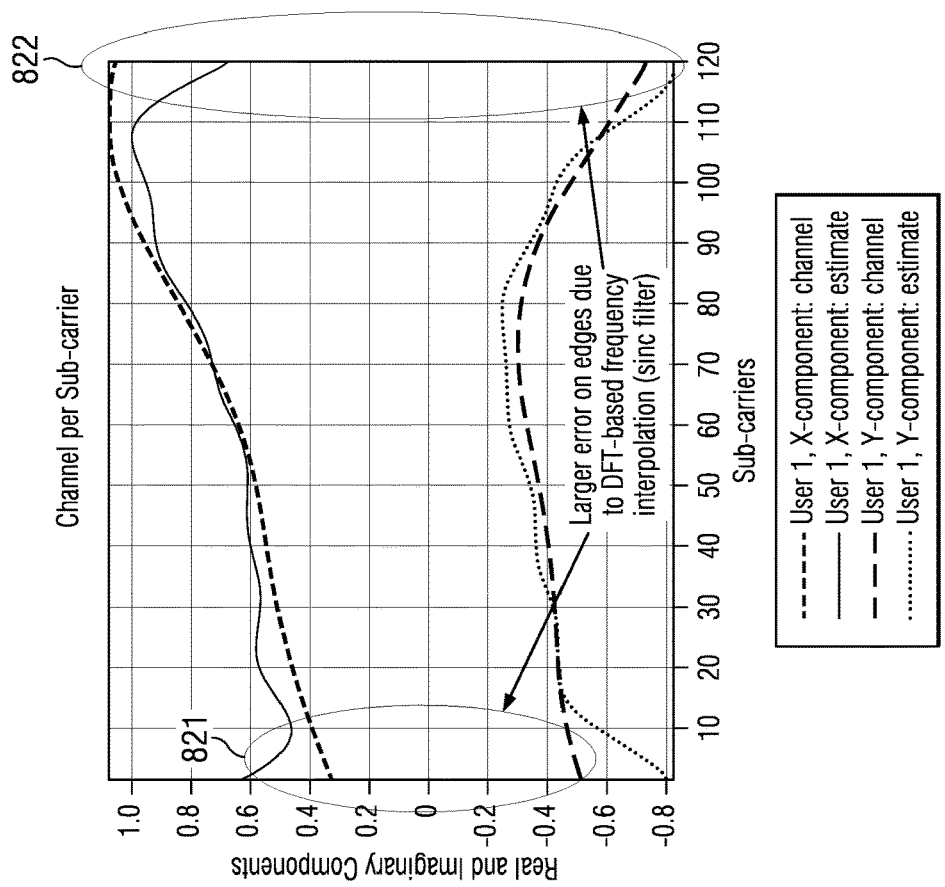
FIGS. 8A and 8B illustrate two plots of the real and imaginary components for actual data and estimated data versus sub-carrier, FIG. 8A the TU channel and FIG. 8B the PA channel.
Figure 8A:
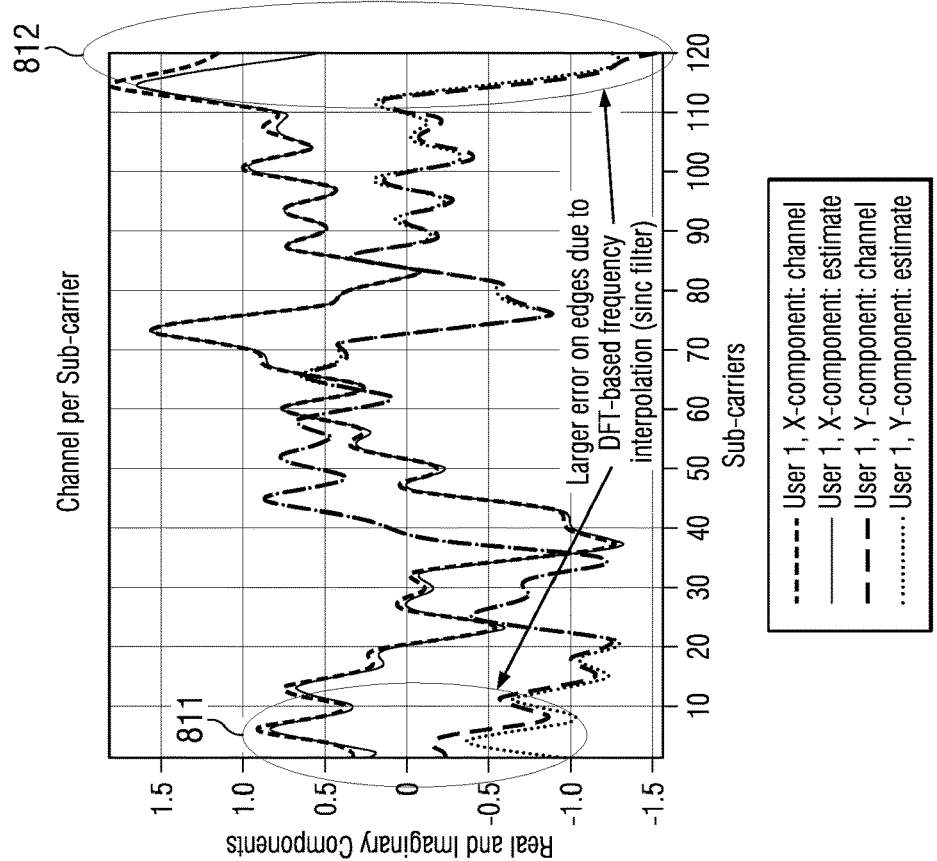

The latter unavoidably creates interpolation errors at both ends of the interpolation such as SRS bandwidth edges. FIGS. 8A, 8B, 9A and 9B illustrate this. FIG. 8 illustrates two plots of the real and imaginary components for actual data and estimated data versus sub-carrier. FIG. 8A is the TU channel. FIG. 8B is the PA channel. FIG. 8 illustrates four curves; the X component channel; the X component estimate; the Y component channel and the Y component estimate. FIGS. 8A and 8B illustrate regions 811, 812, 821 and 822 of larger errors.

Figure 9B:
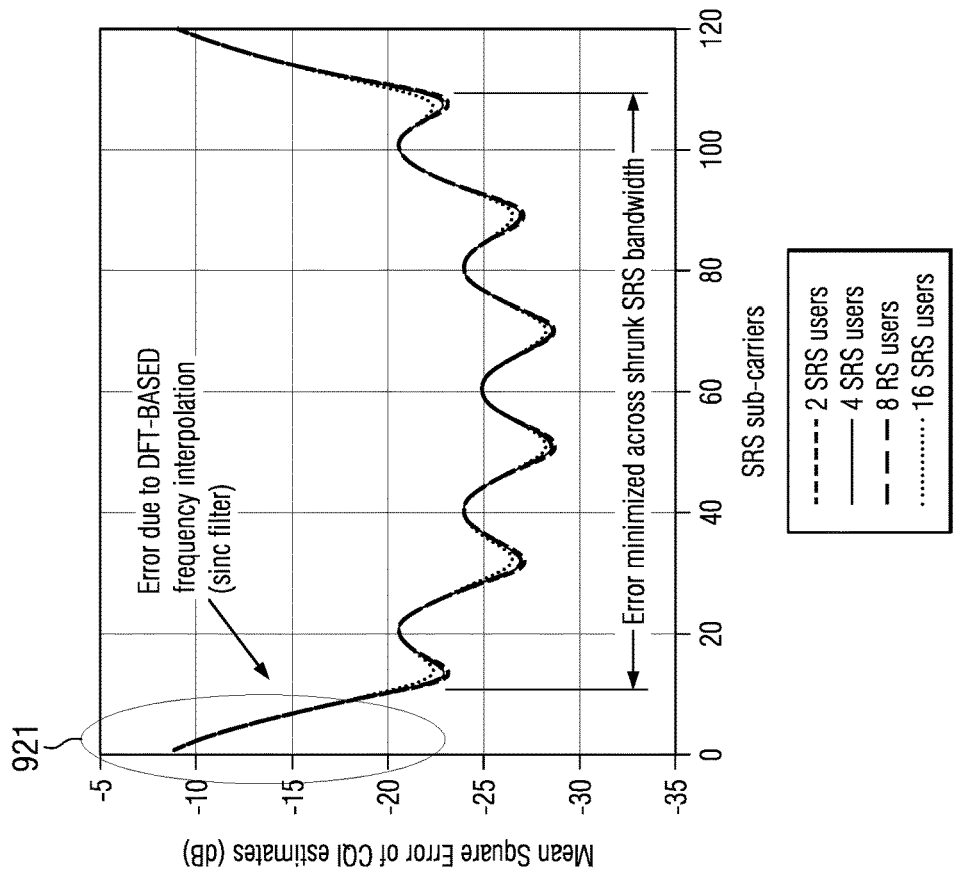
FIGS. 9A and 9B illustrate two plots of mean squared error of Channel Quality Index (CQI) value in dB versus sub-carrier, FIG. 9A the TU channel and FIG. 9B the PA channel.
Figure 9A:
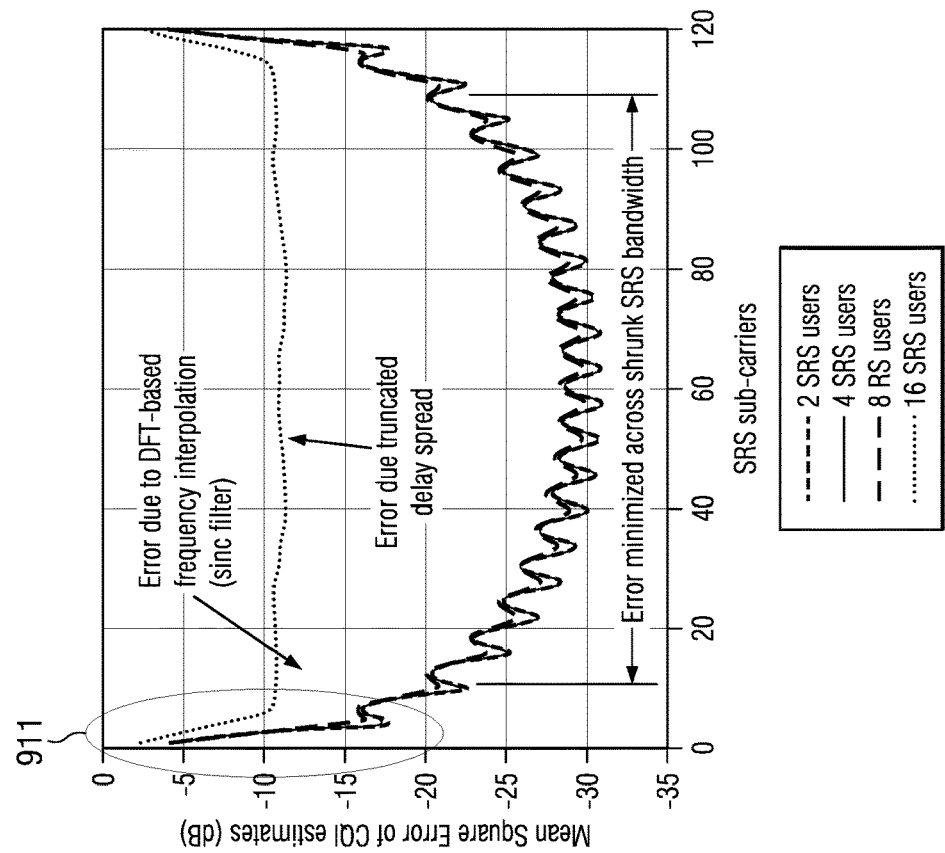

Due to the larger error regions illustrated in FIGS. 8A and 8B it is recommended to reduce the scope of the channel estimation to the inner SRS bandwidth only. FIG. 9 illustrates two plots of mean squared error of the channel estimates $\hat{H}$ per sub-carrier per antenna, known as Channel Quality Index (CQI) value, in dB versus sub-carrier. FIG. 9A is the TU channel. FIG. 9B is the PA channel. FIG. 9 illustrates four curves; two SRS users; four SRS users; 8 SRS users; and 16 SRS users. FIGS. 9A and 9B illustrate regions 911 and 921 of larger errors. As seen in FIGS. 9A and 9B, the MSE due to these distortions remains below −20 dB when shrinking the SRS bandwidth by 10%. The rest of the description of these simulations only considers the channel estimation performances in reduced shrunk bandwidth.

FIG. 9A illustrates a high error floor when 16 SRS users are multiplexed with TU channel. This is due to the delay profile truncation. In this configuration the cyclic shift increment is 4.17 µS but the delay spread of the channel is 5 µS. It is not recommended to multiplex 16 UEs with TU channel on the same SRS symbol at high SNR.

Channel Estimator Performance with AWGN

Figure 10A:
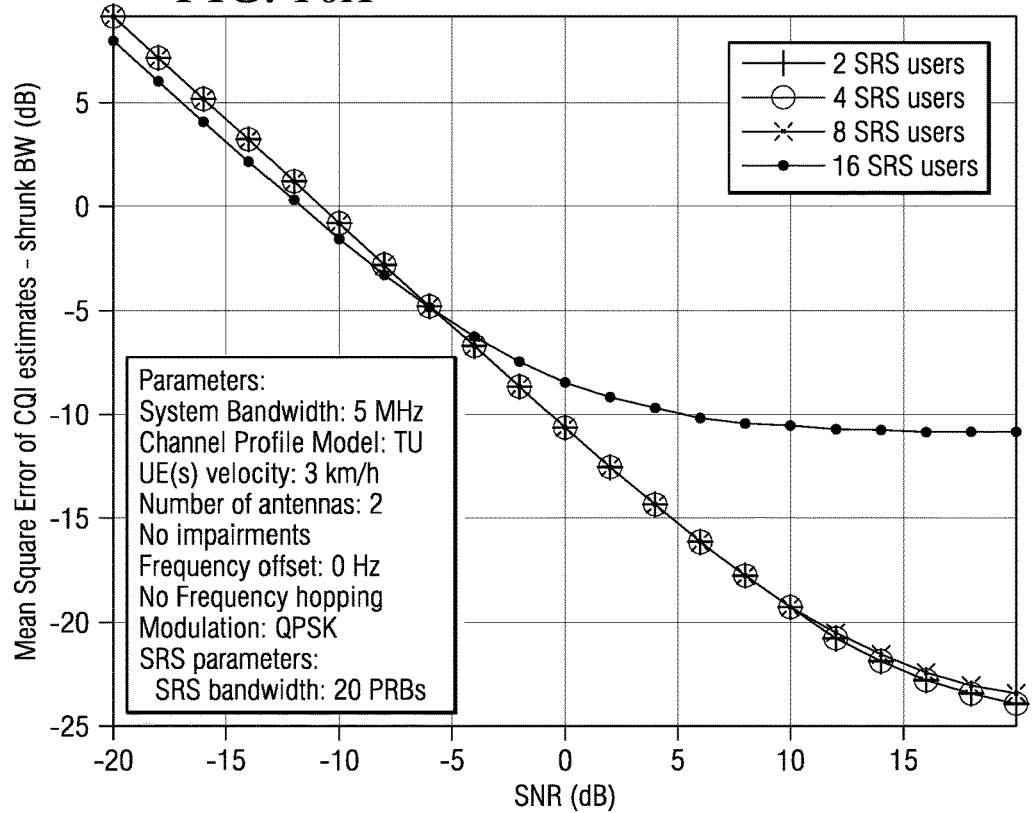
FIGS. 10A and 10B illustrate plots of Channel estimation Mean Squared Error in Channel Quality Indicator (CQI) estimates of the shrunk bandwidth in dB versus signal to noise ratio (SNR) in dB, FIG. 10A the TU channel and FIG. 10B the PA channel.
Figure 10B:
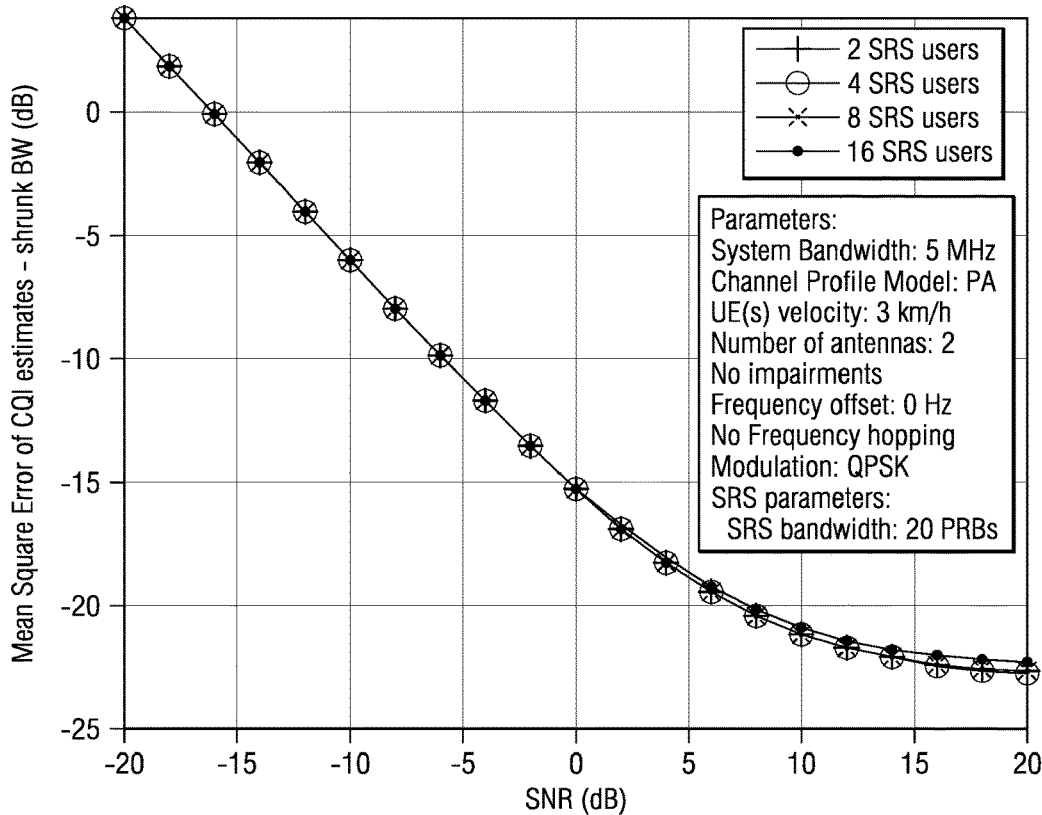
Figure 11A:
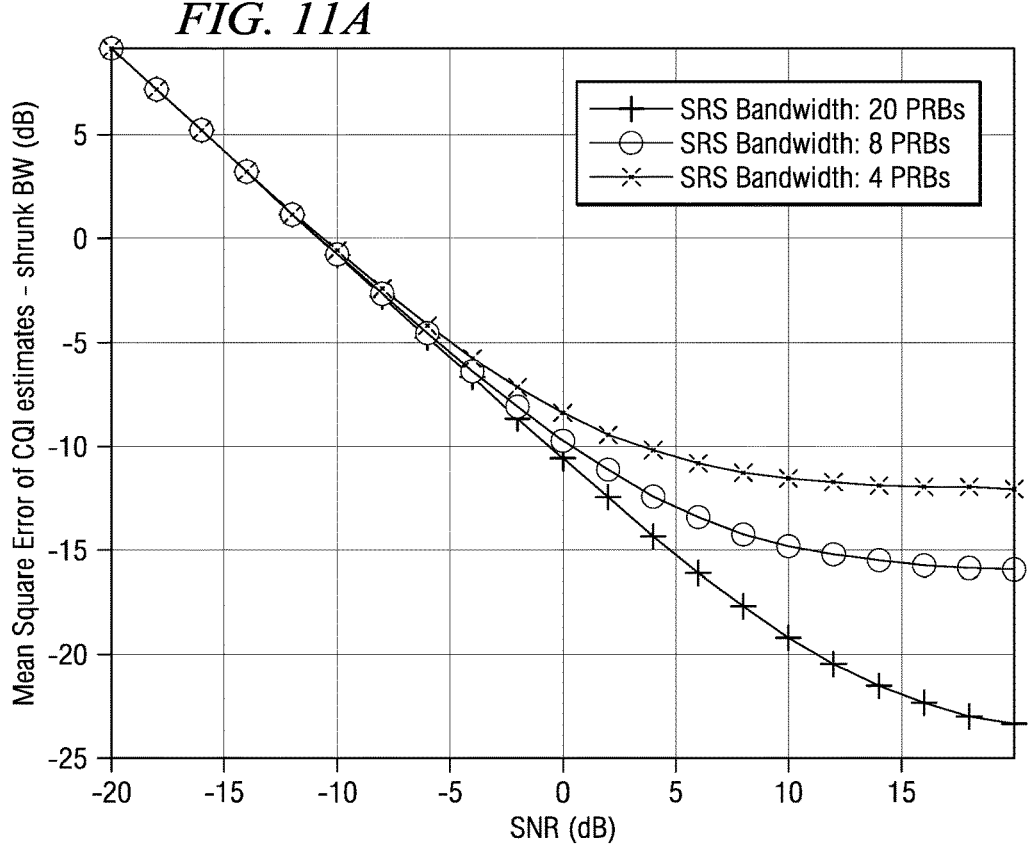
FIGS. 11A and 11B illustrate a plot of mean square error of CQI estimate versus signal to noise ratio, FIG. 11A the TU channel and FIG. 11B the PA channel.
Figure 11B:
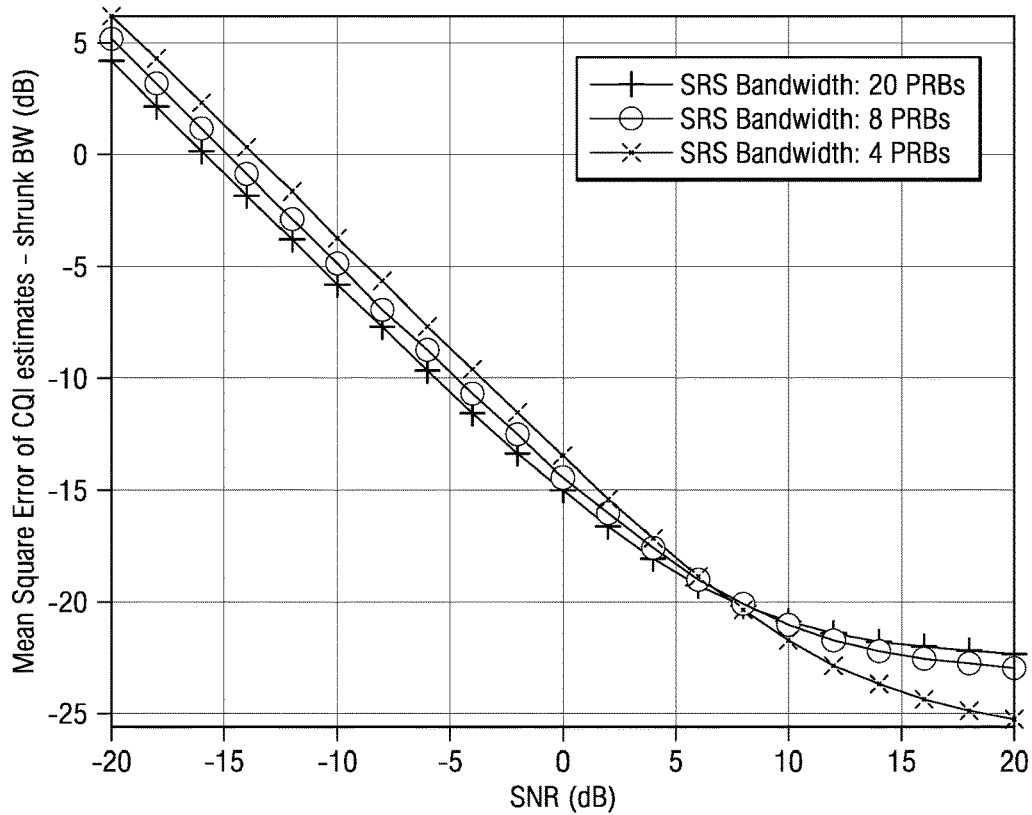

The normalized mean square error performance $\sigma_H^2$ is plotted in FIGS. 10 and 11 for TU and PA channels when varying the number of multiplexed SRS users and the SRS bandwidth respectively. FIGS. 10A and 10B illustrates plots of Channel estimation Mean Squared Error in Channel Quality Indicator (CQI) estimates of the shrunk bandwidth in dB versus signal to noise ratio (SNR) in dB. FIG. 10A is the TU channel. FIG. 10B is the PA channel. FIGS. 10A and 10B illustrate four curves: two SRS users; four SRS users; eight SRS users; and sixteen SRS users. As described above an error floor occurs with 16 SRS users with TU channel (FIG. 10A) because of the delay profile truncation. The better channel estimation performance with PA channel compared to TU channel is due to the slower channel variations in frequency domain. This provides better interpolation performance and, due to the smaller the delay spread, the larger the SNR improvement ratio described above. FIG. 10B illustrates the smaller the SRS bandwidth the narrower the low-pass filter effect discussed above. The TU channel is more sensitive to the SRS bandwidth than PA channel because it is more frequency selective and therefore suffers more from these losses.

Non-Biased Estimator

A broad use of the SRS allows prediction of the UE's signal to interference plus noise ratio (SINR) information for the UL scheduler to derive appropriate scheduling metric and perform link adaptation. This involves computing the channel gain estimate per sub-carrier per antenna:

$$\hat{G}(a) = |\hat{H}(a)|^2 \tag{10}$$

In absence of other distortion but AWGN, channel estimates $\hat{H}(a)=\hat{H}_x(a)+j\ \hat{H}_y(a)$ are complex values random variables which components follow a non-centered Normal distribution:

$$\hat{H}_x(a) = a_x N\left(1, \frac{\sigma_H^2}{2}\right); \hat{H}_y(a) = a_y N\left(1, \frac{\sigma_H^2}{2}\right); a_x^2 + a_y^2 = a^2 \tag{11}$$

As a result, the channel gain estimates $\hat{G}(a)=|\hat{H}(a)|^2=|\hat{H}_x(a)|^2+|\hat{H}_y(a)|^2$ follow a non-central Chi-square distribution with 2 degrees of freedom and non-centrality parameter $a^2$. The normalized mean and standard deviations are:

$$\frac{m_{\hat{G}(a)}}{a^2} = 1 + \sigma_H^2 \tag{12}$$

$$\frac{\sigma_{\hat{G}(a)}}{a^2} = \sigma_H\sqrt{2 + \sigma_H^2} \tag{13}$$

From equation (12) it is clear that this estimator is biased and that the noise variance component $a^2\sigma_H^2$ should be removed from the gain estimate $\hat{G}(a)$ to produce a non-biased estimation:

$$\hat{G}_0(a) = |\hat{H}(a)|^2 - \hat{\sigma}_N^2 \tag{14}$$

where: $\hat{\sigma}_N^2$ is an estimate of the noise variance $\sigma_N^2 = a^2\sigma_H^2$. However, $|\hat{H}(a)|^2$ and $\hat{\sigma}_N^2$ are independent estimates which cumulative errors may lead to a negative value for $\hat{G}_0(a)$. Therefore some additional adjustment is needed to prevent negative gain estimates. Three possible options are:

$$\hat{G}_{Abs}(a) = \left||\hat{H}(a)|^2 - \hat{\sigma}_N^2\right| \tag{15}$$

$$\hat{G}_{Clip}(a) = \max\left\{|\hat{H}(a)|^2 - \hat{\sigma}_N^2; G_{floor}\right\} \tag{16}$$

$$\hat{G}_{Select}(a) = \begin{cases} |\hat{H}(a)|^2 - \hat{\sigma}_N^2 & \text{if } |\hat{H}(a)|^2 - \hat{\sigma}_N^2 > 0 \\ |\hat{H}(a)|^2 & \text{if } |\hat{H}(a)|^2 - \hat{\sigma}_N^2 \le 0 \end{cases} \tag{17}$$

The comparative performance analysis of the above channel gain estimates is discussed below.

Noise Variance Estimation Through Cyclic Shift Reservation

Figure 12:
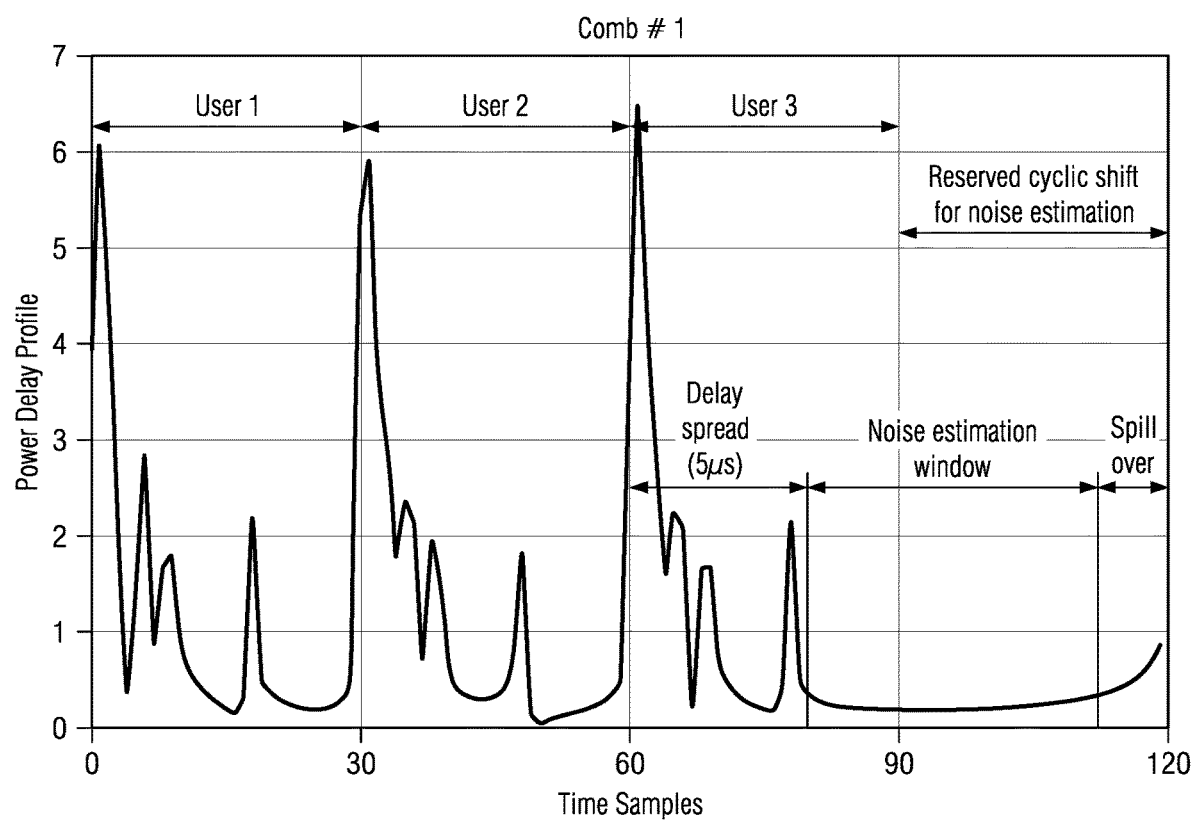
FIG. 12 shows a plot of power delay profile versus time samples.

The variance of the SRS noise is specific to the SRS signal. The SRS signal in addition to the thermal noise is expected to be interfered by other SRS signals from neighbor cells. This is reflected by the cross-correlation characteristics of EZC sequences. The noise variance can be estimated from the areas where no signal energy is present in the concatenated delay profiles sequence y. For some channel types such as TU and when all multiplexing space is used, there is no such area available for noise variance estimation. In this invention one cyclic shift per comb is reserved for noise variance estimation. FIG. 12 shows this technique. FIG. 12 shows a plot of power delay profile versus time samples. Time samples 1 to 30 are reserved for user 1. Time samples 31 to 60 are reserved for user 2. Time samples 61 to are reserved for user 3. Time samples 91 to 120 are reserved for cyclic shift noise estimation. As illustrated in FIG. 12, the noise estimation window is designed to maximize the number of noise samples while not including samples carrying adjacent users' energy such as in the spill-over regions. The noise is estimated as:

$$\hat{\sigma}_N^2 = \frac{1}{|I_N|} \sum_{i \in I_N} |y_i|^2 \quad (18)$$

where: $I_N$ is the noise estimation window; and $|I_N|$ is the number of samples in this window.

Noise Variance Estimation Performance

Simulations of the normalized mean error (bias) $m_{\sigma_N^2}$ and normalized standard deviation $\sigma_{\sigma_N^2}$ performance metrics for the noise variance estimator result in the following:

$$m_{\sigma_N^2} = E\{\hat{\sigma}_N^2 - \sigma_N^2\} / \sigma_N^2 \quad (19)$$

$$\sigma_{\sigma_N^2} = \sqrt{E\{([\hat{\sigma}_N^2 - \sigma_N^2] / \sigma_N^2 - m_{\sigma_n^2})^2\}} \quad (20)$$

Figure 13A:
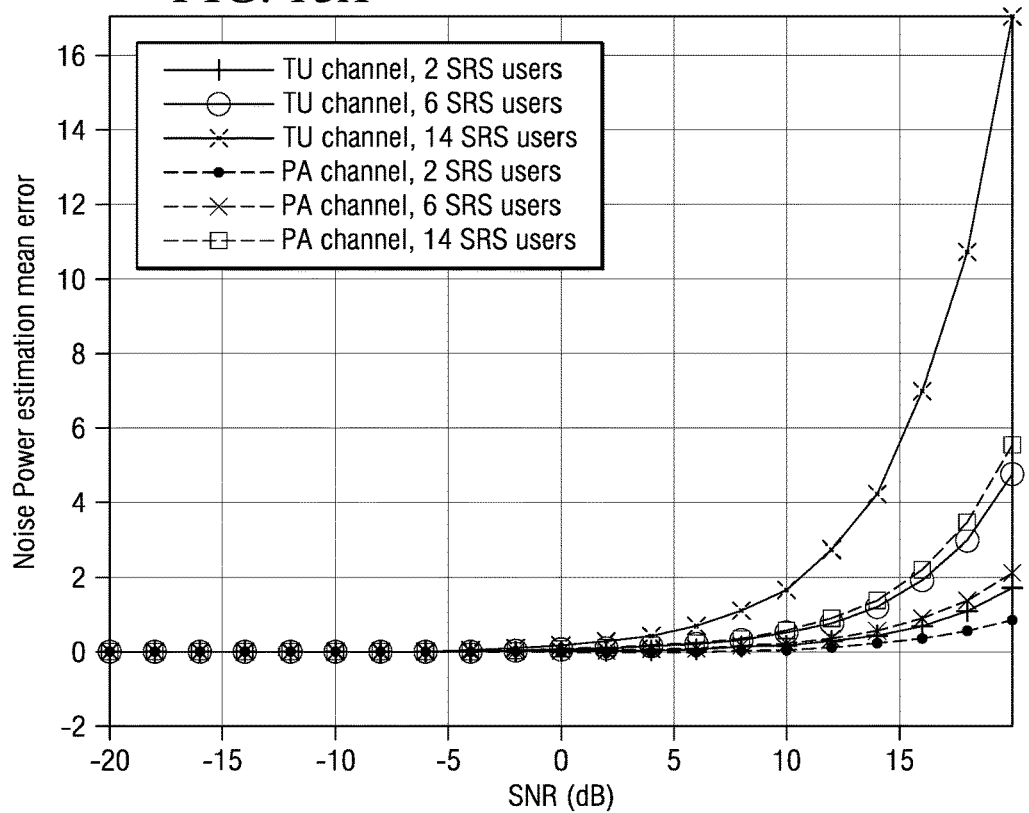
FIGS. 13A and 13B illustrate plots of channel gain estimate mean error versus signal to noise ratio in dB for the TU channel (FIG. 13A) and for the PA channel (FIG. 13B)
Figure 13B:
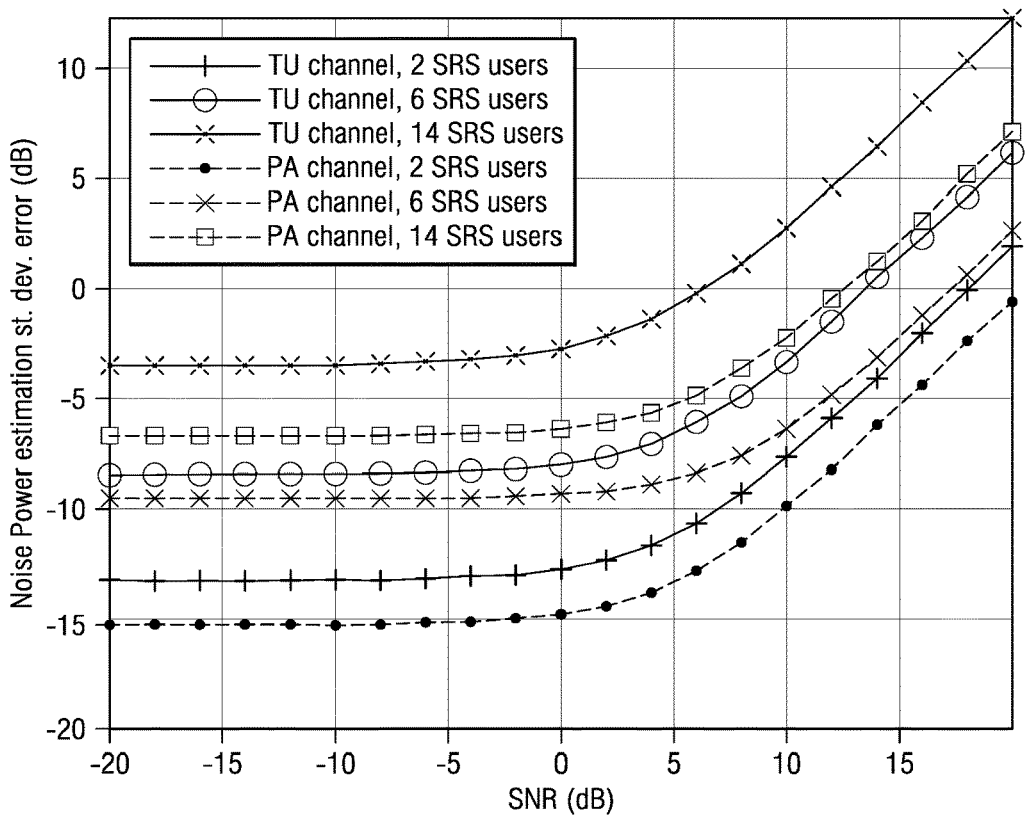

FIG. 13 shows the noise variance estimation performance for both TU and PA channels when varying the number of SRS users at 20 PRB SRS bandwidth. FIG. 13 illustrates plots of noise power estimation performance versus signal to noise ratio in dB for both the TU channel and the PA channel. FIG. 13A illustrates the mean error and FIG. 13B illustrates the standard deviation of the error. The mean error performance shows the noise power estimator is unbiased in the area where it is the most important: at low SNR of less than 0 dB. At high SNR, the estimator has a non-zero mean due to non-ideal cyclic shift separation between users and noise window. The standard deviation performance shows the noise power estimator has a constant variance in the area where it is the most important: at low SNR less than 0 dB. At high SNR, the estimator variance increases with SNR due to non-ideal cyclic shift separation between users and noise window. The PA channel provides a more accurate estimation because the noise estimation window can be made larger thanks to the small delay spread of adjacent UEs as shown in FIG. 10.

Channel Gain Estimator Performance with AWGN

To determine if the modified channel gain estimator $\hat{G}_0(a)$ is unbiased, simulations measure the normalized linear mean error (bias) $m_{H^2}$ defined as:

$$m_{H^2} = \frac{E\{\hat{G}_0(a) - |H(a)|^2\}}{a^2} \quad (21)$$

Figure 14A:
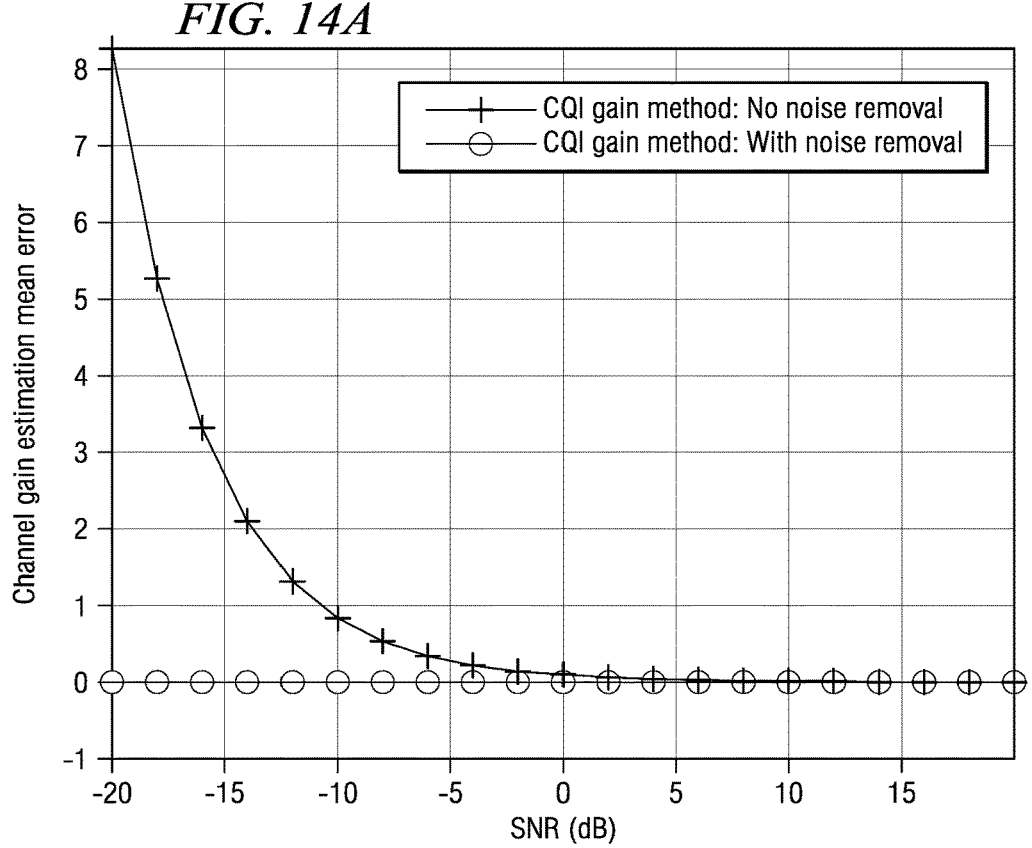
FIGS. 14A and 14B show the channel gain estimation error with and without noise variance estimation removal for both the TU channel (FIG. 14A) and the PA channel (FIG. 14B) for varying the number of SRS users at 20 PRB SRS bandwidth.
Figure 14B:
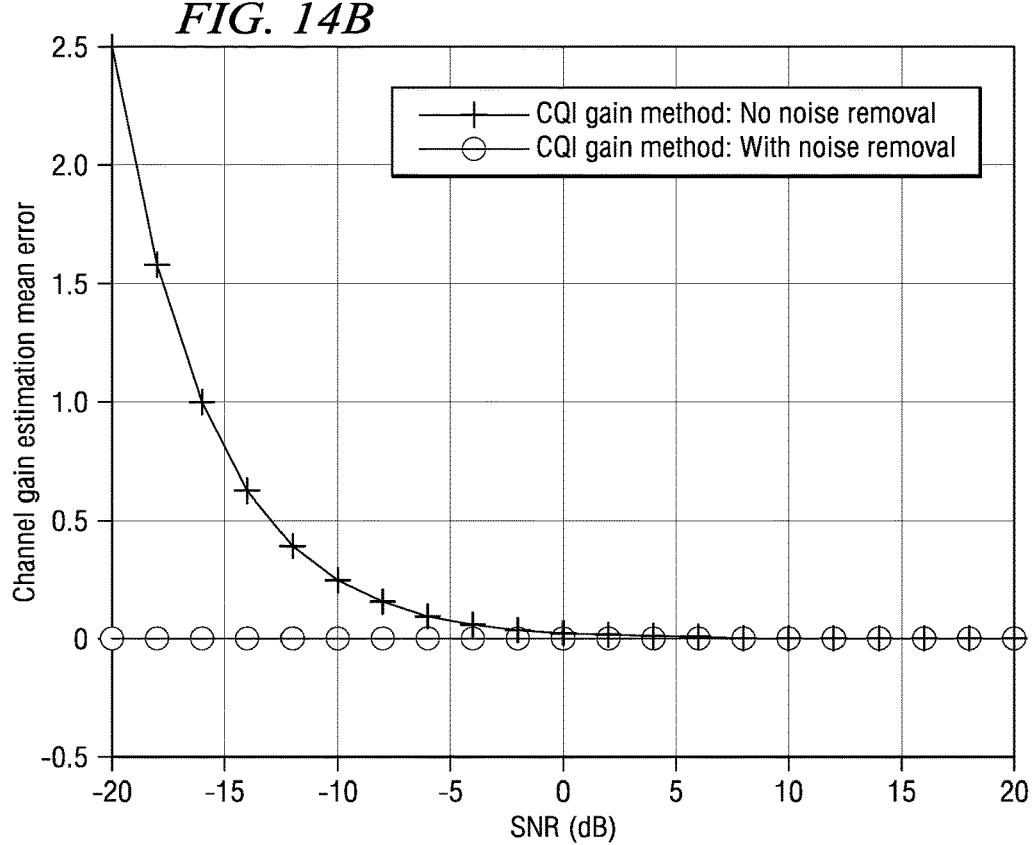

FIG. 14 shows the channel gain estimation error with and without noise variance estimation removal for both the TU channel (FIG. 14A) and the PA channel (FIG. 14B) for varying the number of SRS users at 20 PRB SRS bandwidth. FIG. 14 is two plots of channel gain estimation error versus signal to noise ratio in dB for with no noise removal and with noise removal. The channel gain estimator $\hat{G}_0(a)$ is not biased across the wide SNR range after removing the estimated noise variance.

Figure 15A:
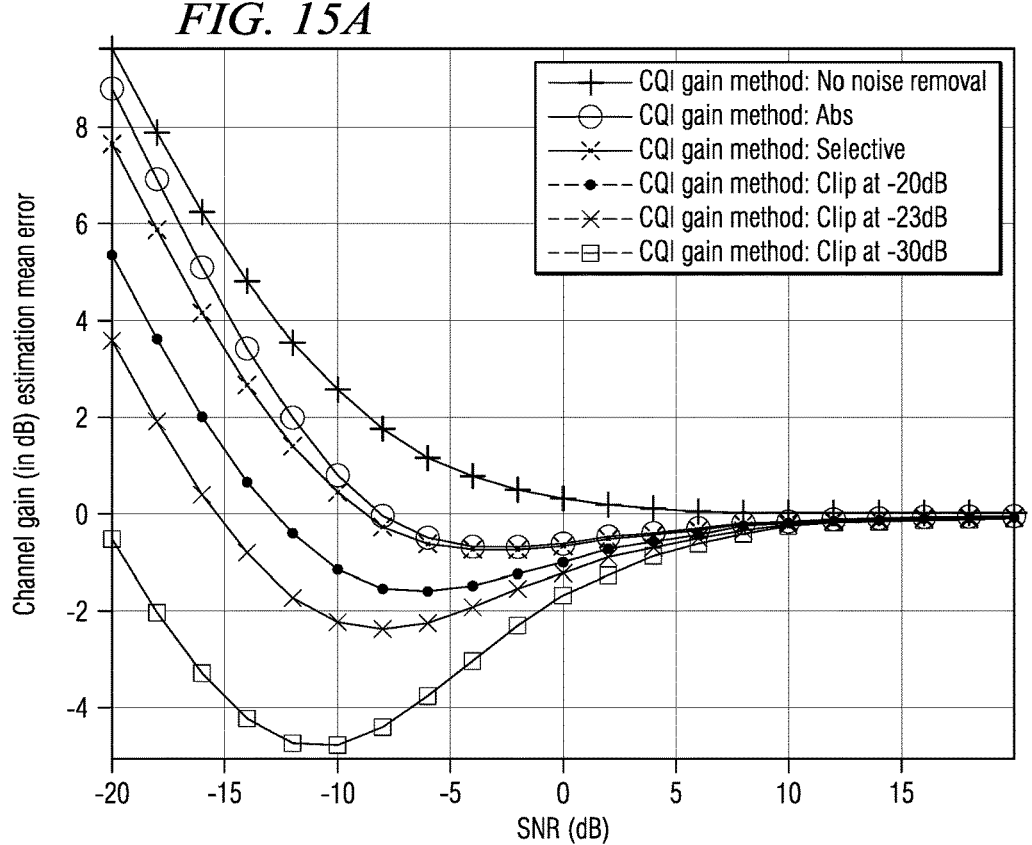
FIGS. 15A and 15B illustrate the mean channel gain estimation error (FIG. 15A) and standard deviation of the channel gain estimation error (FIG. 15B) versus signal to noise ratio in dB for various gain estimation techniques for the TU channel.
Figure 15B:
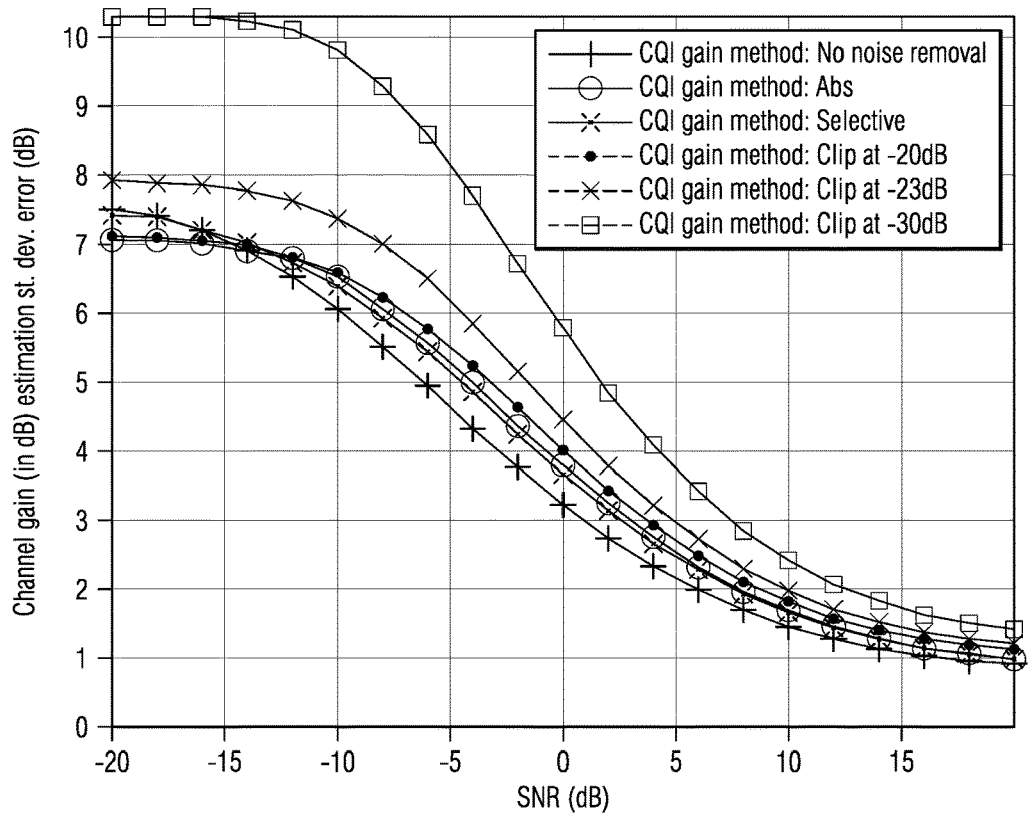
Figure 16A:
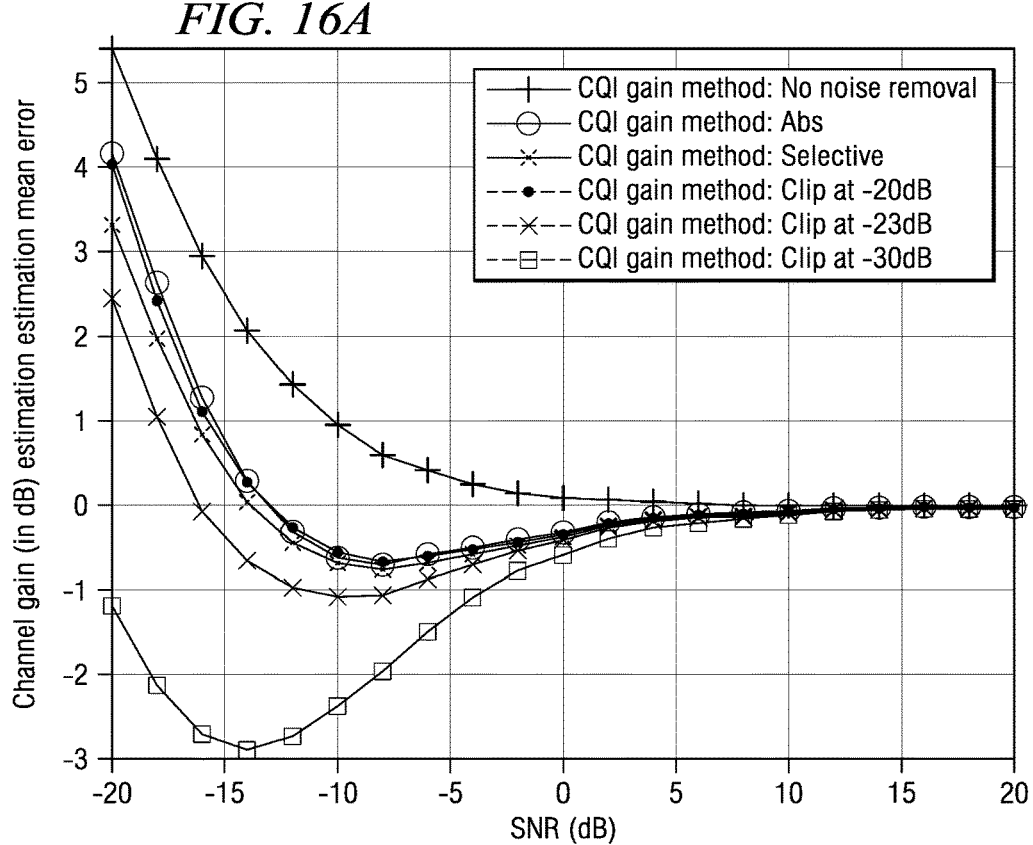
FIGS. 16A and 16B illustrate the mean channel gain estimation error (FIG. 16A) and standard deviation of the channel gain estimation error (FIG. 16B) versus signal to noise ratio in dB for various gain estimation techniques for the PA channel.
Figure 16B:
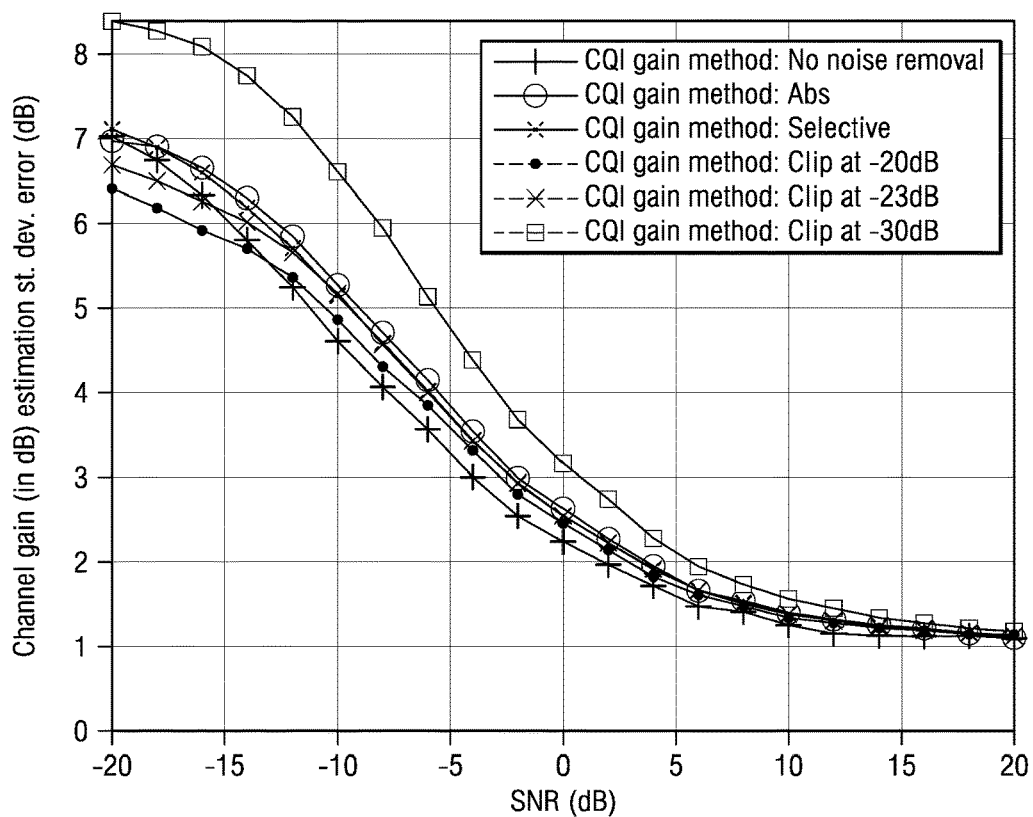

The link-level simulator allows assessment of performance of the positive channel gain estimators. Because the channel gain is further used for SNR estimation, it is more convenient to express it in the dB scale. The mean $m_{H^2_{dB}}$ and standard deviation $\sigma_{H^2_{dB}}$ errors of the channel gain estimations expressed in dB are:

$$m_{H^2_{dB}} = E\{\hat{G}_{xy}(a)_{dB} - (|H(a)|^2)_{dB}\} \quad (22)$$

$$\sigma_{H^2_{dB}} = \sqrt{E\{(\hat{G}_{xy}(a)_{dB} - (|H(a)|^2)_{dB} - m_{H^2_{dB}})^2\}} \quad (23)$$

where: $\hat{G}_{xy}(a)$ represent the various estimators $\hat{G}_{Abs}(a)$, $\hat{G}_{Clip}(a)$ and $\hat{G}_{Select}(a)$. FIG. 15 illustrates the mean channel gain estimation error (FIG. 15A) and standard deviation of the channel gain estimation error (FIG. 15B) versus signal to noise ratio in dB for various gain estimation techniques for the TU channel. FIG. 15 includes curves for: no noise removal; calculation using absolute value; selective calculation; clipping the channel gain estimation at −20 dB; clipping the channel gain estimation at −23 dB; and clipping the channel gain estimation at −30 dB. FIGS. 15A and 15B each employ 2 SRS users. FIG. 16 illustrates the mean channel gain estimation error (FIG. 16A) and standard deviation of the channel gain estimation error (FIG. 16B) versus signal to noise ratio in dB for various gain estimation techniques for the PA channel. FIG. 16 includes curves for: no noise removal; calculation using absolute value; selective calculation; clipping the channel gain estimation at −20 dB; clipping the channel gain estimation at −23 dB; and clipping the channel gain estimation at −30 dB. FIGS. 15A and 15B each employ 2 SRS users. The methods providing the best compromise across both mean and standard deviation errors and across the SNR range are the clipping methods with clipping threshold of −20 dB or −23 dB.

Further Noise Reduction Techniques

Both channel and channel gain estimators performances show rather poor performances at low SNR. This section of the patent application evaluates ways to improve these performances through two noise reduction techniques. The resulting performances on both the TU channel and the PA channel are assessed. This simulation used an SRS configuration with only 2 SRS users per SRS symbol (minimum co-channel interference) and 20 PRB SRS bandwidth in order to isolate the noise reduction performance. The channel gain estimator in dB scale used a clipping threshold of −20 dB for negative gain avoidance.

Least Mean Square (LMS) Filtering

Figure 17:
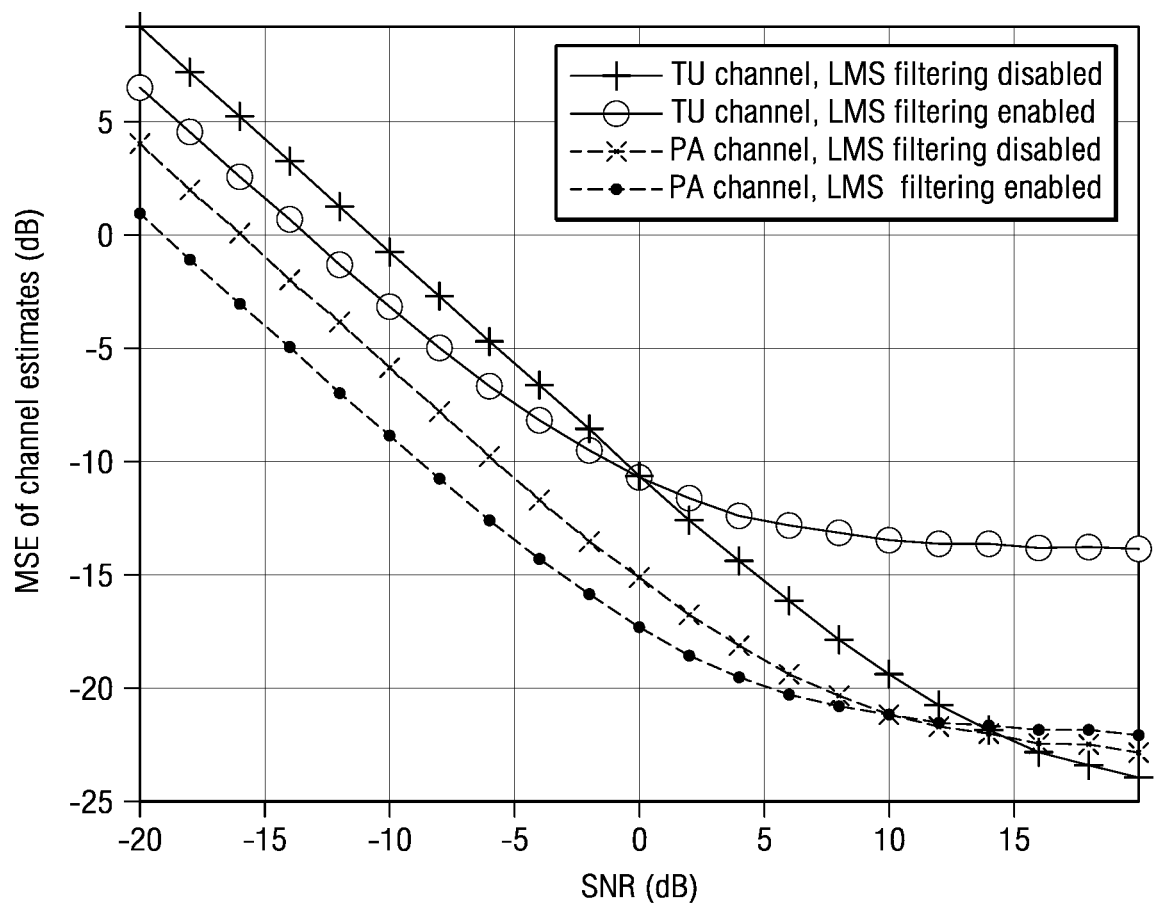
FIG. 17 plots the normalized MSE performance mean square error $\sigma_H^2$ of the channel estimates $\hat{H}$ per sub-carrier per antenna in dB versus signal to noise ratio in dB for two SRS users.

The least mean square filtering method implements an LMS equalizer on the channel estimates $\hat{H}_u$ before computing the channel gain:

$$\hat{H}_{eq} = C_{LMS}\hat{H}_u \quad (24)$$

where: $C_{LMS}$ is the $N_{SRS}$ by $N_{SRS}$ coefficient matrix minimizing the mean square error (MSE) and computed as:

$$C_{LMS} = \Gamma^{-1}\xi \quad (25)$$

where: $\Gamma$ is the covariance matrix of the sub-carrier samples and; $\xi$ is a matrix which columns are shifted replicas of the frequency domain channel filter coefficients. In the link-level simulator, both $\Gamma$ and $\xi$ are selected according to the channel model in use. In a practical eNB implementation different UEs may undergo different channels. Thus it can be quite complex to track the channel delay and amplitude profile of each UE independently. This patent application uses only the maximum delay spread information from the channel model and scaled a sinc function accordingly to model both Γ and ξ resulting in a common set of coefficients $C_{LMS}$ for all SRS users. FIGS. 17 and 18 compare the performance of the channel estimators with and without LMS filtering for both the TU channel and the PA channel. FIG. 17 plots the normalized MSE performance mean square error $\sigma_H^2$ of the channel estimates Ĥ per sub-carrier per antenna in dB versus signal to noise ratio in dB for two SRS users. FIG. 17 includes four curves: TU channel with least mean square (LMS) filtering disabled; TU channel with LMS filtering enabled; PA channel with LMS filtering disabled; and PA channel with LMS filtering enabled. At low SNR, the LMS filter reduces the MSE by up to 3 dB for both PA and TU channels. For the TU channel, the LMS filter creates an error floor for positive SNR values.

Figure 18A:
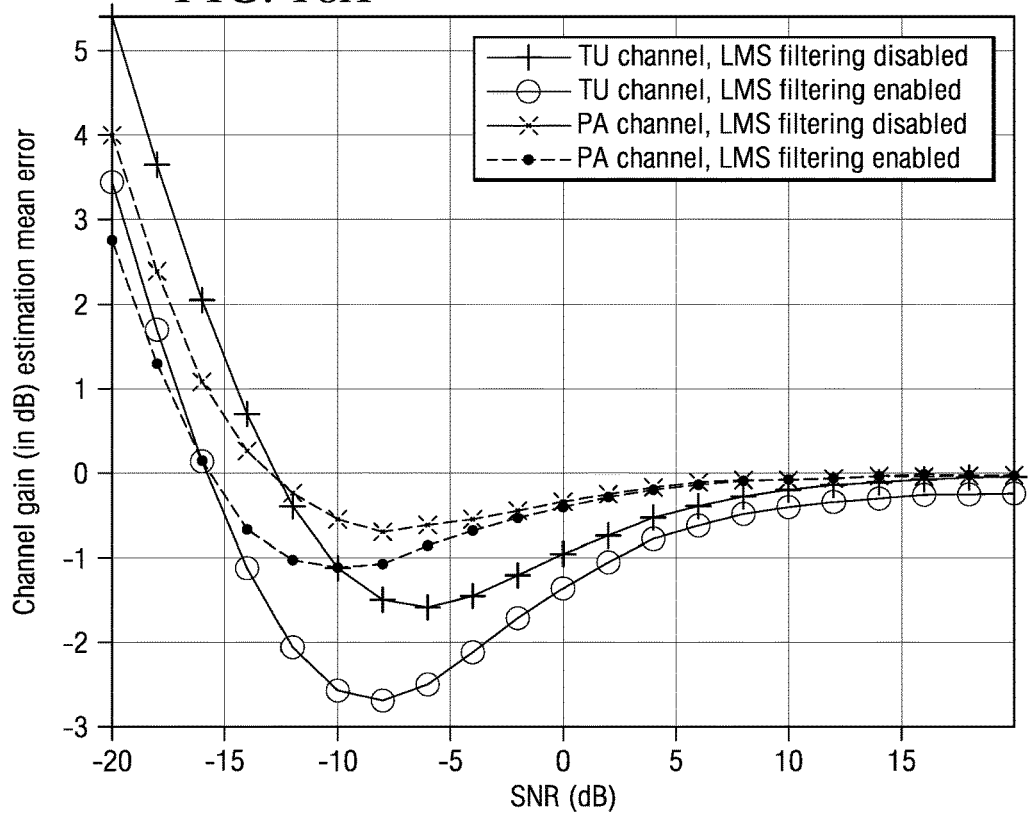
FIGS. 18A and 18B are two plots of channel gain estimation mean error (FIG. 18A) and channel gain estimation standard deviation of error (FIG. 18B) versus signal to noise ratio in dB for systems with two SRS users.
Figure 18B:
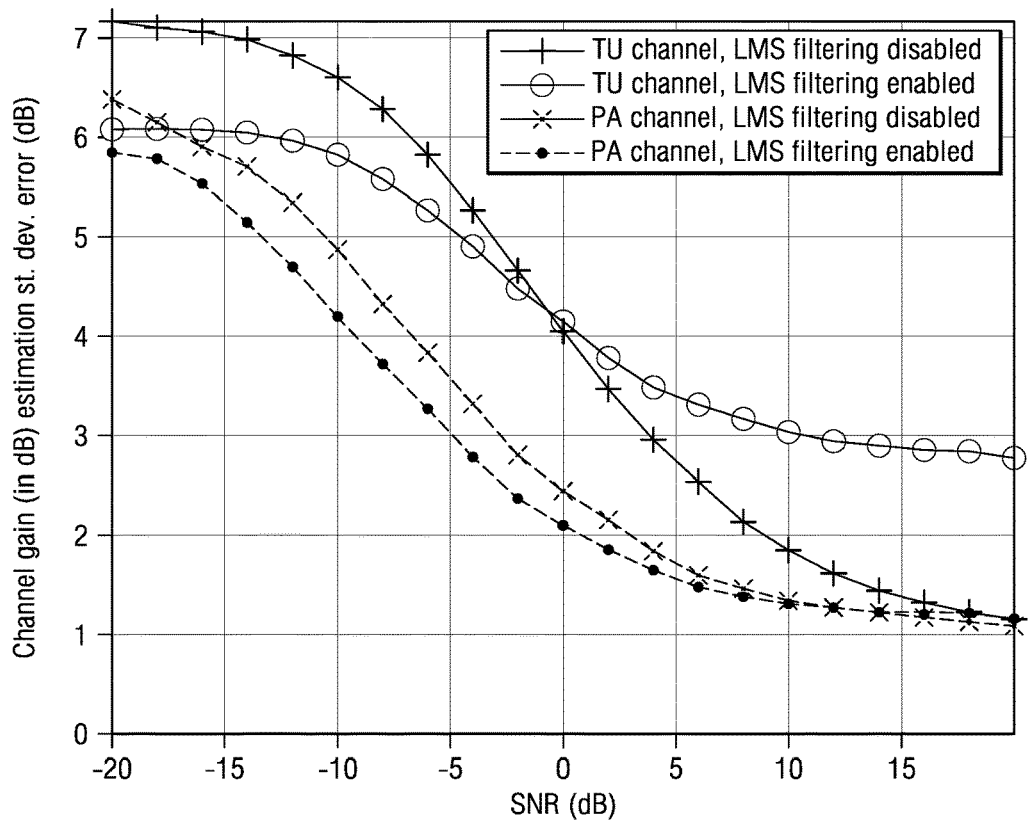

FIG. 18 is two plots of channel gain estimation mean error (FIG. 18A) and channel gain estimation standard deviation of error (FIG. 18B) versus signal to noise ratio in dB for systems with two SRS users. Each of FIGS. 18A and 18B illustrate four curves: TU channel with LMS filtering disabled; TU channel with LMS filtering enabled; PA channel with LMS filtering disabled; and PA channel with LMS filtering enabled. For the MSE performance (FIG. 18A), the LMS filter improves the mean error by 2 and 1.2 dB for TU and PA channel respectively at low SNR and improves the standard deviation performance (FIG. 18B) by 1 and 0.5 dB for TU and PA channel respectively. For the TU channel the LMS filter creates an error floor for positive SNR values. There is an SNR threshold for each channel where a crossover occurs between LMS filtering and no LMS filtering. Thus LMS filtering should be only used below these thresholds:

TU channel: <0 dB; and
PA channel: <10 dB

Cyclic Shift Window Shrink

Figure 19A:
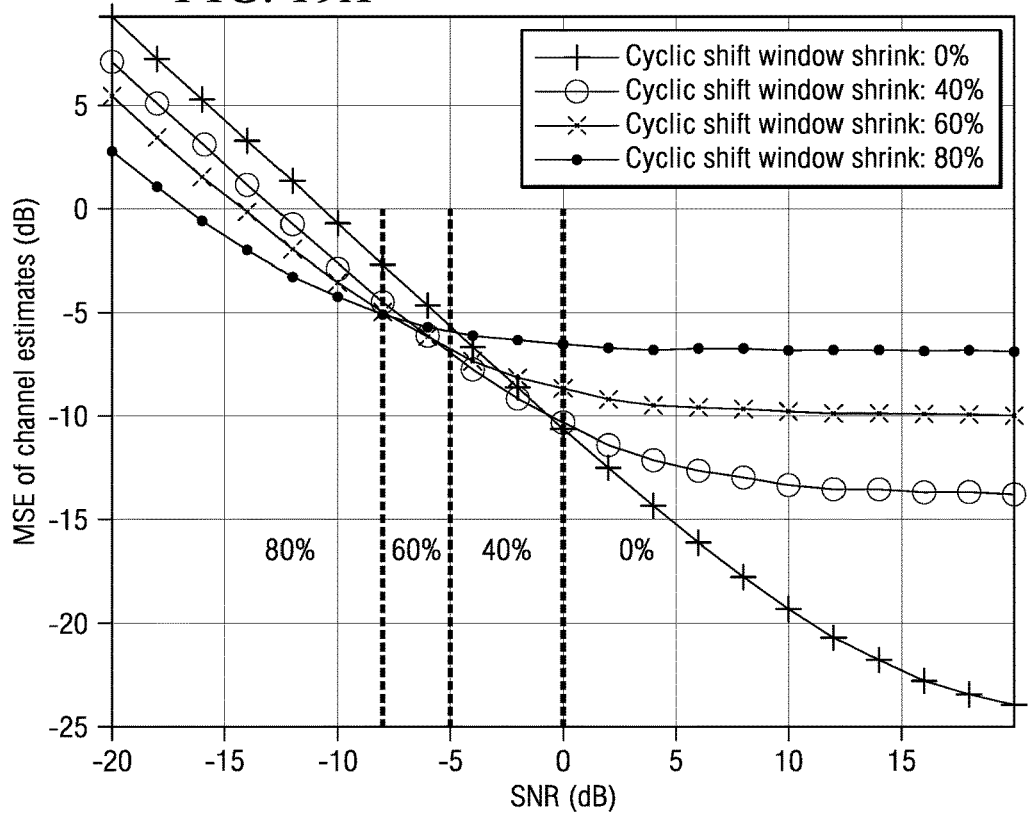
FIGS. 19A and 19B plot the normalized MSE performance $\sigma_H^2$ of the channel estimates $\hat{H}$ versus signal to noise ratio per sub-carrier per antenna for various window shrink amounts.
Figure 19B:
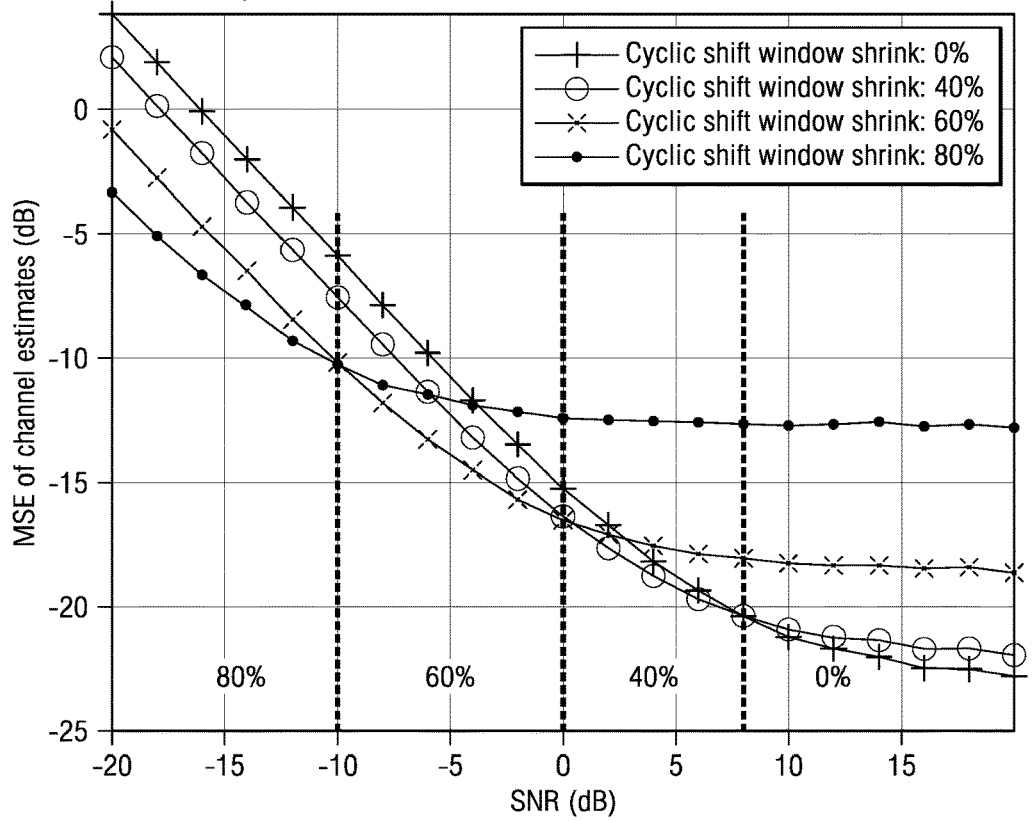

Another noise reduction technique shrinks the cyclic shift window $n_1(u), \ldots, n_L(u)$ when de-multiplexing the user thus reducing the value of L. Since L is dimensioned to cope with the maximum expected delay spread of the user, reducing L creates a trade-off between the resulting channel estimation distortion and the achieved noise reduction. FIGS. 19 and 20 compare the performance of the channel estimators for various amounts of shrinks for both the TU channel and the PA channel. FIG. 19 plots the normalized MSE performance $\sigma_H^2$ of the channel estimates Ĥ versus signal to noise ratio per sub-carrier per antenna for various window shrink amounts. FIG. 19A is for the TU channel. FIG. 19B is for the PA channel. FIGS. 19A and 19B each show four curves: window shrink 0%; window shrink 40%; window shrink 60%; and window shrink 80%. Different shrink amounts provide optimal noise reduction in different SNR regions. This is summarized in Table 4.

TABLE 4

| CHANNEL MODEL | TU | | | | PA | | | |
|---|---|---|---|---|---|---|---|---|
| SNR region (dB) | [−20 −8] | ]−8 −5] | ]−5 0] | ]0 20] | ]−20 −10] | ]−10 0] | ]0 8] | ]8 20] |
| Cyclic shift window shrink | 80% | 60% | 40% | 0% | 80% | 60% | 40% | 0% |

Given the SNR regions are different for the TU channel and the PA channel, this requires that eNB tracks both the SNR and the channel profile, or at least the delay spread of each SRS user. At low SNR, shrinking the cyclic shift window by up to 80% reduces the MSE by up to 6 dB for both PA and TU channels.

Figure 20A:
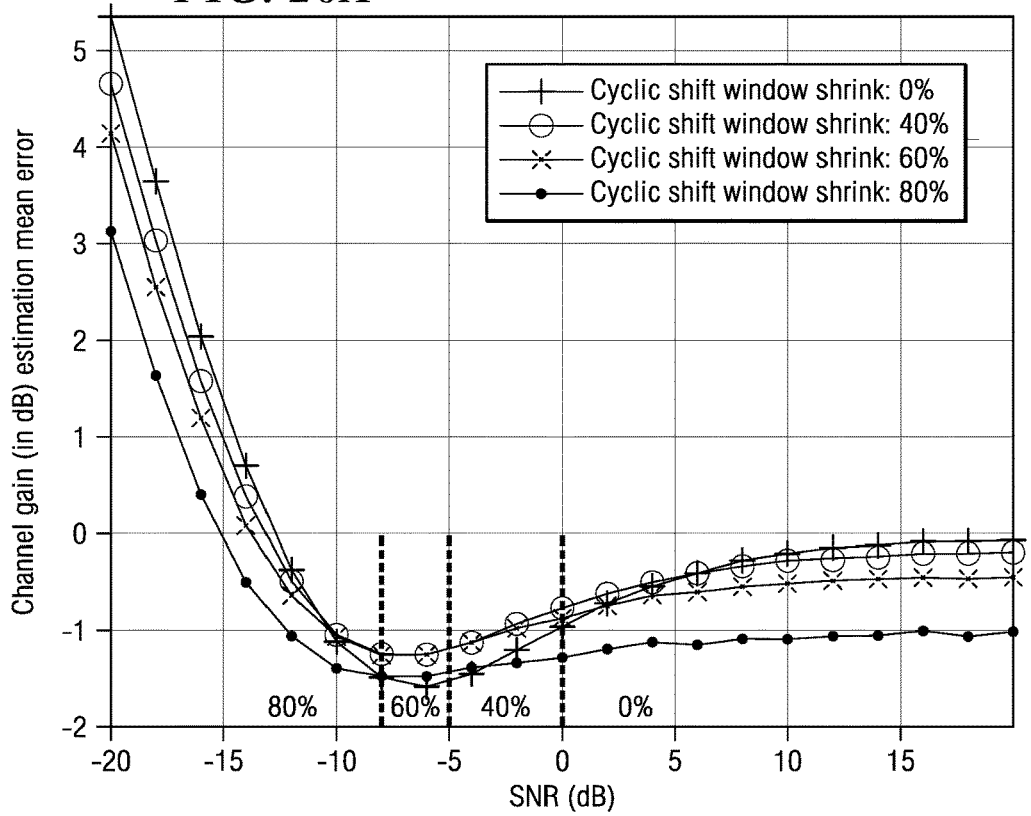
FIGS. 20A and 20B illustrate plots of the mean errors of the channel gain estimator versus signal to noise ratio in dB.
Figure 20B:
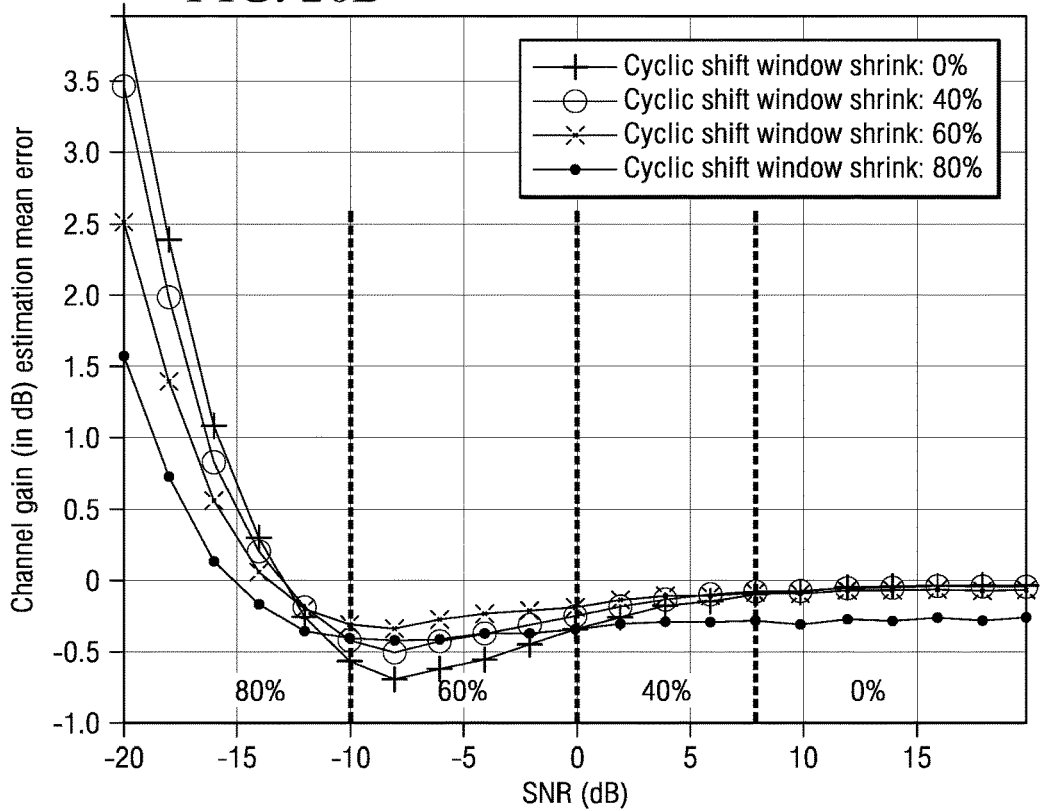
Figure 21A:
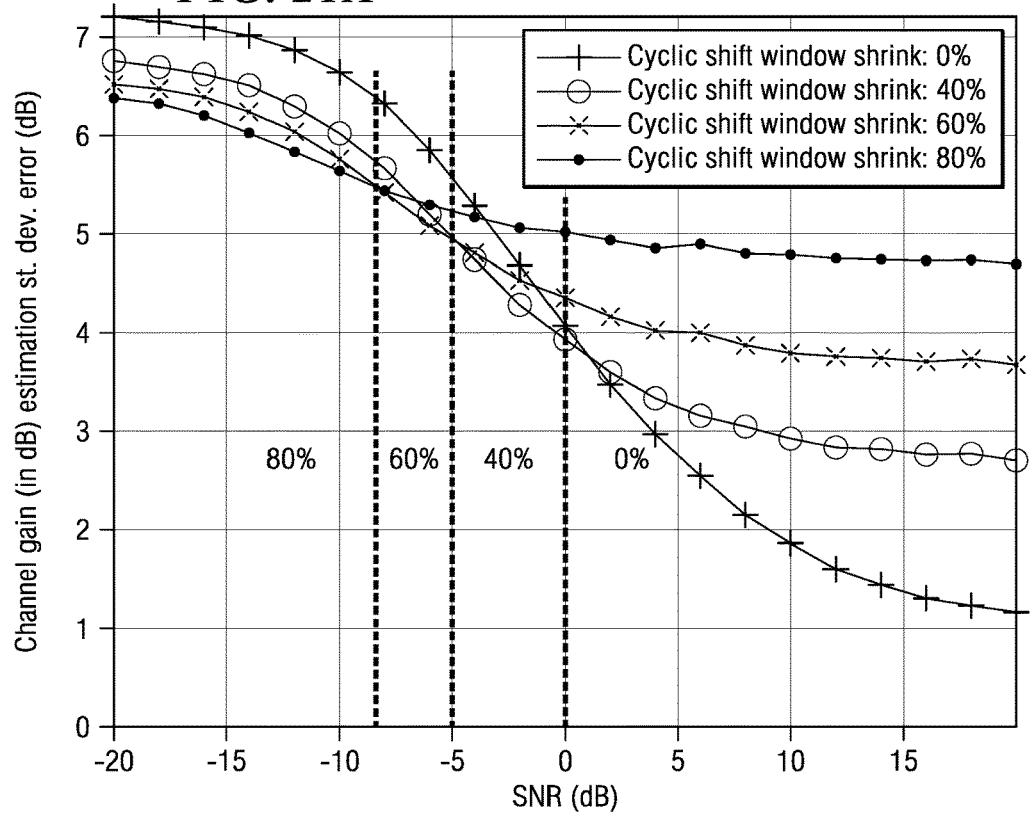
FIGS. 21A and 21B illustrate plots of the standard deviation of the channel gain estimator versus signal to noise ratio in dB.
Figure 21B:
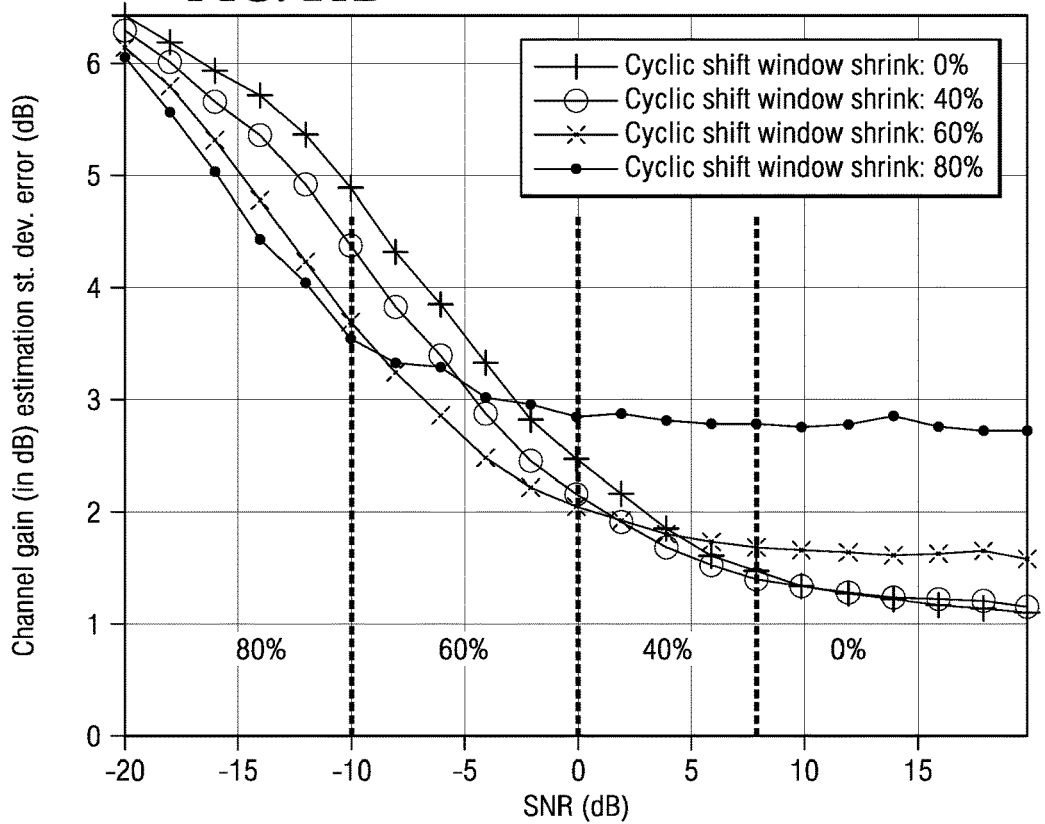

FIG. 20 illustrates plots of the mean errors of the channel gain estimator versus signal to noise ratio in dB. FIG. 20A is for the TU channel. FIG. 20B is for the PA channel. FIGS. 20A and 20B each show four curves: window shrink 0%; window shrink 40%; window shrink 60%; and window shrink 80%. FIG. 21 illustrates plots of the standard deviation of the channel gain estimator versus signal to noise ratio in dB. FIG. 21A is for the TU channel. FIG. 21B is for the PA channel. FIGS. 21A and 21B each show four curves: window shrink 0%; window shrink 40%; window shrink 60%; and window shrink 80%. For MSE performance (FIG. 20) a 80% cyclic shift window shrink improves at low SNR the mean error by up to 2.1 and 2.5 dB for respective TU channel and PA channel. A 80% cyclic shift window shrink improves the standard deviation (FIG. 21) by 1 and 1.2 dB for respective TU channel and PA channel.

Figure 22A:
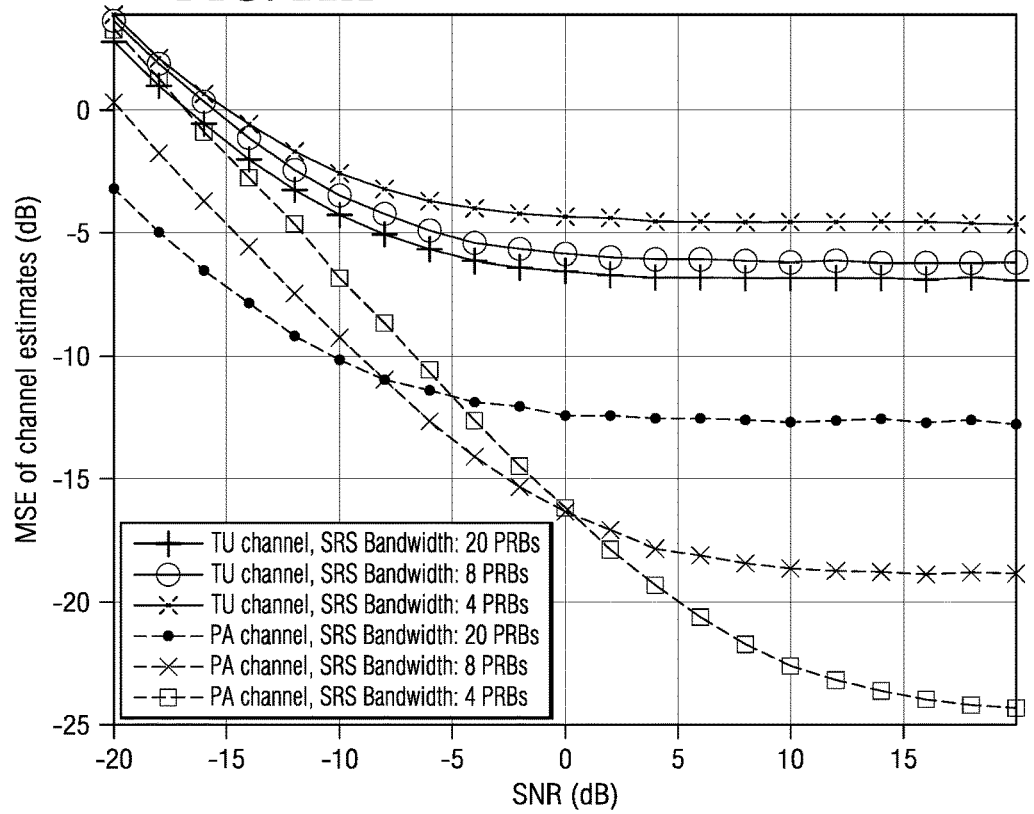
FIGS. 22A and 22B illustrate plots of the mean square error in channel estimate error versus signal to noise ratio for various conditions
Figure 22B:
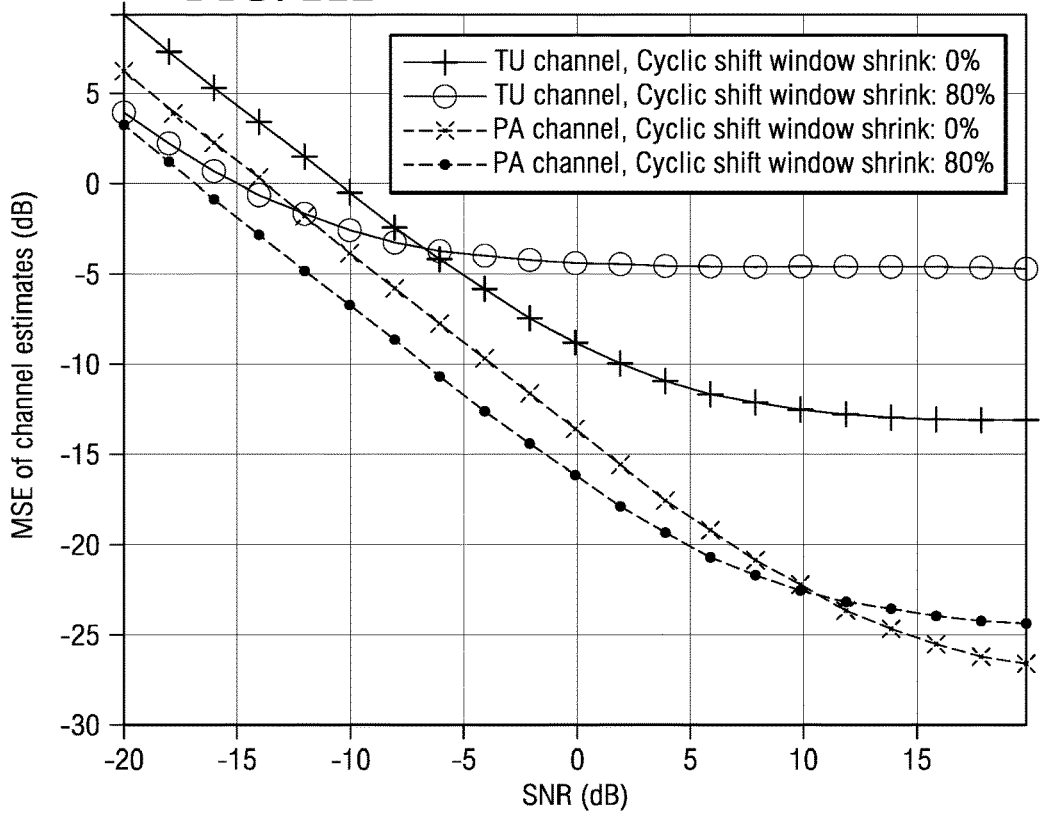
Figure 23A:
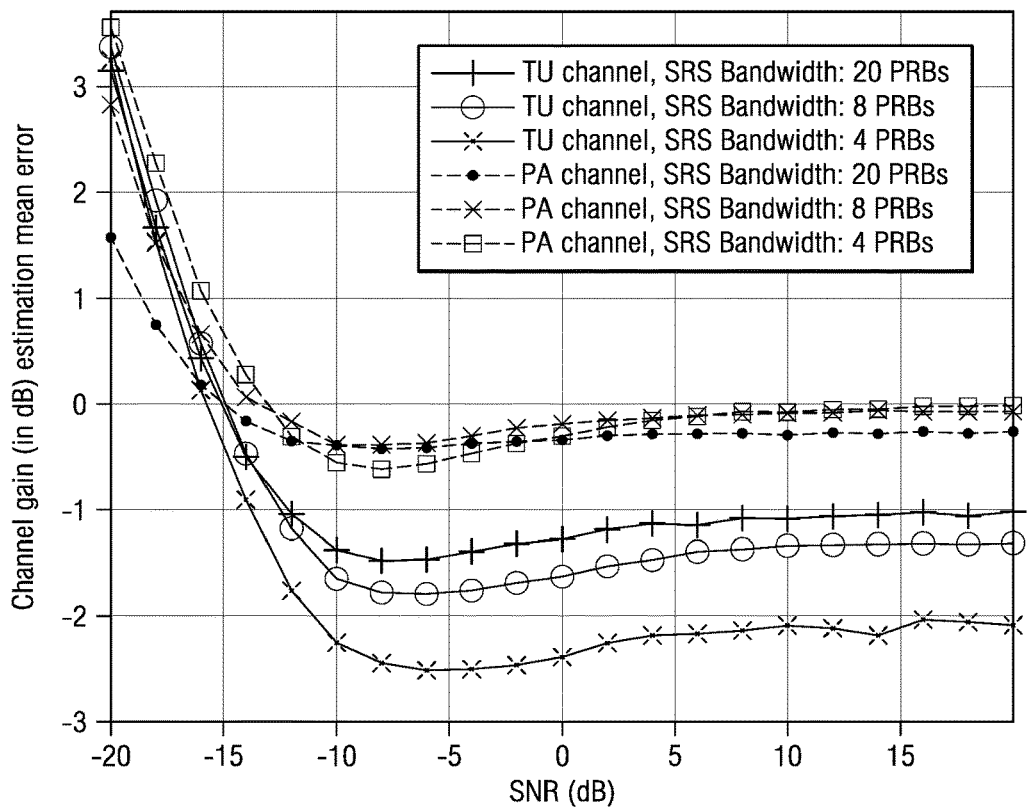
FIGS. 23A and 23B illustrate plots of the standard deviation in channel estimate error versus signal to noise ratio for various conditions.
Figure 23B:
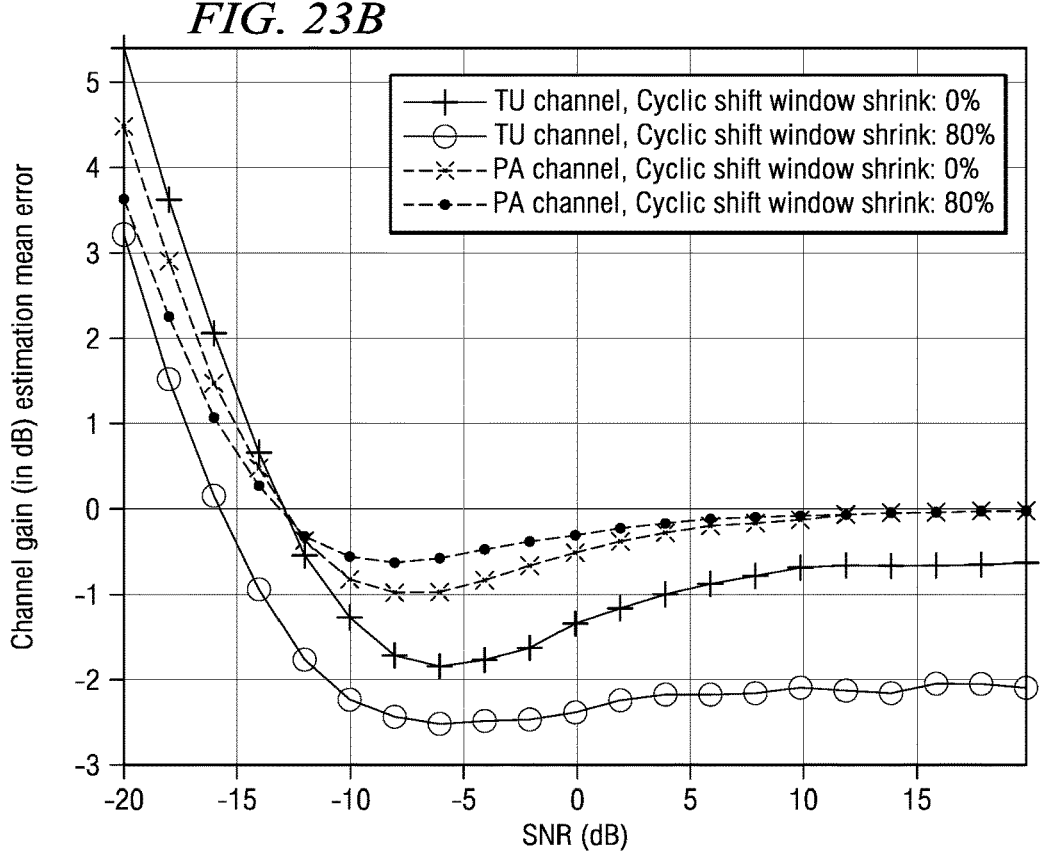
Figure 24A:
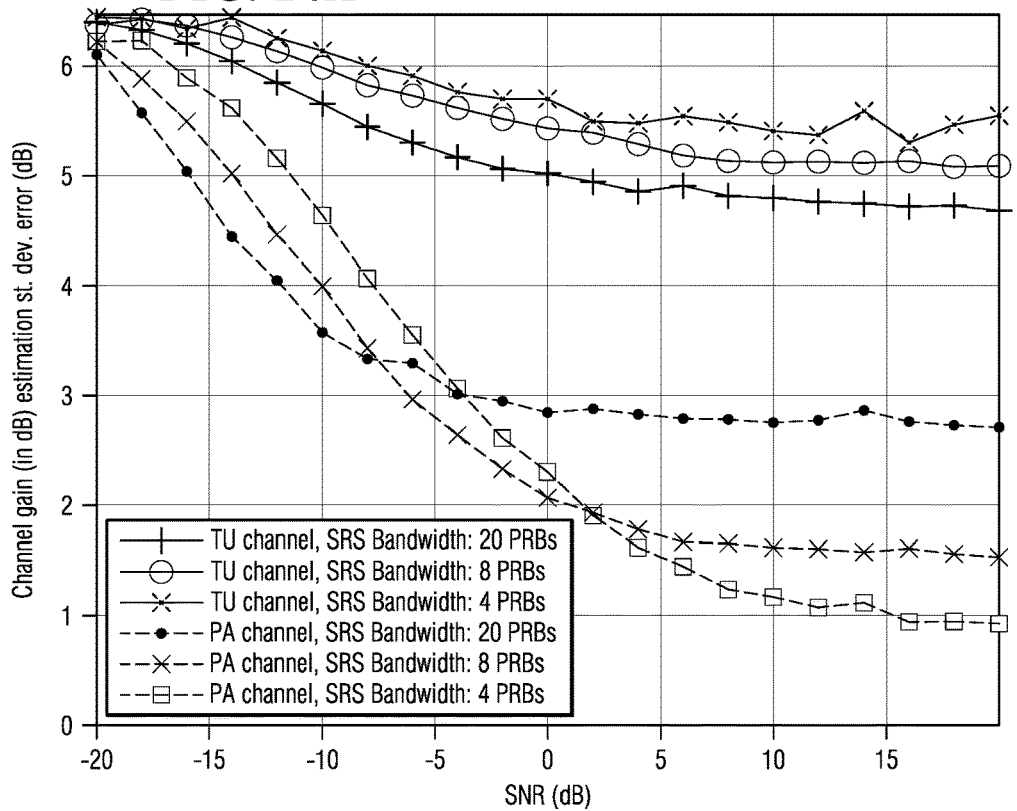
FIGS. 24A and 24B illustrate plots of the standard deviation of the channel gain estimator versus signal to noise ratio in dB.
Figure 24B:
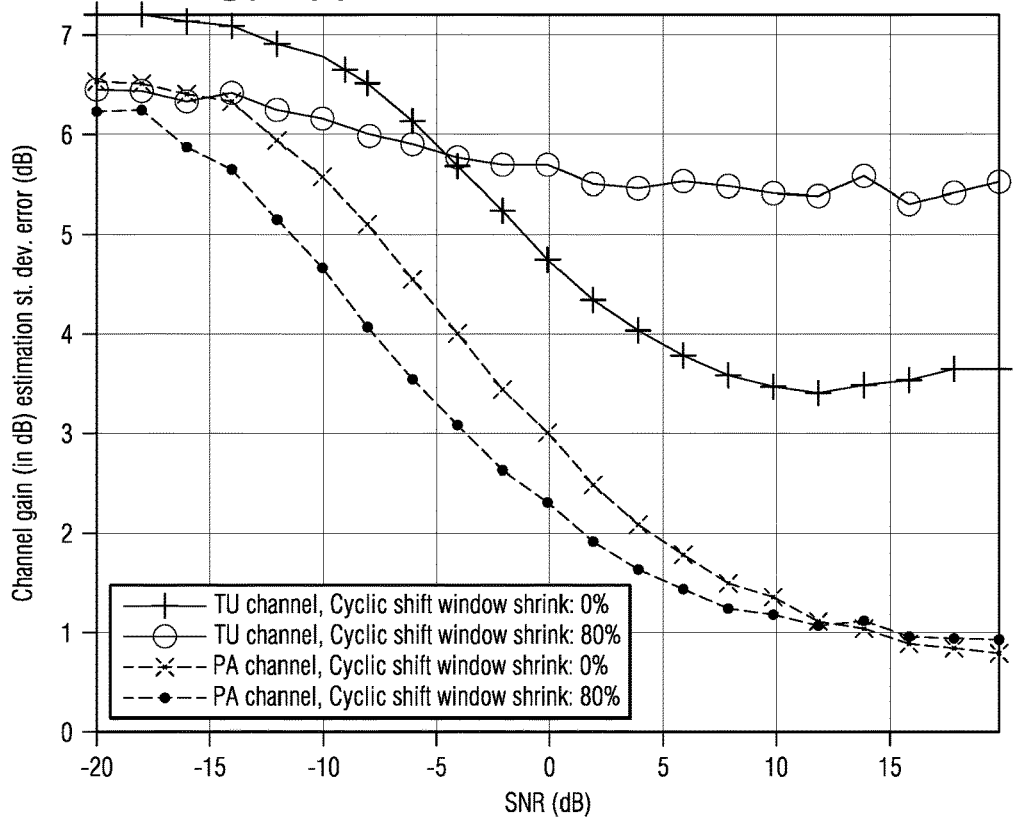

This method provides the benefit of low complexity but is sensitive to the granularity of the time samples $n_1(u), \ldots, n_L(u)$ of the user's delay profile, the SRS bandwidth. It is clear from Table 1 that some SRS bandwidth configurations lead to such small number L of samples in the cyclic shift window that shrinking further this value will lead to more distortion errors. FIGS. 21, 22 and 23 check the impact of the SRS bandwidth (4, 8 and 20 PRBs) on the cyclic shift window shrink performance. FIG. 21 illustrates plots of the standard deviation in the channel gain estimator error versus signal to noise ratio in dB. FIG. 21A is for the TU channel. FIG. 21B is for the PA channel. FIGS. 21A and 21B each show four curves: window shrink 0%; window shrink 40%; window shrink 60%; and window shrink 80%. FIG. 22 illustrates plots of the mean square error in channel estimate error versus signal to noise ratio for various conditions. FIG. 22A includes six curves for a window shrink of 80%: TU channel with an SRS bandwidth of 20 PRBs; TU channel with an SRS bandwidth of 8 PRBs; TU channel with an SRS bandwidth of 4 PRBs; PA channel with an SRS bandwidth of 20 PRBs; PA channel with an SRS bandwidth of 8 PRBs; and PA channel with an SRS bandwidth of 4 PRBs. FIG. 22B includes 4 curves for a SRS bandwidth of 4 PRBs: TU channel with a window shrink of 0%; TU channel with a window shrink of 80%; PA channel with a window shrink of 0%; and PA channel with a window shrink of 80%. FIG. 23 illustrates plots of the standard deviation in channel estimate error versus signal to noise ratio for various conditions. FIG. 23A includes six curves for a window shrink of 80%: TU channel with an SRS bandwidth of 20 PRBs; TU channel with an SRS bandwidth of 8 PRBs; TU channel with an SRS bandwidth of 4 PRBs; PA channel with an SRS bandwidth of 20 PRBs; PA channel with an SRS bandwidth of 8 PRBs; and PA channel with an SRS bandwidth of 4 PRBs. FIG. 23B includes 4 curves for a SRS bandwidth of 4 PRBs: TU channel with a window shrink of 0%; TU channel with a window shrink of 80%; PA channel with a window shrink of 0%; and PA channel with a window shrink of 80%. As can be seen from FIGS. 21A, 22A and 23A where an 80% shrink is applied, at low SNR where it is the most useful, the SRS bandwidth has negligible impact on the noise reduction performance for the TU channel. It is more important for PA channel due to already small cyclic shift window (Table 3). At 4 PRB SRS bandwidth (FIGS. 21B, 22B and 23B) the low end SNR PA channel performance is degraded to such extend that it becomes aligned with the TU channel performance. This should be compared though with the 4 PRB SRS performance without cyclic shift window shrink. FIGS. 21B, 22B and 23B show the noise reduction gain resulting from 80% cyclic shift window shrink is preserved, compared to that achieved with 20 PRB SRS. Thus there is better performance in the PA channel with smaller bandwidths at high SNR. This is due to the very limited channel variation of PA across such small bandwidths. Therefore, the per-subcarrier channel estimation matches more easily the actual channel.

Figure 25:
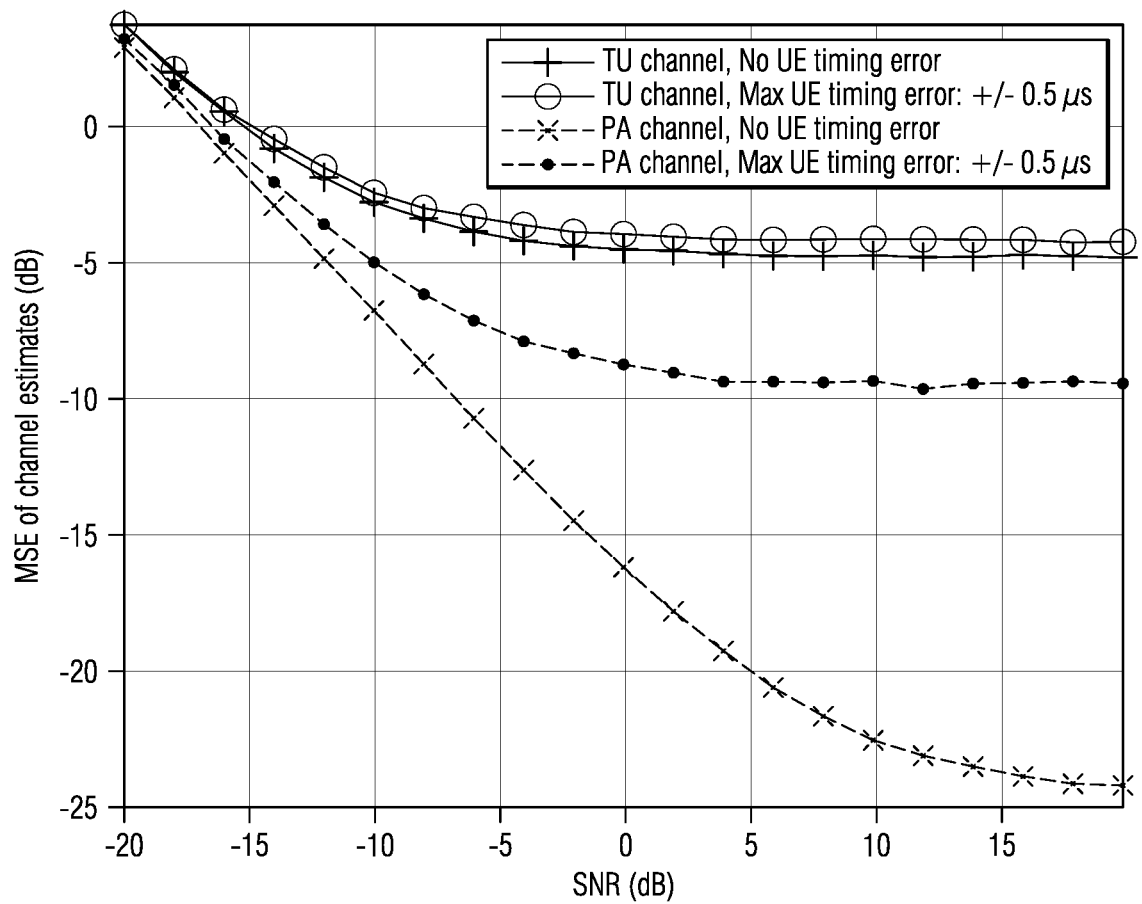
FIG. 25 illustrates mean square error of channel estimates for 4-PRB SRS bandwidth and 80% cyclic shift window shrink versus signal to noise ratio.
Figure 26A:
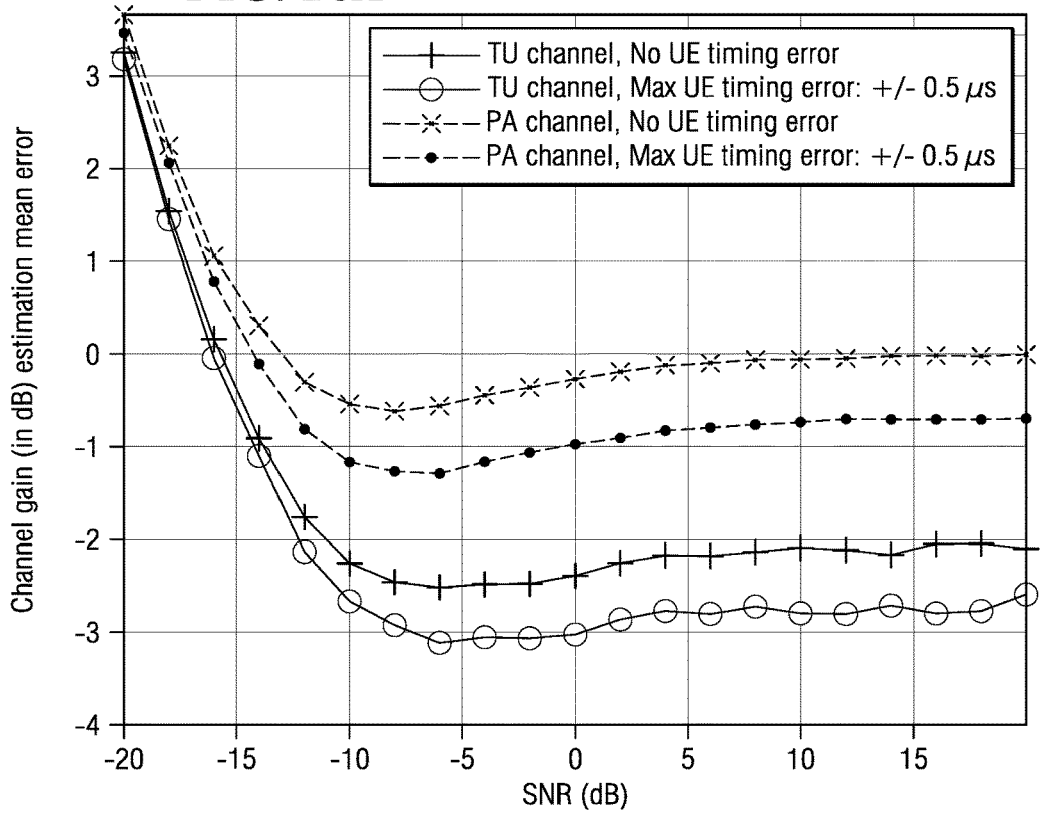
FIGS. 26A and 26B illustrate channel gain estimation mean error (FIG. 26A) and standard deviation channel gain estimation error (FIG. 26B) versus signal to noise ratio.
Figure 26B:
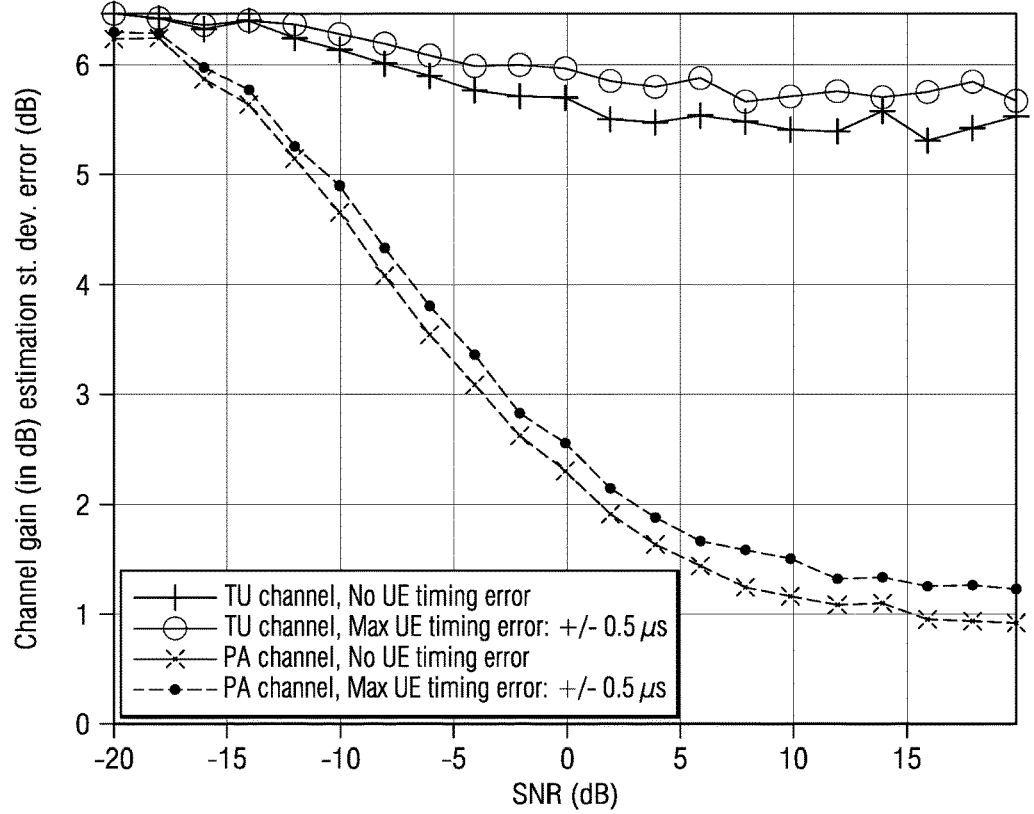

Shrinking the cyclic shift window makes the estimator less robust to timing errors perhaps requiring compensating them before channel estimation. FIGS. 25 and 26 illustrate the impact of a ±0.5 µS timing error on the channel and channel gain estimation performances on the worst-case configuration for this noise reduction technique. FIG. 25 illustrates mean square error of channel estimates for 4-PRB SRS bandwidth and 80% cyclic shift window shrink versus signal to noise ratio. FIG. 25 includes four curves: TU channel with no timing error; TU channel with ±0.5 µS timing error; PA channel with no timing error; and PA channel with ±0.5 µS timing error. FIG. 26 illustrates channel gain estimation mean error (FIG. 26A) and standard deviation channel gain estimation error (FIG. 26B) versus signal to noise ratio. FIGS. 26A and 26B each include four curves: TU channel with no timing error; TU channel with ±0.5 µS timing error; PA channel with no timing error; and PA channel with ±0.5 µS timing error. As shown in FIGS. 25 and 26 for a ±0.5 µS timing error the granularity of the TA command is expected to be the maximum residual timing error from the closed-loop UL timing synchronization procedure. At low SNR where it is the most useful (less than −10 dB, see Table 5) the timing errors have negligible impact on the noise reduction performance for both the TU channel and the PA channel.

Combined Cyclic Shift Window Shrink and LMS Filtering

Figure 27:
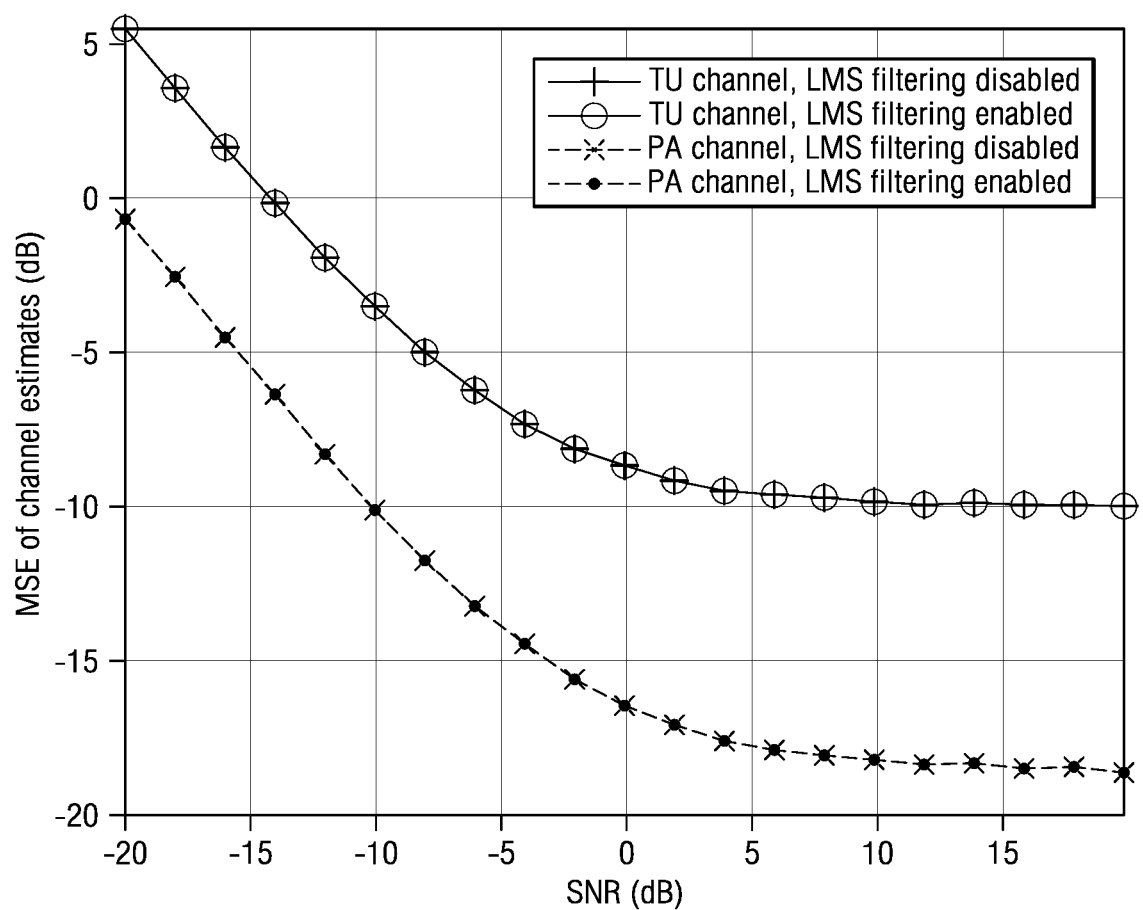
FIG. 27 illustrates plots of mean square error in channel estimation versus signal to noise ratio with and without least mean squared filtering.
Figure 28A:
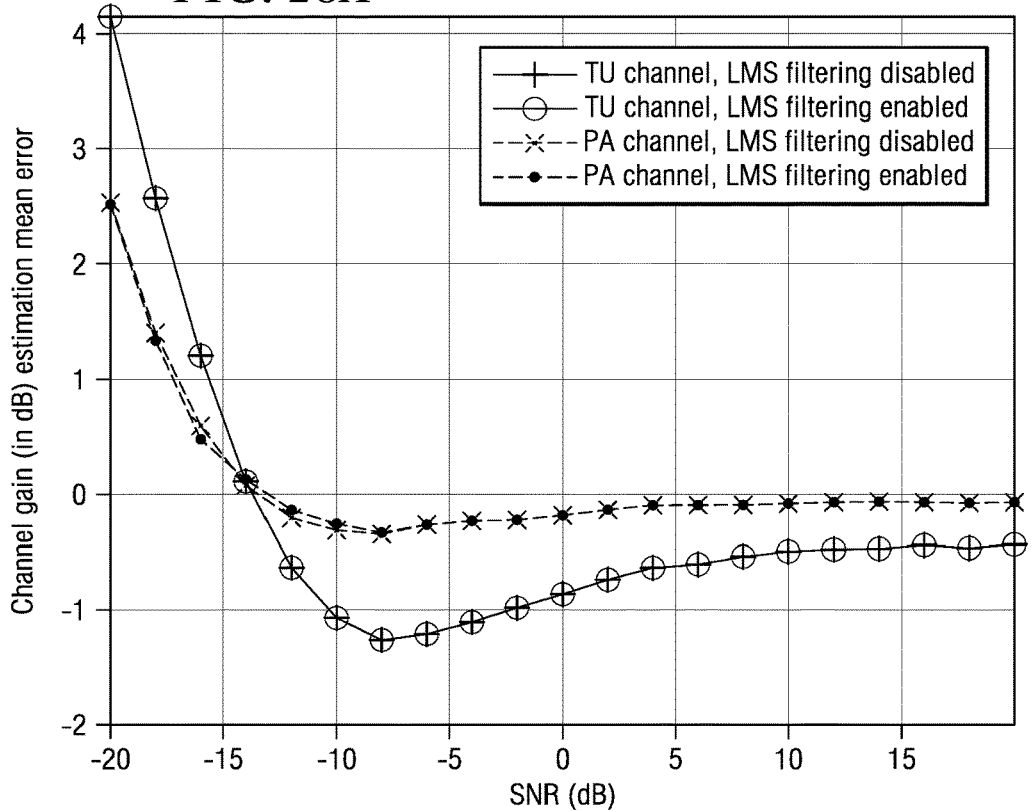
FIGS. 28A and 28B illustrate the mean channel gain estimation error (FIG. 28A) and standard deviation of the channel gain estimation error (FIG. 28B) versus signal to noise ratio in dB for various LMS techniques.
Figure 28B:
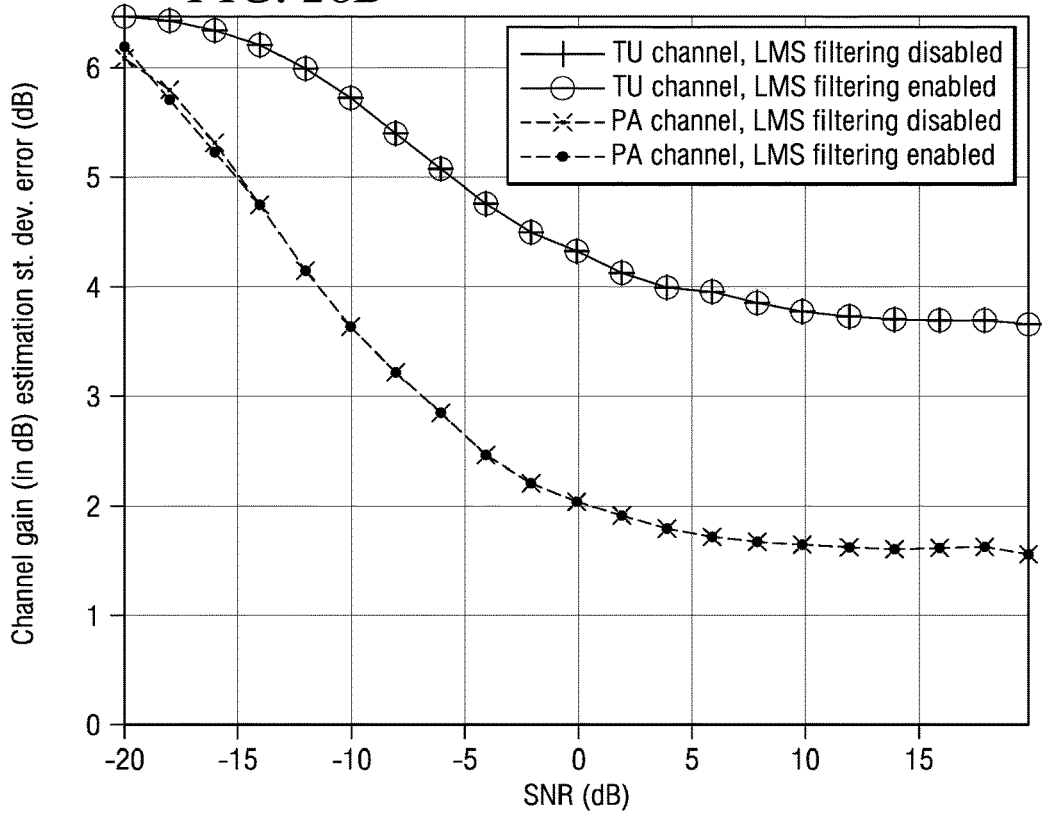

FIGS. 27 and 28 illustrate whether both noise reduction techniques gains could be cumulated. FIGS. 27 and 28 provide channel estimation performances when an 80% shrink is applied to the cyclic shift window. FIG. 27 illustrates plots of mean square error in channel estimation versus signal to noise ratio with and without least mean squared filtering. FIG. 27 illustrates four curves: TU channel without LMS filtering; TU channel with LMS filtering; PA channel without LMS filtering; and PA channel with LMS filtering. FIG. 28 illustrates the mean channel gain estimation error (FIG. 28A) and standard deviation of the channel gain estimation error (FIG. 28B) versus signal to noise ratio in dB for various LMS techniques for the TU channel and the PA channel. FIG. 16 includes curves for: TU channel without LMS filtering; TU channel with LMS filtering; PA channel without LMS filtering; and PA channel with LMS filtering. FIGS. 27 and 28 illustrate that enabling or disabling LMS equalization on top does not have any impact on performance. Thus these two techniques are not cumulative and should be used separately.

Noise Reduction Techniques Summary

FIGS. 27 and 28 show that noise reduction techniques should be used selectively depending on the SNR region. Some rough a-priori knowledge of the UE geometry should be assumed. This knowledge can be derived from either long term SNR tracking for each UE or preliminary instantaneous SNR estimation. Given the higher complexity of the latter option requiring multiple channel estimation steps (preliminary, final), the former approach is preferrable. The SNR regions boundaries are channel or delay spread specific. The eNB should track each user's delay spread for this purpose. Table 5 summarizes the performance comparison between both noise reduction techniques and shows that the cyclic shift window shrink outperforms the LMS filtering. From a complexity view point, the LMS filter is also more costly. This makes the cyclic shift window shrink the best option for noise reduction.

TABLE 5

| NOISE REDUCTION TECHNIQUE | LMS FILTERING | | CYCLIC SHIFT WINDOW SHRINK | |
|---|---|---|---|---|
| Channel Model | TU | PA | TU | PA |
| Channel estimation MSE | 3 dB | 3 dB | 6 dB | 6 dB |
| Channel gain mean error | 2 dB | 1.2 dB | 2.1 dB | 2.5 dB |
| Channel gain standard deviation | 1 dB | 0.5 dB | 1 dB | 1.2 dB |

Channel and Channel Gain Estimation Summary

Figure 29A:
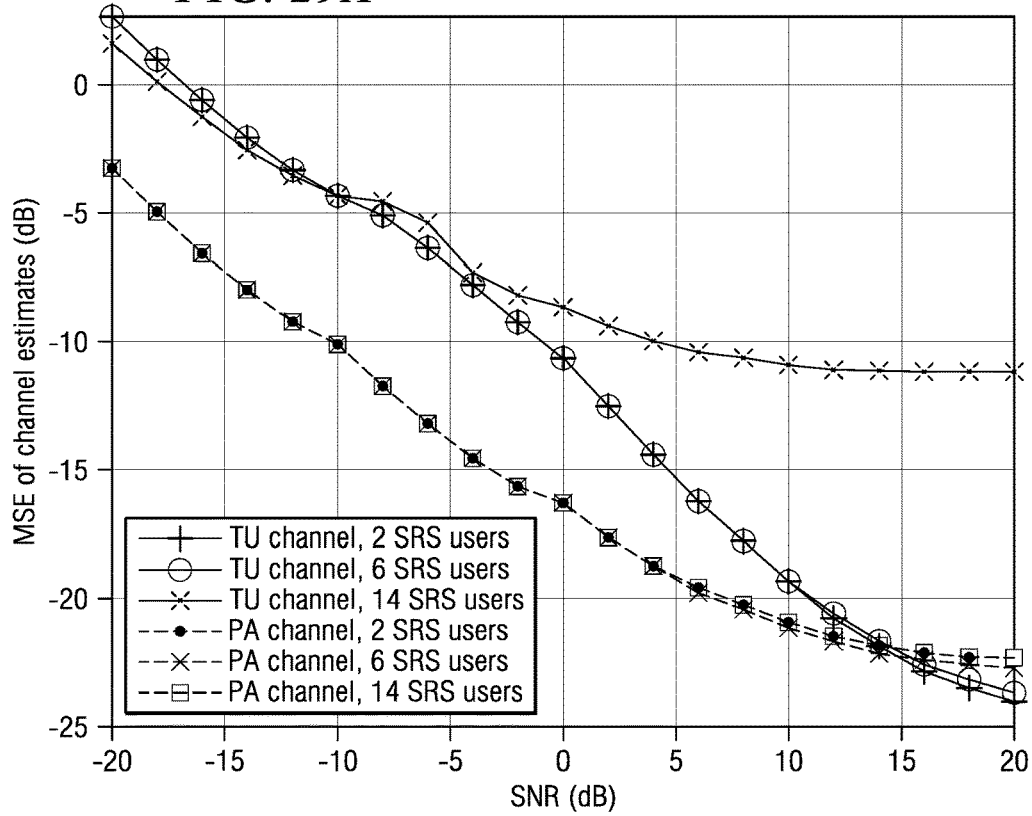
FIGS. 29A and 29B illustrate the mean square error of channel estimation versus signal to noise ratio for various number of SRS users for 20-PRB SRS bandwidth (FIG. 29A) and for 6 TU channel users and 14 PA channel users (FIG. 29B)
Figure 29B:
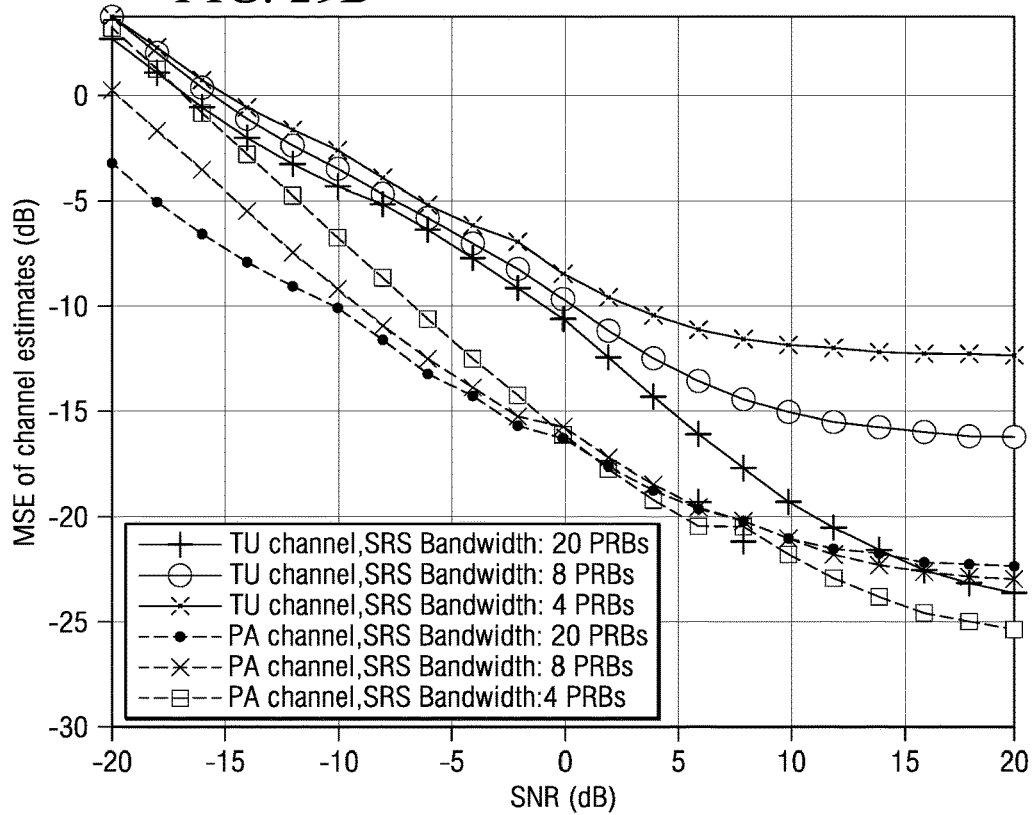
Figure 30A:
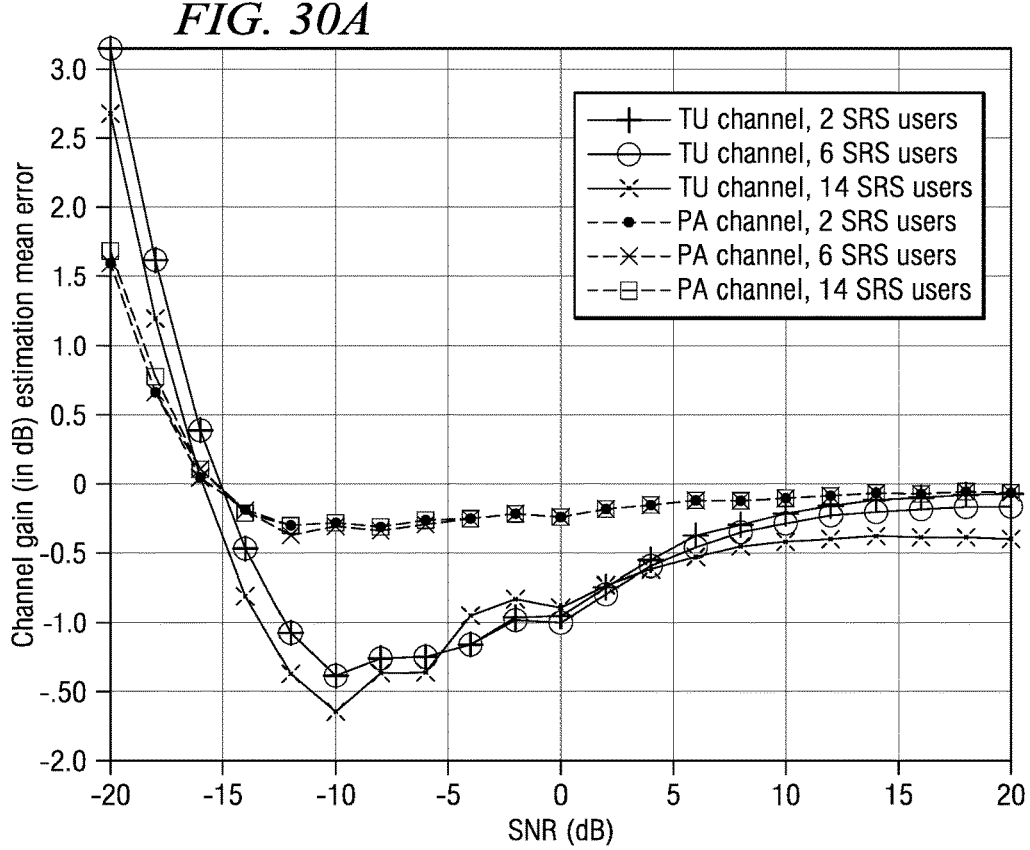
FIGS. 30A and 30B illustrate the channel gain estimation mean error versus signal to noise ratio for various number of SRS users for 20-PRB SRS bandwidth (FIG. 30A) and for 6 TU channel users and 14 PA channel users (FIG. 30B)
Figure 30B:
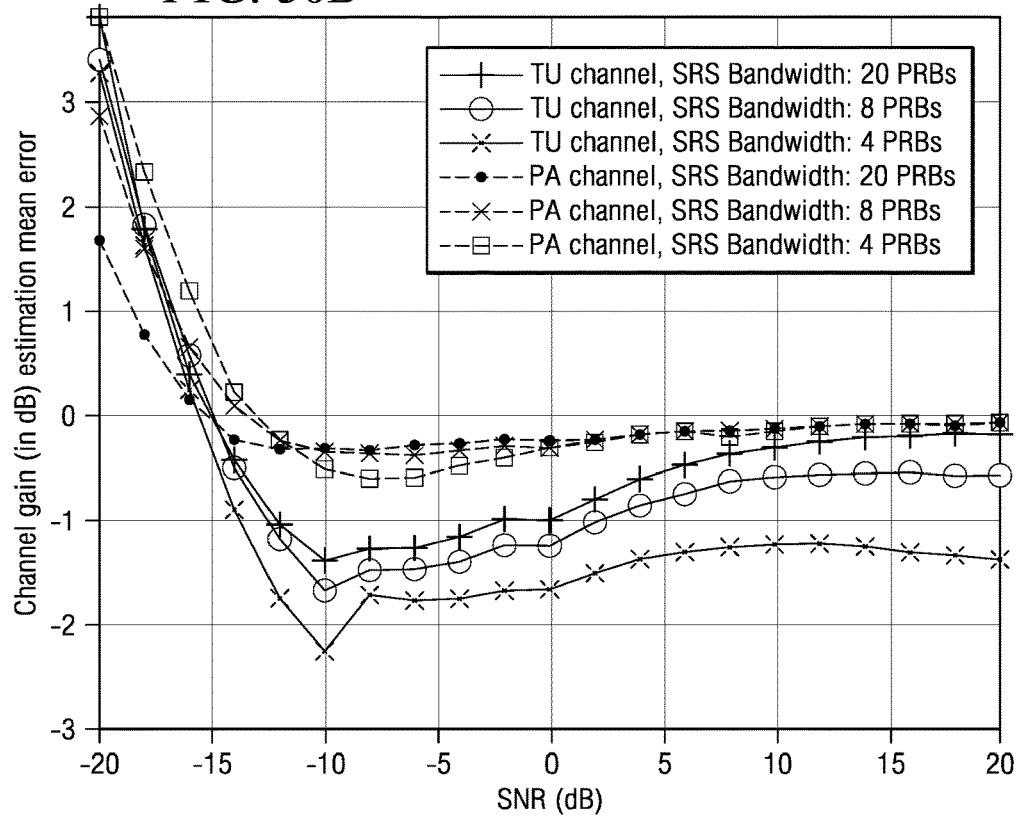
Figure 31A:
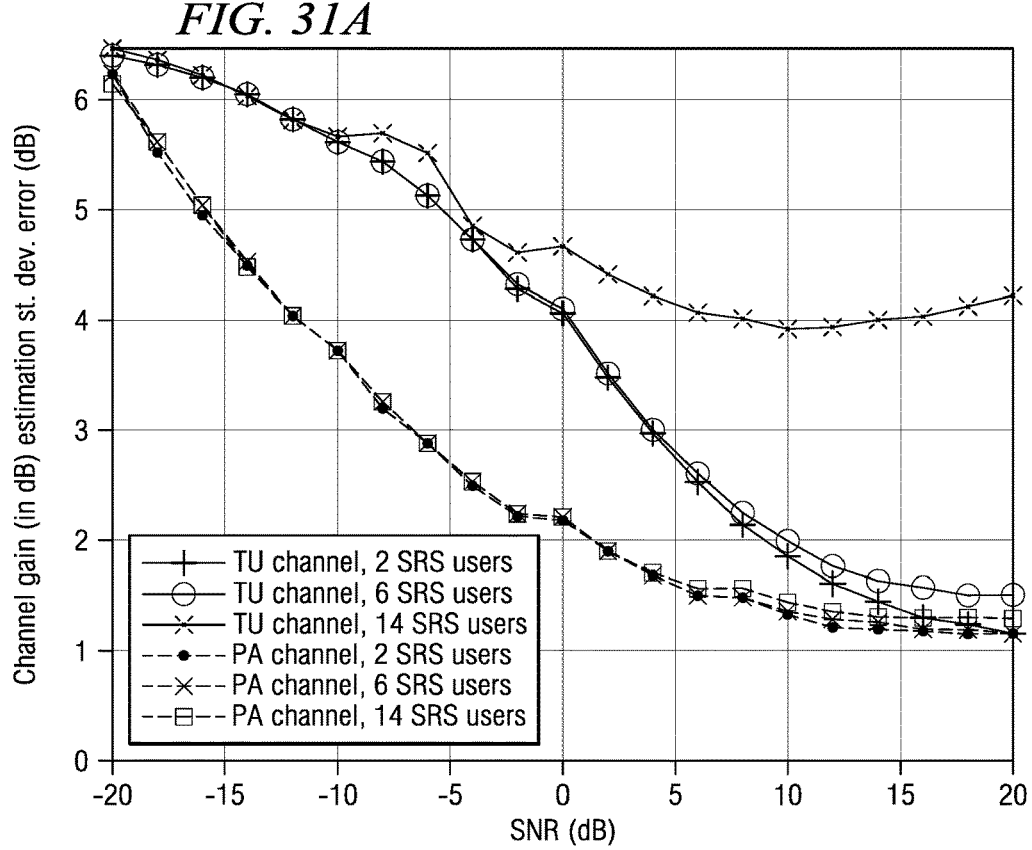
FIGS. 31A and 31B illustrate the channel gain estimation standard deviation versus signal to noise ratio for various number of SRS users for 20-PRB SRS bandwidth (FIG. 31A) and for 6 TU channel users and 14 PA channel users (FIG. 31B)
Figure 31B:
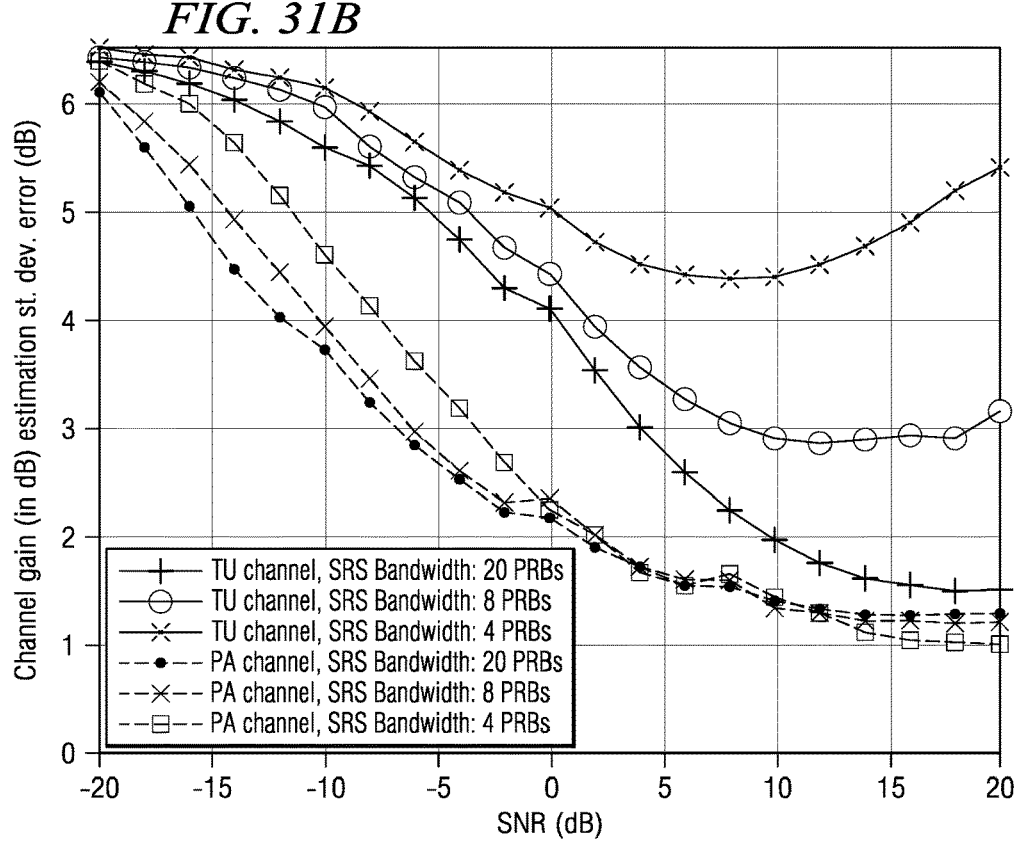

FIGS. 29 to 31 provide a comprehensive set of channel and channel gain performance plots with TU and PA channels for varying numbers of SRS users and the bandwidth. Since one cyclic shift is reserved for noise variance estimation for each SRS comb, the remaining number of multiplexed users per SRS symbol is 2, 3 and 14 with 2, 4 and 8 cyclic shifts per comb respectively. FIG. 29 illustrates the mean square error of channel estimation versus signal to noise ratio for various number of SRS users for 20-PRB SRS bandwidth (FIG. 29A) and for 6 TU channel users and 14 PA channel users (FIG. 29B). FIG. 29A has six curves: TU channel and 2 SRS users; TU channel and 6 SRS users; TU channel and 14 SRS users; PA channel and 2 SRS users; PA channel and 6 SRS users; PA channel and 14 SRS users. FIG. 29B has 6 curves: TU channel with an SRS bandwidth of 20 PRBs; TU channel with an SRS bandwidth of 8 PRBs; TU channel with an SRS bandwidth of 4 PRBs; PA channel with an SRS bandwidth of 20 PRBs; PA channel with an SRS bandwidth of 8 PRBs; and PA channel with an SRS bandwidth of 4 PRBs. FIG. 30 illustrates the channel gain estimation mean error versus signal to noise ratio for various number of SRS users for 20-PRB SRS bandwidth (FIG. 30A) and for 6 TU channel users and 14 PA channel users (FIG. 30B). FIG. 30A has six curves: TU channel and 2 SRS users; TU channel and 6 SRS users; TU channel and 14 SRS users; PA channel and 2 SRS users; PA channel and 6 SRS users; PA channel and 14 SRS users. FIG. 30B has 6 curves: TU channel with an SRS bandwidth of 20 PRBs; TU channel with an SRS bandwidth of 8 PRBs; TU channel with an SRS bandwidth of 4 PRBs; PA channel with an SRS bandwidth of 20 PRBs; PA channel with an SRS bandwidth of 8 PRBs; and PA channel with an SRS bandwidth of 4 PRBs. FIG. 31 illustrates the channel gain estimation standard deviation versus signal to noise ratio for various number of SRS users for 20-PRB SRS bandwidth (FIG. 31A) and for 6 TU channel users and 14 PA channel users (FIG. 31B). FIG. 31A has six curves: TU channel and 2 SRS users; TU channel and 6 SRS users; TU channel and 14 SRS users; PA channel and 2 SRS users; PA channel and 6 SRS users; PA channel and 14 SRS users. FIG. 31B has 6 curves: TU channel with an SRS bandwidth of 20 PRBs; TU channel with an SRS bandwidth of 8 PRBs; TU channel with an SRS bandwidth of 4 PRBs; PA channel with an SRS bandwidth of 20 PRBs; PA channel with an SRS bandwidth of 8 PRBs; and PA channel with an SRS bandwidth of 4 PRBs. This assumes that: noise reduction from cyclic shift window truncation with SNR-based selective truncation is according to Table 4; and the Channel gain estimator in dB scale, with a clipping threshold $G_{floor}$ of −20 dB for negative gain avoidance.

FIGS. 29 to 31 show that TU channel error floors occur with 14 SRS users or at small bandwidth. This is due to truncated delay spread (14 SRS users) or channel band-pass filtering at small bandwidth due to down sampling at de-mapping/IDFT stage. With the PA channel, the delay spread is small enough to prevent from strong co-cyclic-shift interference, even with 16 users per symbol and down to 4-PRB bandwidth.

SNR Estimation

This section studies the impact of both noise and channel gain estimators previously described on the signal over noise ratio (SNR) estimation in support of a scheduler. In the current description the focus is upon the SNR. The simulations modeled the thermal noise component. It is expected that interference from SRS users in other cells reflects the good cross-correlation characteristics of EZC sequences which can be approximated as Gaussian noise at first order.

SNR Expressions

The per sub-carrier SNR vector $\rho_{sc,p}$ experienced at eNB antenna port p is expressed as:

$$\rho_{sc,p} = \frac{H_p^2(a)}{\sigma_N^2} \quad (26)$$

where: $H_p^2(a)$ is an $N_{SRS}$ size vector reflecting the channel gain experienced on antenna port p on the $N_{SRS}$ sub-carriers; $a^2$ is the averaged received power from the SRS user; and $\sigma_N^2$ is the variance of the AWGN sub-carriers samples. This SNR is then combined across antennas to provide the "MRC'ed" per sub-carrier SNR vector $$\rho_{sc} = (\rho_{f_1}, \rho_{f_2}, \ldots, \rho_{f_{N_{SRS}}})^T$$

as:

$$\rho_{sc} = \sum_{p=1}^{A} \rho_{sc,p} \quad (27)$$

where: A is the number of receive antennas; and $f_1, f_2, \ldots, f_{N_{SRS}}$ are the sub-carriers allocated to the SRS.

Practical MAC schedulers use larger than per-subcarrier SINR frequency granularity corresponding to the minimum frequency band of a user's allocation, referred to as scheduling, and defined in integer number $N_{RB}$ of PRBs. There are typically two methods for SINR computation depending on what type of scheduling unit scheduler supports: a fixed scheduling unit size, referred to as Fixed Transmission Bandwidth (FTB); or a variable scheduling unit size, referred to as Adaptive Transmission Bandwidth (ATB). For FTB, SINR is directly computed from per-subcarrier to per scheduling unit (1-step). ATB typically addresses Recursive Maximum Expansion (RME) scheduling algorithms where different winners can have different allocation sizes depending on the scheduling metric envelope shape. The envelope is computed with per-PRB granularity for the simplest RME algorithm. This results in computing the remaining averaging across PRBs only for the winners. In both cases, the short-term SINR per scheduling unit is computed by averaging $\rho_{sc}$ across the sub-carriers of the same scheduling unit, thus providing per scheduling unit effective SNR vector $$\rho_{eff-su} = (\rho_{eff,s_1}, \rho_{eff,s_2}, \ldots, \rho_{eff,s_{M_{SRS}}})^T$$

where; $s_1, s_2, \ldots, s_{M_{SRS}}$ are the $$M_{SRS} = \left\lfloor \frac{2N_{SRS}}{N_{sc}^{RB} N_{RB}} \right\rfloor$$

scheduling units in the SRS allocation. The averaging method depends on the OFDM access scheme and the type of equalizer used at the physical layer.

With the single carrier property of the UL transmission and when ZF equalization is implemented at the L1 receiver the effective SINR $\rho_{eff,s}^{ZF}$ across the $N_{sc}^{RB} N_{RB}/2$ consecutive sub-carriers of a scheduling unit s is computed as:

$$\rho_{eff,s}^{ZF} = \left( \frac{2}{N_{sc}^{RB} N_{RB}} \sum_{f=sN_{sc}^{RB} N_{RB}/2}^{(s+1)N_{sc}^{RB} N_{RB}/2} \frac{1}{\rho_f} \right)^{-1} \quad (28)$$

With the same transmission scheme but with MMSE equalization at the receiver, the effective SINR $\rho_{eff,s}^{MMSE}$ is computed through harmonic averaging as:

$$\rho_{eff,s}^{MMSE} = \left[ \left( \frac{2}{N_{sc}^{RB} N_{RB}} \sum_{f=sN_{sc}^{RB} N_{RB}/2}^{(s+1)N_{sc}^{RB} N_{RB}/2} \frac{\rho_f}{1+\rho_f} \right)^{-1} - 1 \right]^{-1} = \quad (29)$$

$$\left( \frac{2}{N_{sc}^{RB} N_{RB}} \sum_{f=sN_{sc}^{RB} N_{RB}/2}^{(s+1)N_{sc}^{RB} N_{RB}/2} \frac{1}{1+\rho_f} \right)^{-1} - 1$$

Given MMSE is the most popular receiver for SC-FDMA, this invention only considers $\rho_{eff,s}^{MMSE}$.

Performance of SNR Estimators

The performance of the per-subcarrier SNR estimators $\hat{\rho}_{sc-gen,p}$ and $\hat{\rho}_{sc,p}$ with genie-aided and real AWGN variance estimation are respectively:

$$\begin{cases} \hat{\rho}_{sc-gen,p} = \frac{\hat{H}_p^2(a)}{\sigma_N^2}; \hat{\rho}_{sc-gen} = \sum_{p=1}^{A} \hat{\rho}_{sc-gen,p} \\ \hat{\rho}_{sc,p} = \frac{\hat{H}_p^2(a)}{\hat{\sigma}_N^2}; \hat{\rho}_{sc} = \sum_{p=1}^{A} \hat{\rho}_{sc,p} \end{cases} \quad (30)$$

The channel gain estimate $\hat{H}_p^2(a)$ is given by Equation (16) with a clipping threshold $G_{floor}$ of −20 dB for negative gain avoidance and noise reduction from cyclic shift window truncation with selective truncation according to Table 4. Noise variance estimate $\hat{\sigma}_N^2$ is given by Equation (18). In simulations the measured mean (bias) and centered standard deviation performance of the above estimators, expressed in dB are:

$$\begin{cases} m_{\rho_{sc-gen,p}} = E\{(\hat{\rho}_{sc-gen,p})_{dB} - (\rho_{sc-gen,p})_{dB}\}; & \sigma_{\rho_{sc-gen,p}} = \sqrt{E\{[(\hat{\rho}_{sc-gen,p})_{dB} - (\rho_{sc-gen,p})_{dB} - m_{\rho_{sc-grn,p}}^2]^2\}} \\ m_{\rho_{sc-gen}} = E\{(\hat{\rho}_{sc-gen})_{dB} - (\rho_{sc-gen})_{dB}\}; & \sigma_{\rho_{sc-gen}} = \sqrt{E\{[(\hat{\rho}_{sc-gen})_{dB} - (\rho_{sc-gen})_{dB} - m_{\rho_{sc-gen}}^2]^2\}} \\ m_{\rho_{sc,p}} = E\{(\hat{\rho}_{sc,p})_{dB} - (\rho_{sc,p})_{dB}\}; & \sigma_{\rho_{sc,p}} = \sqrt{E\{[(\hat{\rho}_{sc,p})_{dB} - (\rho_{sc,p})_{dB} - m_{\rho_{sc,p}}^2]^2\}} \\ m_{\rho_{sc}} = E\{(\hat{\rho}_{sc})_{dB} - (\rho_{sc})_{dB}\}; & \sigma_{\rho_{sc}} = \sqrt{E\{[(\hat{\rho}_{sc})_{dB} - (\rho_{sc})_{dB} - m_{\rho_{sc}}^2]^2\}} \end{cases} \quad (31)$$

Figure 32A:
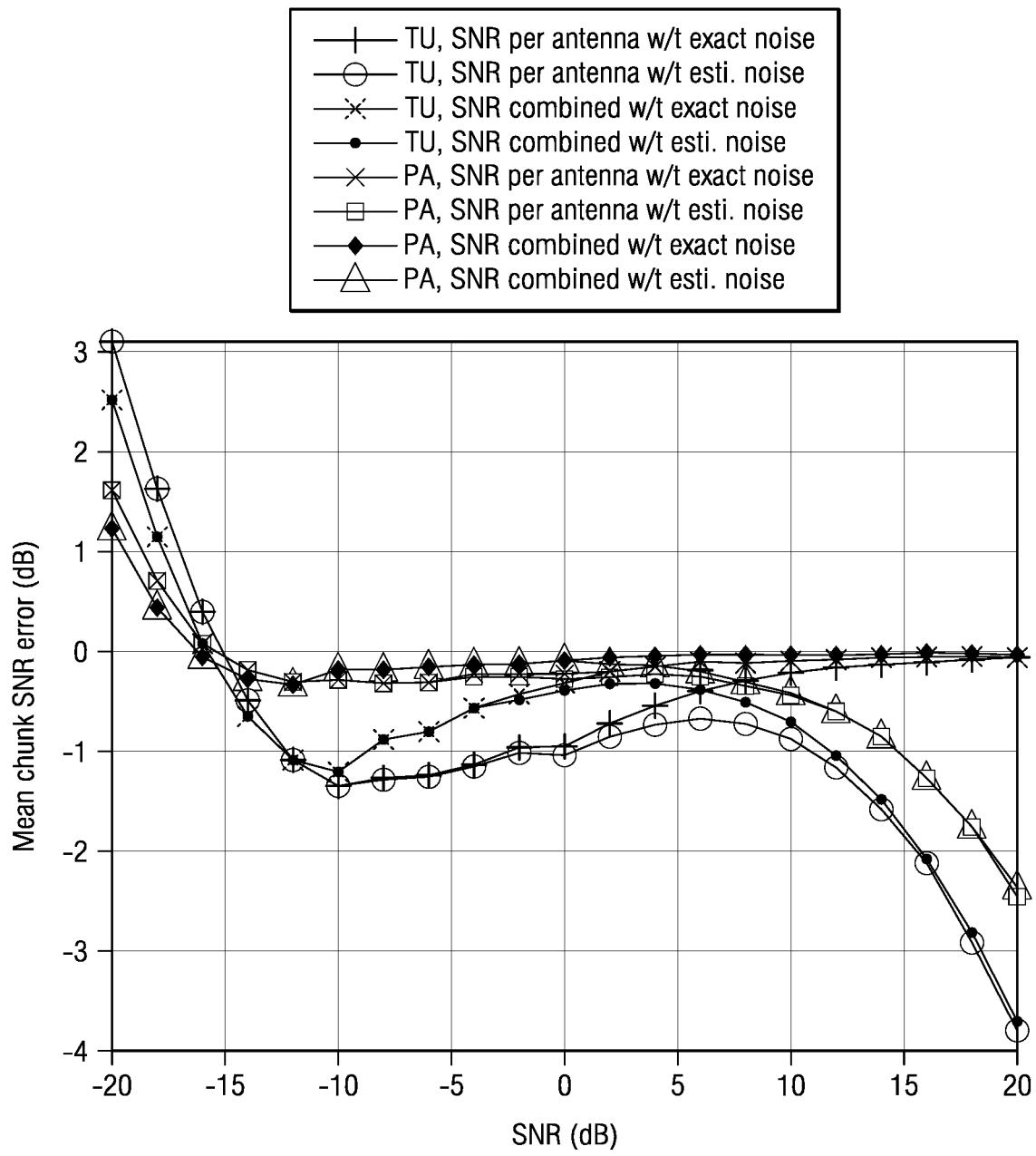
FIGS. 32A and 32B show mean signal to noise error (FIG. 32A) and standard deviation of the signal to noise error (FIG. 32B) versus signal to noise ratio for various conditions with 20 PRB SRS bandwidth and 2 SRS users per symbol.
Figure 32B:
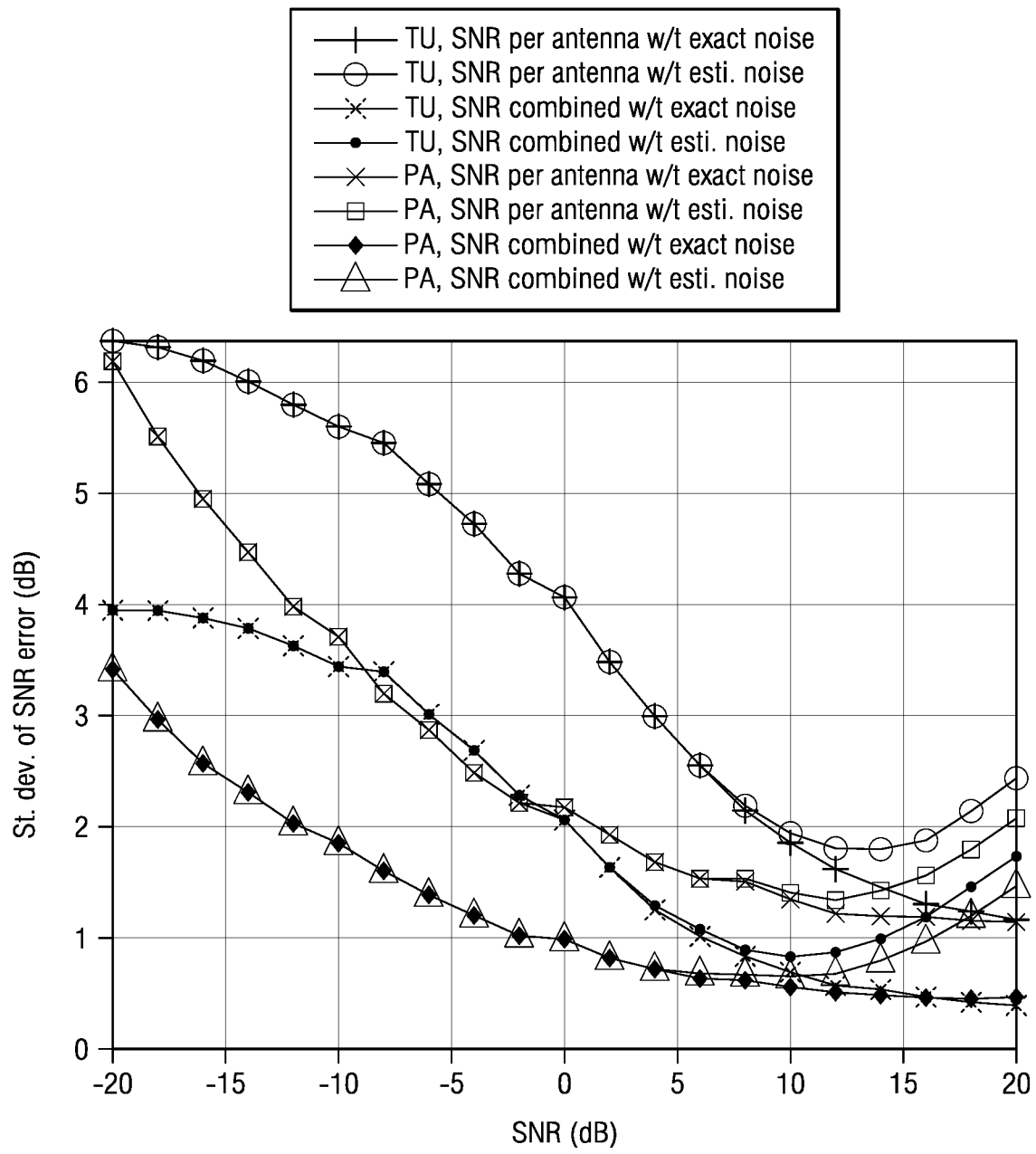

FIG. 32 shows the per-subcarrier SNR estimators performance for both TU and PA channels for 20-PRB SRS bandwidth and when running 2 SRS users per symbol. FIG. 32 shows mean signal to noise error (FIG. 32A) and standard deviation of the signal to noise error (FIG. 32B) versus signal to noise ratio for various conditions with 20 PRB SRS bandwidth and 2 SRS users per symbol. FIGS. 32A and 32B each show eight curves: TU channel SNR per antenna with exact noise; TU channel SNR per antenna with estimated noise; TU channel SNR combined with exact noise; TU channel SNR combined with estimated noise; PA channel SNR per antenna with exact noise; PA channel SNR per antenna with estimated noise; PA channel SNR combined with exact noise; and PA channel SNR combined with estimated noise.

FIG. 32 shows that for low SNR, the per-antenna SNR estimation performance is very much in line with the channel gain performance. This confirms the good performance of the noise variance estimator. At high SNR, the noise variance estimate bias and large standard deviation due to co-channel interference creates both a bias and a standard deviation rise on the SNR estimates. The SNR estimation in support of a scheduler will rather use noise and interference estimation from the DMRS rather than the SRS. This is because it is more representative of the noise and interference experienced by PUSCH. Therefore, this is not a major issue and this invention uses ideal noise estimates in the following SNR performance investigations.

The expected SNR estimation standard deviation improvement when combining the estimates across antennas is 2 to 2.5 dB.

The performance of the per-chunk SNR estimators $\hat{\rho}_{ch-H}$ and $\hat{\rho}_{ch-A}$ with harmonic and arithmetic averaging is respectively:

$$\hat{\rho}_{ch-H} = \left( \frac{2}{N_{sc}^{RB} N_{RB}} \sum_{f=sN_{sc}^{RB} N_{RB}/2}^{(s+1)N_{sc}^{RB} N_{RB}/2} \frac{1}{1+\hat{\rho}_{sc-gen}(f)} \right)^{-1} - 1 \quad (32)$$

-continued $$\hat{\rho}_{ch-A} = \frac{2}{N_{sc}^{RB} N_{RB}} \sum_{f=sN_{sc}^{RB} N_{RB}/2}^{(s+1)N_{sc}^{RB} N_{RB}/2} \hat{\rho}_{sc-gen}(f) \quad (33)$$

From simulations the mean (bias) and centered standard deviation performance of the above estimators, expressed in dB is:

$$\begin{cases} m_{\rho_{ch-H}} = E\{(\hat{\rho}_{ch-H})_{dB} - (\rho_{ch-H})_{dB}\}; & \sigma_{\rho_{ch-H}} = \sqrt{E\{[(\hat{\rho}_{ch-H})_{dB} - (\rho_{ch-H})_{dB} - m_{\rho_{ch-H}}^2]^2\}} \\ m_{\rho_{ch-A}} = E\{(\hat{\rho}_{ch-A})_{dB} - (\rho_{ch-A})_{dB}\}; & \sigma_{\rho_{ch-A}} = \sqrt{E\{[(\hat{\rho}_{ch-A})_{dB} - (\rho_{ch-H})_{dB} - m_{\rho_{ch-A}}^2]^2\}} \end{cases} \quad (34)$$

Figure 33A:
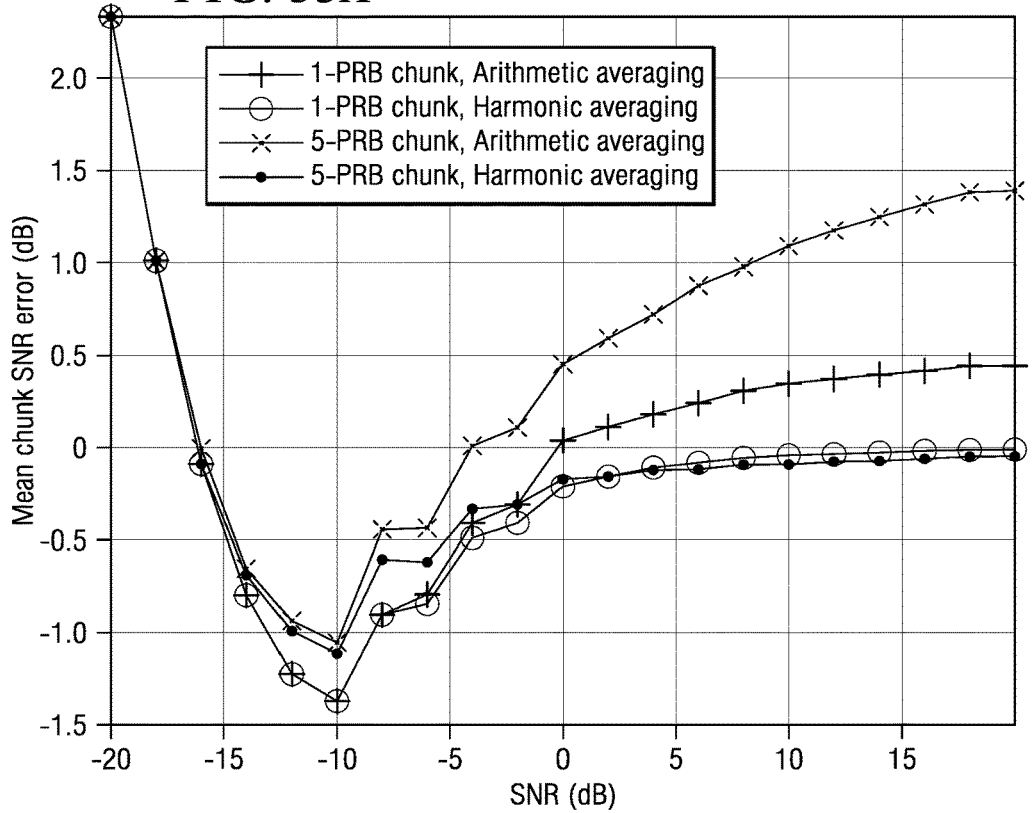
FIGS. 33A and 33B are the mean chuck SNR error versus signal to noise ratio for various chunk averaging.
Figure 33B:
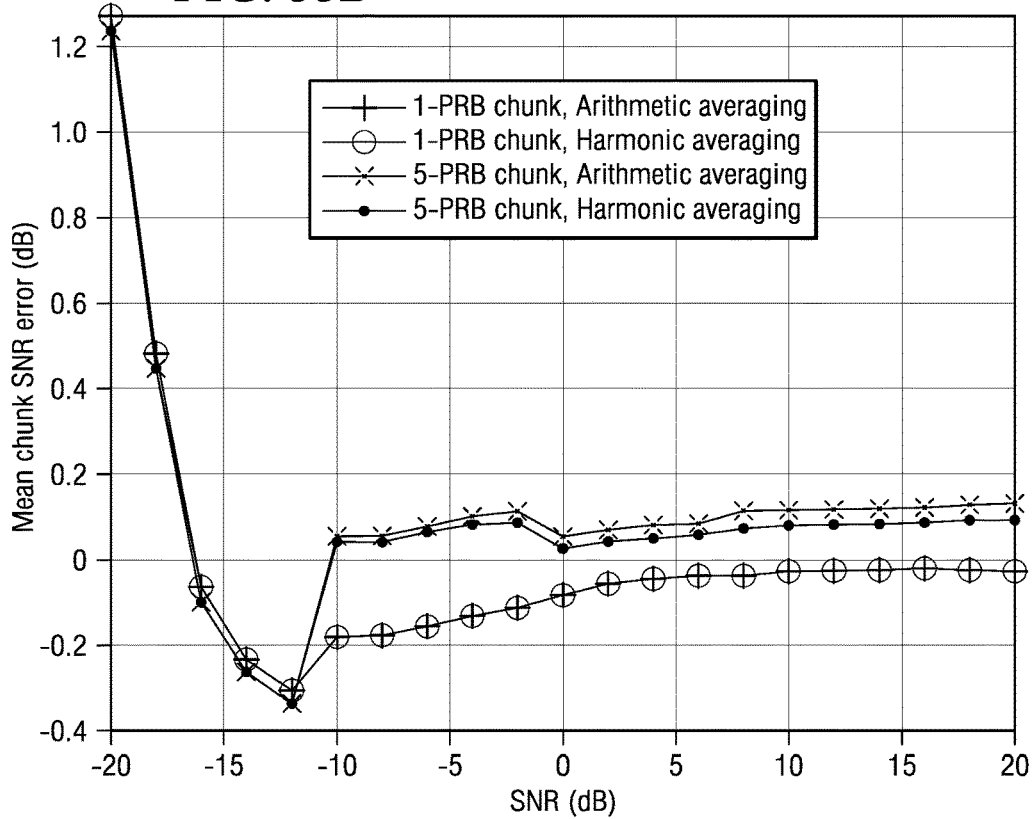
Figure 34A:
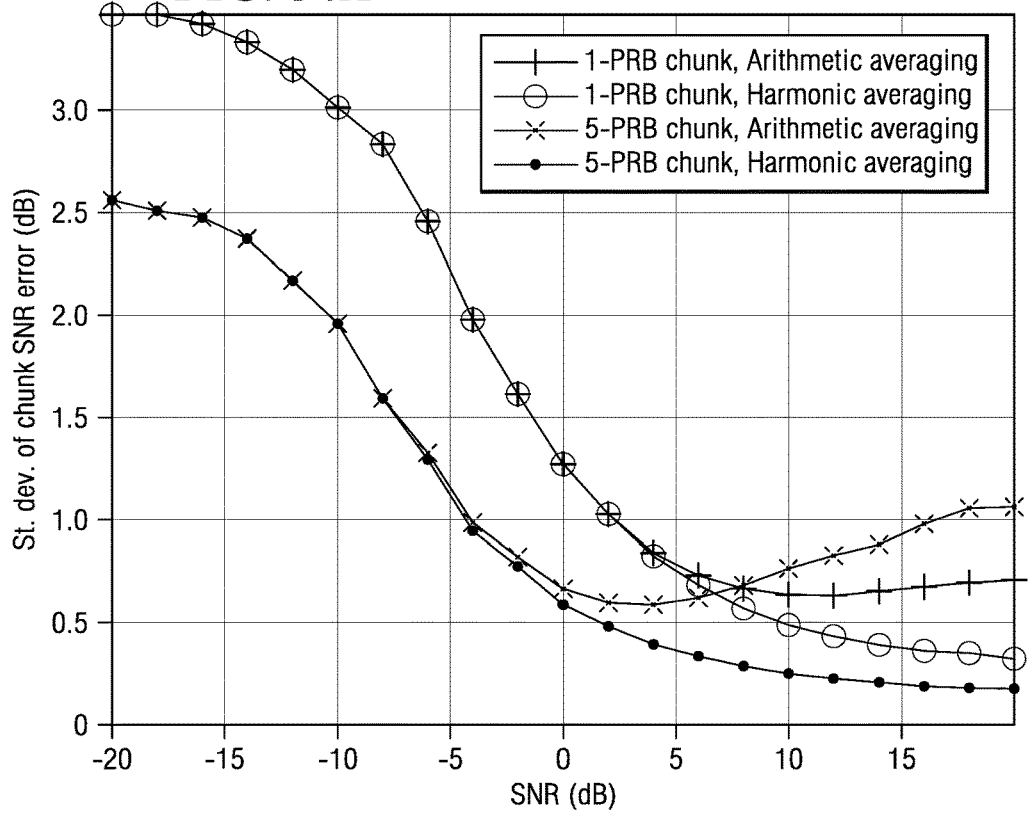
FIGS. 34A and 34B are the standard deviation of the chuck SNR error versus signal to noise ratio for various chunk averaging, FIG. 34A in the TU channel.
Figure 34B:
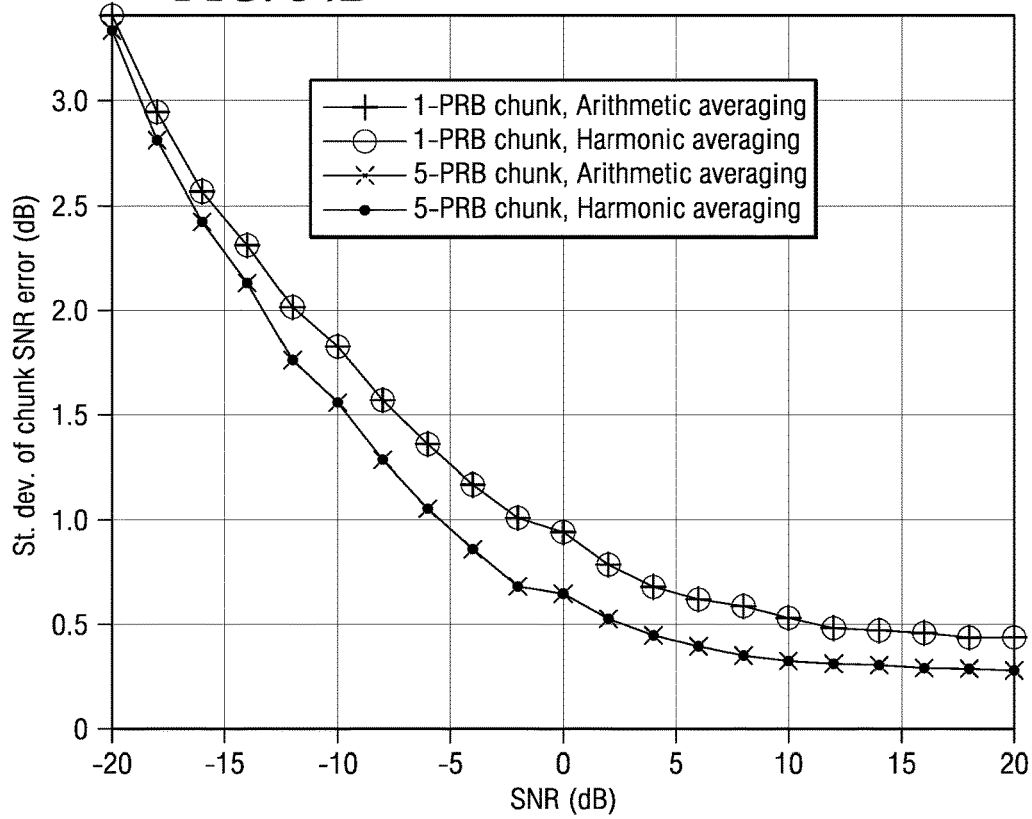

FIGS. 33 and 34 show the per-chunk SNR estimators performance for both the TU channel and the PA channels for 20-PRB SRS bandwidth and when running 2 SRS users per symbol. FIG. 33 is the mean chuck SNR error versus signal to noise ratio for various chunk averaging. FIG. 33A is the TU channel. FIG. 33B is the PA channel. FIGS. 33A and 33B each have four curves: 1 PRB chunk arithmetic averaging; 1 PRB chunk harmonic averaging; 5 PRB chunk arithmetic averaging; and 5 PRB chunk harmonic averaging. FIG. 34 is the standard deviation of the chunk SNR error versus signal to noise ratio for various chunk averaging. FIG. 34A in the TU channel. FIG. 34B is the PA channel. FIGS. 34A and 33B each have four curves: 1 PRB chunk arithmetic averaging; 1 PRB chunk harmonic averaging; 5 PRB chunk arithmetic averaging; and 5 PRB chunk harmonic averaging.

FIGS. 33 and 34 illustrate that there is no difference between arithmetic and harmonic averaging on TU channel for UE geometry below −5 dB and −10 dB for 1-PRB and 5-PRB respectively. There is no difference at all either across the SNR range between arithmetic and harmonic averaging on PA channel. This is due to the flat behavior of PA channel across the averaged sub-carriers, in which case Equation (29) simplifies to an arithmetic mean. At high SNR, arithmetic averaging of TU channel has a bias error of 0.5 dB and 1.4 dB for 1-PRB and 5-PRB chunks respectively as well as a worse standard deviation performance with respect to harmonic averaging of 0.5 dB and 0.9 dB for 1-PRB and 5-PRB chunks respectively. Thus similarly to what was done for the channel gain estimation, harmonic or arithmetic averaging can be applied selectively depending on the UE's SNR. As for the SNR-based selective truncation, some rough a-priori knowledge of the UE geometry can be assumed sufficient to map the UE in either of the two SNR regions (high/low SNR) as per the thresholds noted above. The benefit of this is that the lower complexity arithmetic averaging can be used whenever possible.

FIGS. 33 and 34 also show the chunk-SNR estimation performance improves with the chunk size as more averaging is performed.

Sub-Carrier Decimation

Figure 35:
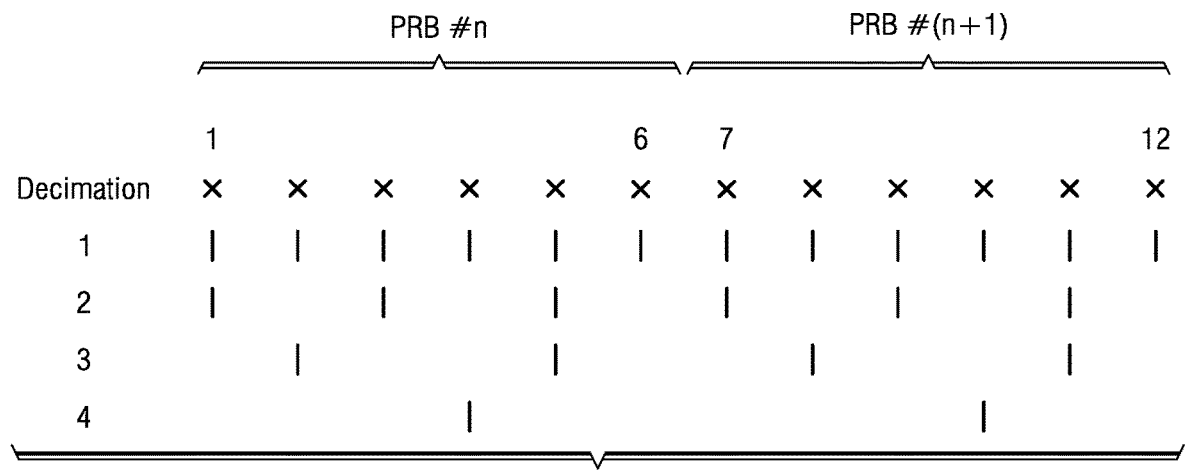
FIG. 35 illustrates decimated samples centered in the PRB.

Another important complexity reduction comes from the sub-carrier decimation that can be applied when computing per-chunk SNR. The performance loss when applying the three decimation factors possible with 6 SRS sub-carriers per PRB is expected as: 2, 3 and 6. In order to minimize the decimation error, the resulting decimated samples are centered in the PRB, as illustrated in FIG. 35.

Figure 36A:
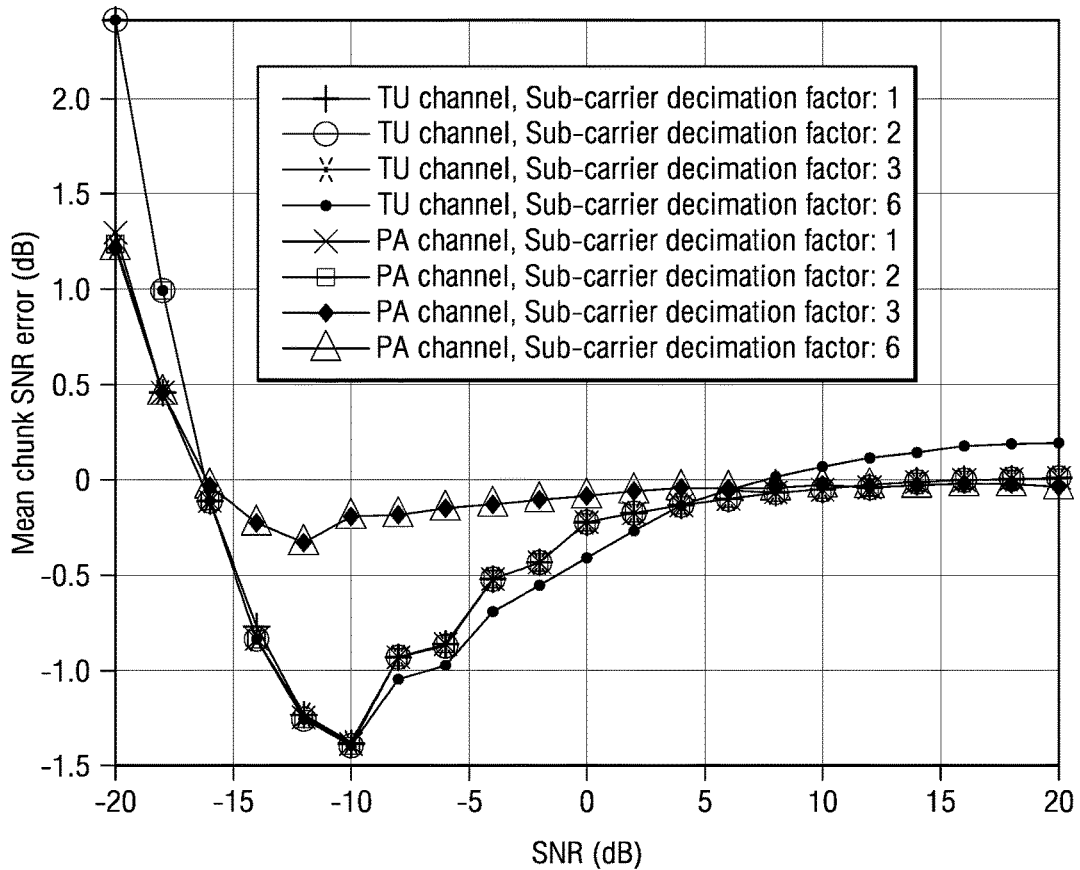
FIGS. 36A and 36B show the performance of the per-PRB SNR estimator $\hat{\rho}_{ch\text{-}H}$ (chunk size=1 PRB) when sub-carrier decimation is applied during the harmonic averaging, for 20-PRB SRS bandwidth and when running 6 and 14 SRS users per symbol for both the TU channel and the PA channel for mean chunk SNR error versus signal to noise ratio (FIG. 36A) and for the standard deviation of the chunk SNR error versus signal to noise ratio (FIG. 36B)
Figure 36B:
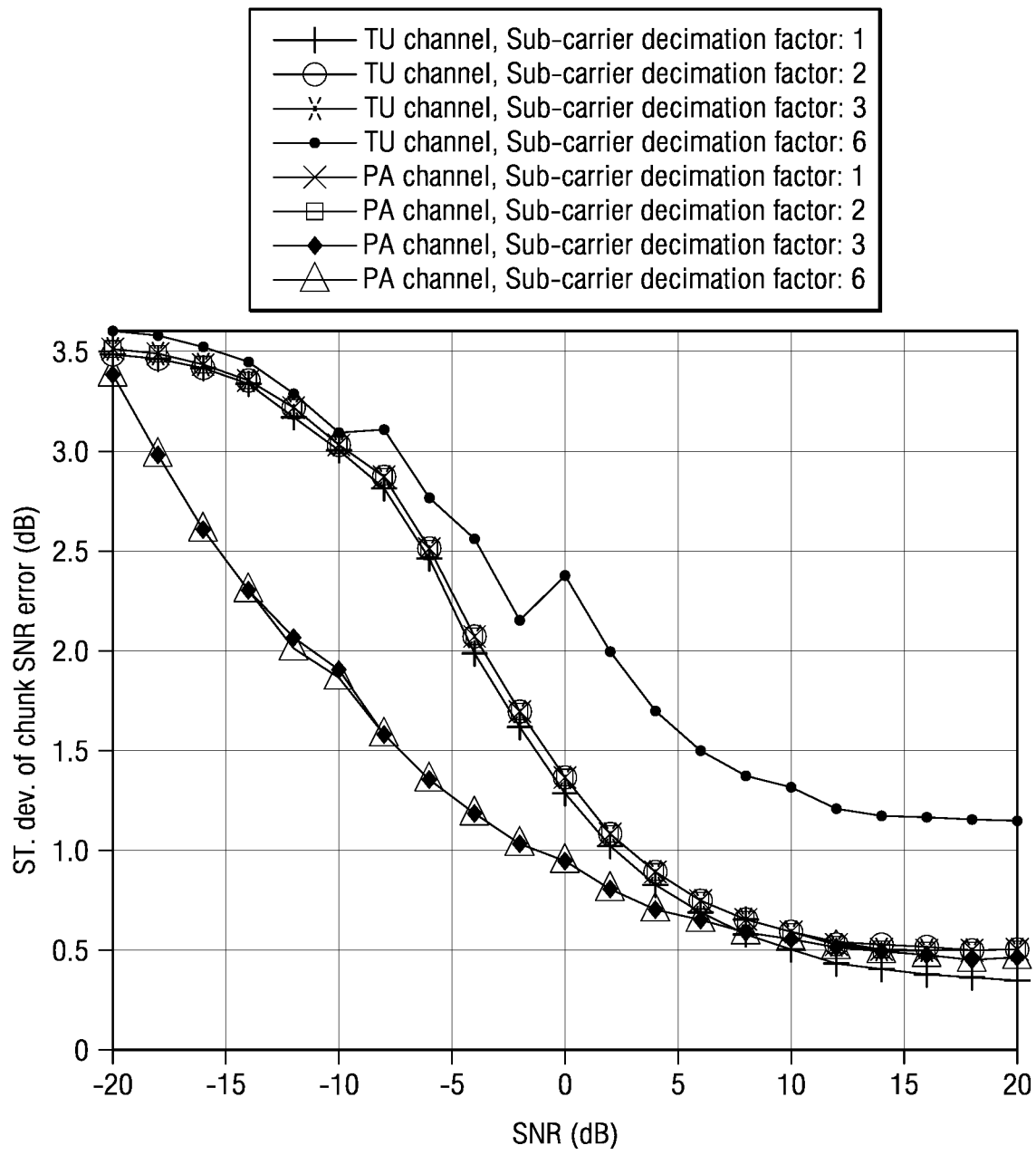

FIG. 36 shows the performance of the per-PRB SNR estimator $\hat{\rho}_{ch-H}$ (chunk size=1 PRB) when sub-carrier decimation is applied during the harmonic averaging, for 20-PRB SRS bandwidth and when running 6 and 14 SRS users per symbol for both the TU channel and the PA channel. FIG. 36A illustrates the mean chunk SNR error versus signal to noise ratio for various conditions. FIG. 36B illustrates the standard deviation of the chunk SNR error versus signal to noise ratio for various conditions. FIGS. 36A and 36B each have 8 curves: TU channel with a sub-carrier decimation factor of 1; TU channel with a sub-carrier decimation factor of 2; TU channel with a sub-carrier decimation factor of 3; TU channel with a sub-carrier decimation factor of 6; PA channel with a sub-carrier decimation factor of 1; PA channel with a sub-carrier decimation factor of 2; PA channel with a sub-carrier decimation factor of 3; and PA channel with a sub-carrier decimation factor of 6. FIG. 36 shows that a decimation factor of 6 (only one sub-carrier per PRB) should be precluded with TU channel. In all other cases, the performance degradation from decimation factors does not exceed 0.1 dB. Thus sub-carrier decimation factors of up to 3 and 6 can be applied when computing per-PRB SNR with TU and PA channels respectively.

SNR Performance Summary

Figure 37A:
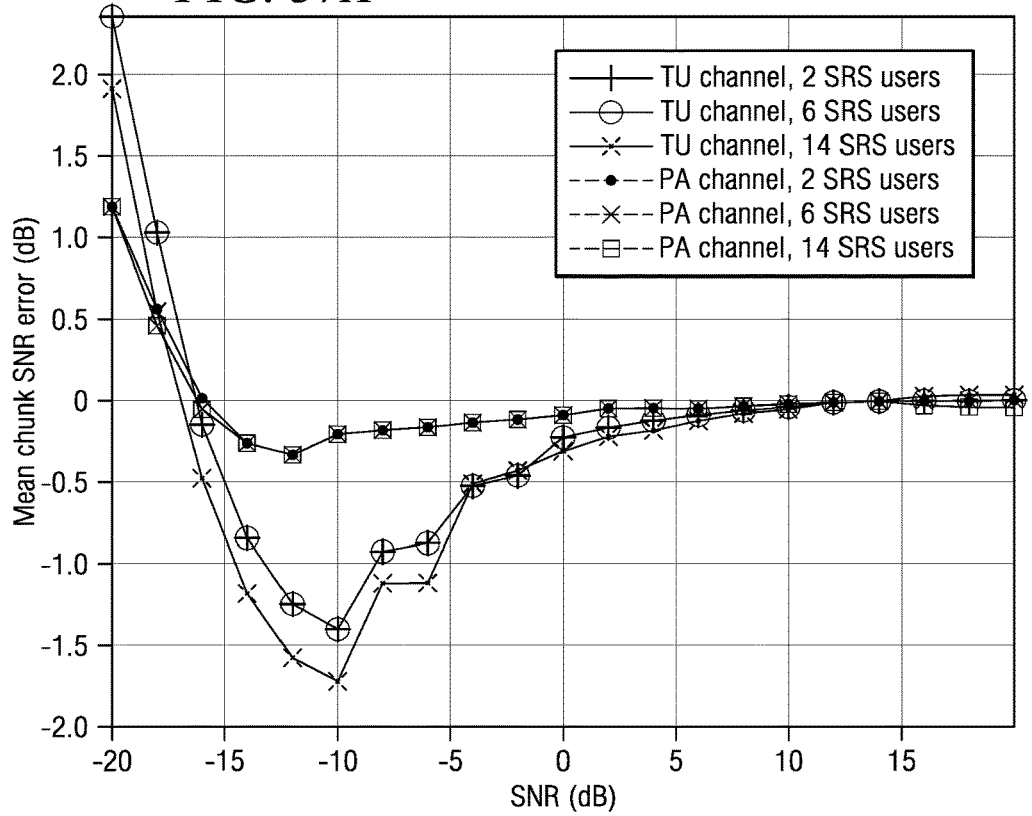
FIGS. 37A and 37B illustrate the mean chunk SNR error versus signal to noise ratio for various number of SRS users for 20-PRB SRS bandwidth (FIG. 37A) and for 6 TU channel users and 14 PA channel users (FIG. 37B)
Figure 37B:
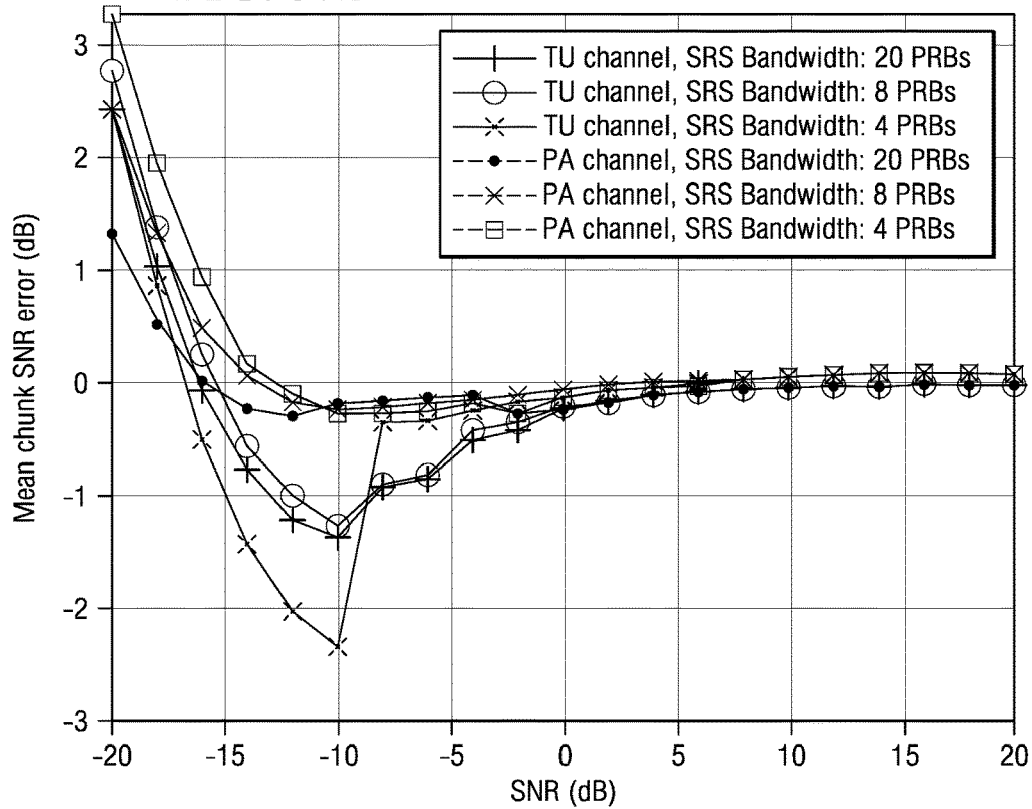
Figure 38A:
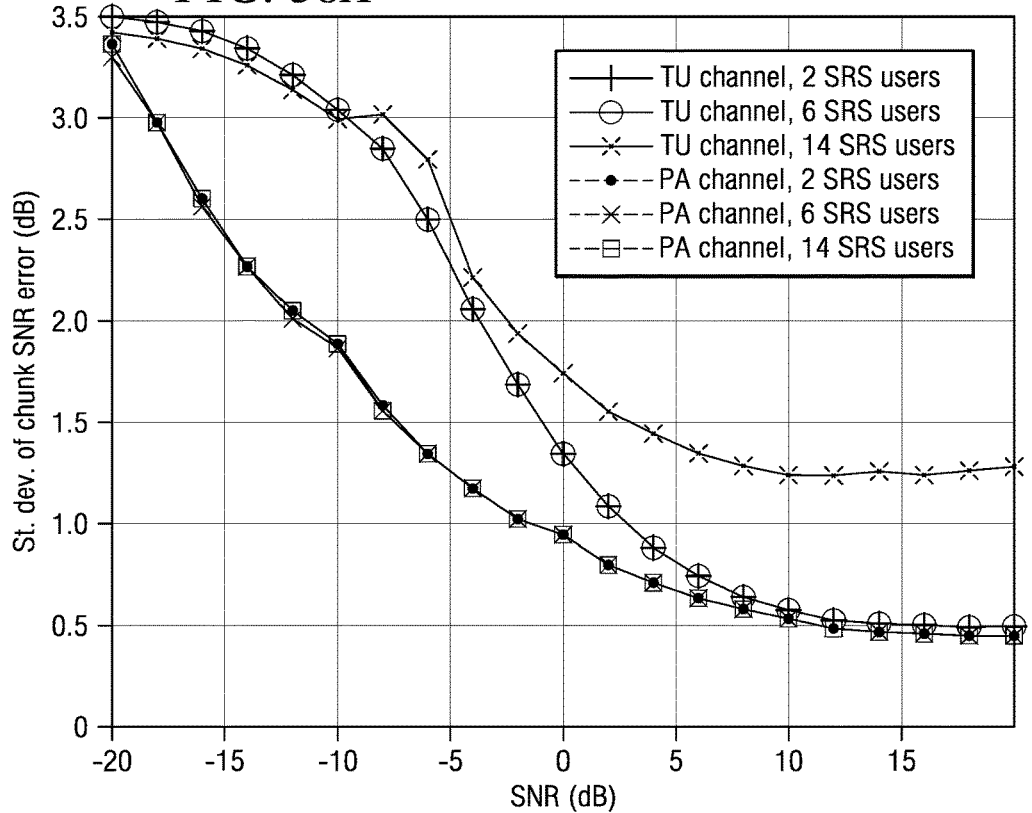
FIGS. 38A and 38B illustrate the standard deviation of the chunk SNR error versus signal to noise ratio for various number of SRS users for 20-PRB SRS bandwidth (FIG. 38A) and for 6 TU channel users and 14 PA channel users (FIG. 38B)
Figure 38B:
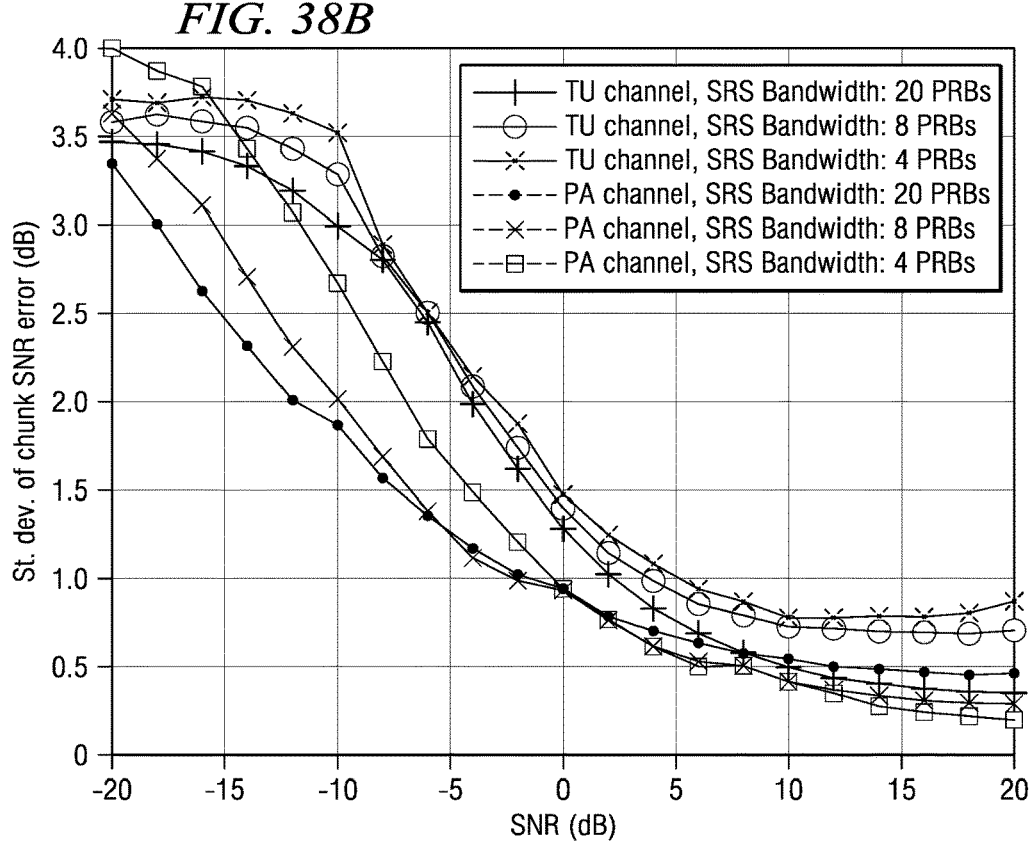

FIGS. 37 and 38 illustrate a comprehensive set of per-PRB SNR estimation performance plots for the TU channel and the PA channel when varying the number of SRS users and the SRS bandwidth. FIG. 37 illustrates the mean chunk SNR error versus signal to noise ratio for various number of SRS users for 20-PRB SRS bandwidth (FIG. 37A) and for 6 TU channel users and 14 PA channel users (FIG. 37B). FIG. 37A has six curves: TU channel and 2 SRS users; TU channel and 6 SRS users; TU channel and 14 SRS users; PA channel and 2 SRS users; PA channel and 6 SRS users; PA channel and 14 SRS users. FIG. 37B has 6 curves: TU channel with an SRS bandwidth of 20 PRBs; TU channel with an SRS bandwidth of 8 PRBs; TU channel with an SRS bandwidth of 4 PRBs; PA channel with an SRS bandwidth of 20 PRBs; PA channel with an SRS bandwidth of 8 PRBs; and PA channel with an SRS bandwidth of 4 PRBs. FIG. 38 illustrates the standard deviation of the chunk SNR error versus signal to noise ratio for various number of SRS users for 20-PRB SRS bandwidth (FIG. 38A) and for 6 TU channel users and 14 PA channel users (FIG. 38B). FIG. 38A has six curves: TU channel and 2 SRS users; TU channel and 6 SRS users; TU channel and 14 SRS users; PA channel and 2 SRS users; PA channel and 6 SRS users; PA channel and 14 SRS users. FIG. 38B has 6 curves: TU channel with an SRS bandwidth of 20 PRBs; TU channel with an SRS bandwidth of 8 PRBs; TU channel with an SRS bandwidth of 4 PRBs; PA channel with an SRS bandwidth of 20 PRBs; PA channel with an SRS bandwidth of 8 PRBs; and PA channel with an SRS bandwidth of 4 PRBs. One cyclic shift is reserved for noise variance estimation for each SRS comb. The remaining number of multiplexed users per SRS symbol is 2, 6 and 14 with 2, 4 and 8 cyclic shifts per comb respectively. From the conclusions drawn in the previous sections, the following estimators are assumed:

$\hat{\rho}_{ch-H}$ with harmonic averaging on TU channel for UEs beyond −5 dB SNR;

$\hat{\rho}_{ch-A}$ with arithmetic averaging on other UEs, and for PA channel;

Sub-carrier decimation of 3.

Timing Offset Estimation

Impact of Timing Errors

Figure 39:
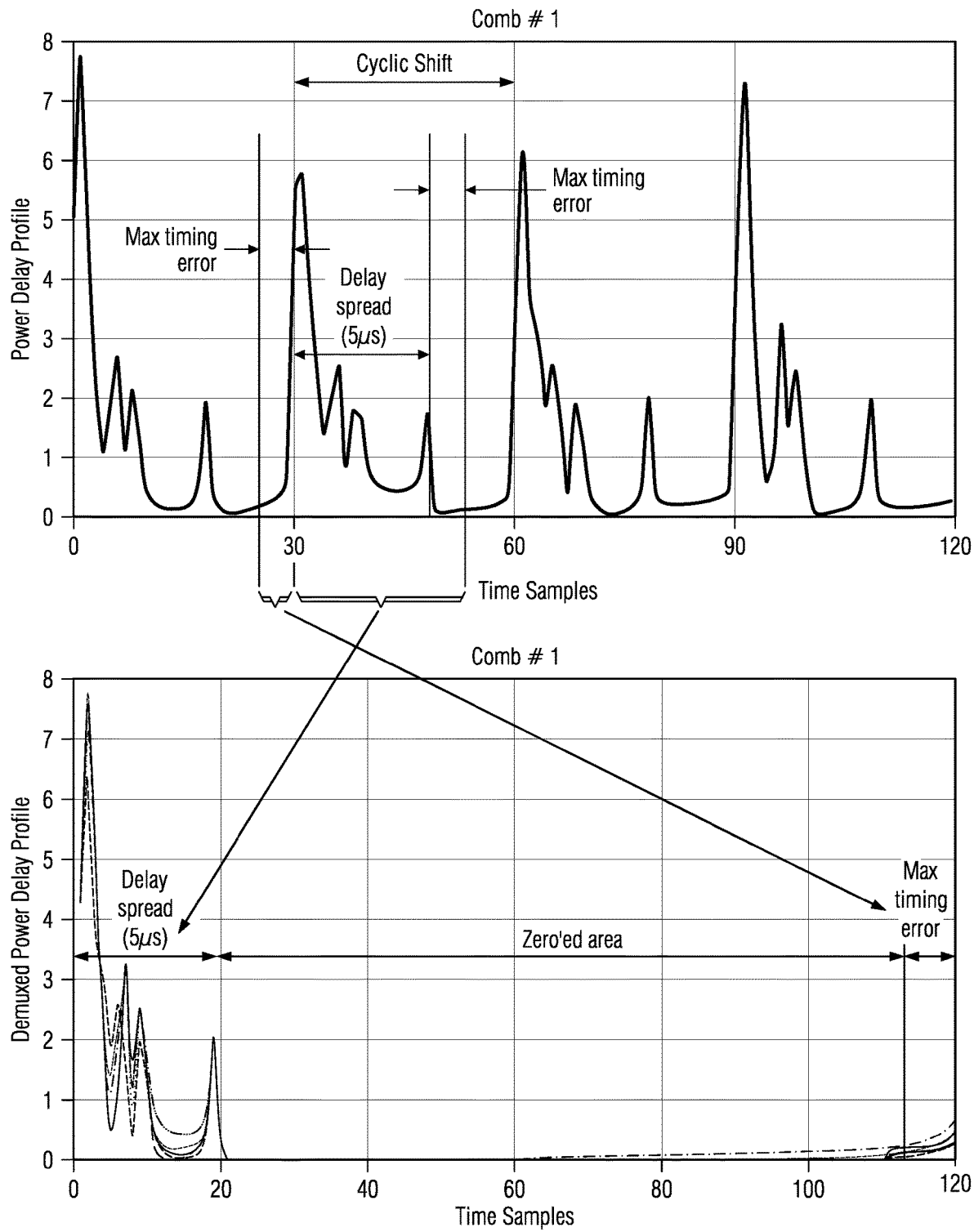
FIG. 39 illustrates that in presence of timing errors, the user cyclic shift window $n_1(u), \ldots, n_L(u)$ for the case of four cyclic-shift multiplexed UEs per SRS comb with 5 µS delay spread TU channel.
Figure 40A:
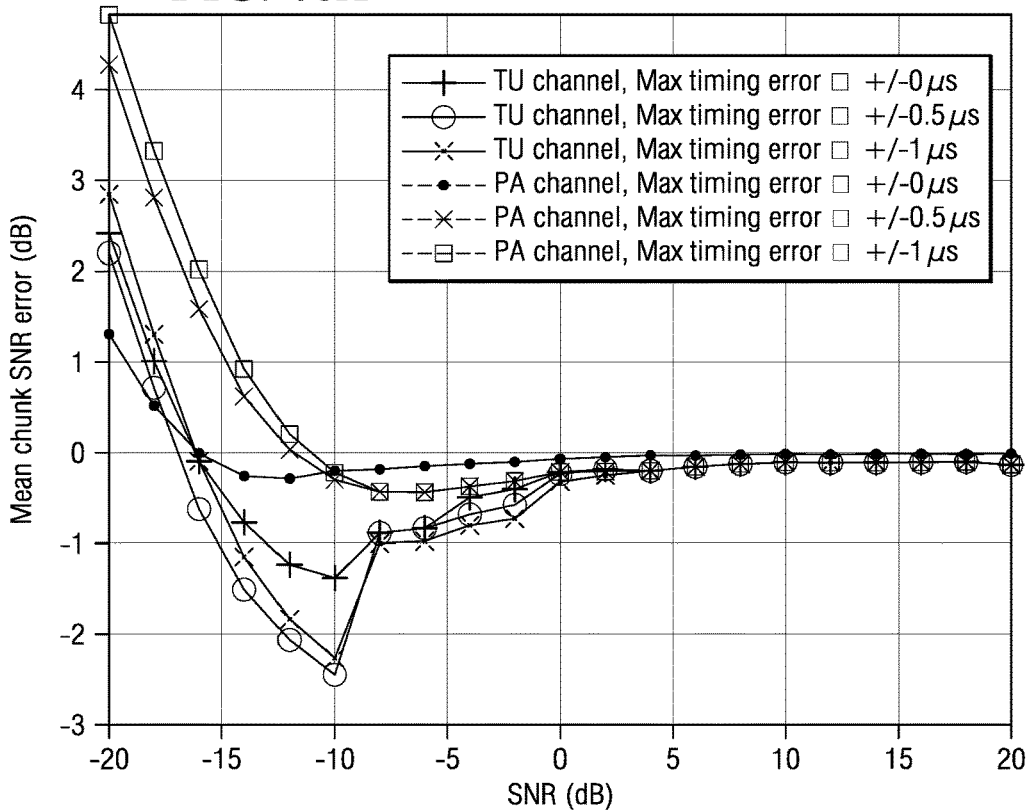
FIGS. 40A and 40B illustrate the performance degradation of the per-PRB SNR estimation with no sub-carrier decimation, in presence of timing errors, for 20-PRB SRS bandwidth and when running 6 and 14 SRS users per symbol for both the TU channel and the PA channel.
Figure 40B:
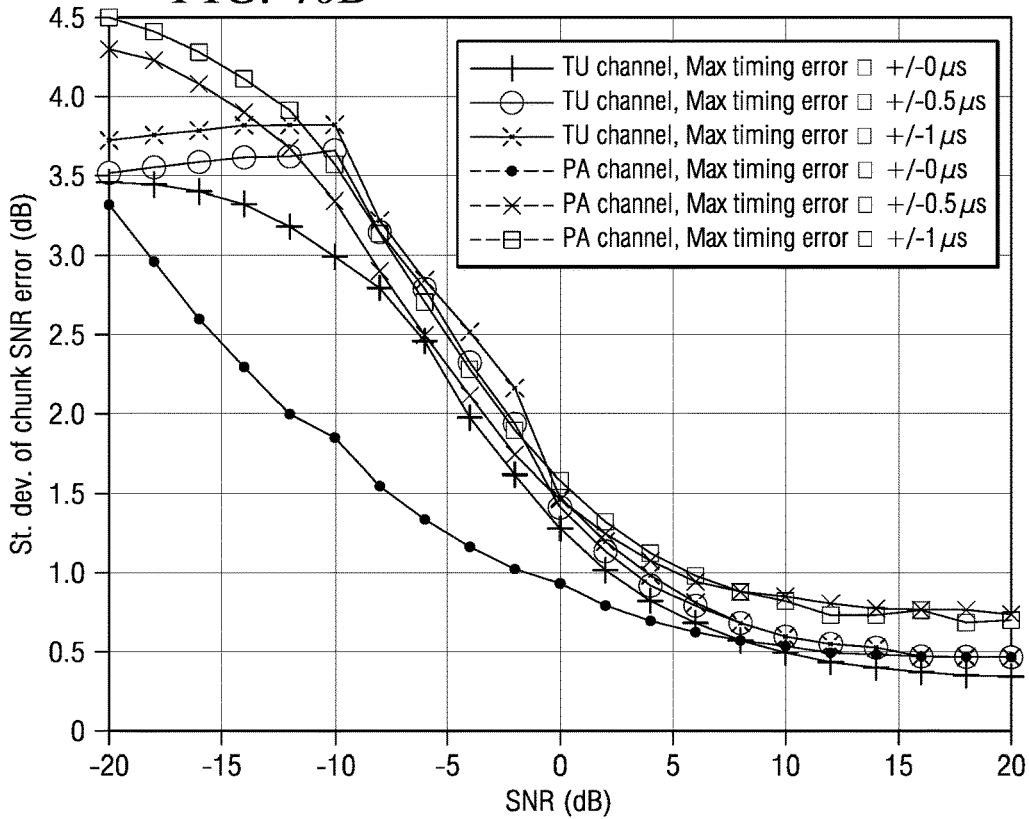

It is worth understanding first the impact of timing errors on the estimations performed on the SRS and the resulting performance loss of the per-PRB SNR estimation, involving the channel gain estimation from SRS. FIG. 39 illustrates that in presence of timing errors, the user cyclic shift window $n_1(u), \ldots, n_L(u)$ in Equation (4) and FIG. 7 must be enlarged to account for the maximum expected timing uncertainty. FIG. 39 illustrates the case of four cyclic-shift multiplexed UEs per SRS comb with 5 µS delay spread TU channel. The top part of FIG. 39 shows a plot of power delay profile versus time sample for four user windows. The bottom part of FIG. 39 shows a plot of demultipelexed power delay profile versus the same time samples. The negative time offset samples are folded back at the end of the user window. In addition, for narrow channels such as PA channel in FIG. 12, a timing uncertainty window as low as ±0.5 µS is already larger than the channel delay spread, which makes it impossible to implement cyclic shift window shrink. This is not the case of TU channel for which we still retain the noise reduction technique. FIG. 40 illustrates the performance degradation of the per-PRB SNR estimation with no sub-carrier decimation, in presence of timing errors, for 20-PRB SRS bandwidth and when running 6 and 14 SRS users per symbol for both the TU channel and the PA channel. FIG. 40A is the mean chunk SNR error. FIG. 40B is the standard deviation of the chunk SNR error. Both FIGS. 40A and 40B illustrate 6 curves: TU channel with a maximum timing error of ±0.0 µS; TU channel with a maximum timing error of ±0.5 µS; TU channel with a maximum timing error of ±1.0 µS; PA channel with a maximum timing error of ±0.0 µS; PA channel with a maximum timing error of ±0.5 µS; PA channel with a maximum timing error of ±1.0 µS. FIG. 40 illustrates that the degradation is the most severe for the PA channel, with up to 3 dB and 1.7 dB degradation at the low end SNR for the mean and standard deviation respectively. This is because the noise reduction technique based on cyclic shift window shrink must be disabled with PA channel in presence of non-compensated timing errors. For the TU channel, the noise reduction technique remains active and the performance loss due to timing errors is bounded by 1 dB and 1.5 dB for the mean and standard deviation respectively. This is restricted to a small SNR region and is mainly due to the fact that the optimized shrink amounts and SNR regions from Table 4 are not optimal after adjusting the user cyclic shift window for timing errors as shown in FIG. 39 and should be tuned again. No significant difference is observed on both channels between a timing uncertainty window of ±0.5 μS and ±1.0 μS.

Figure 41A:
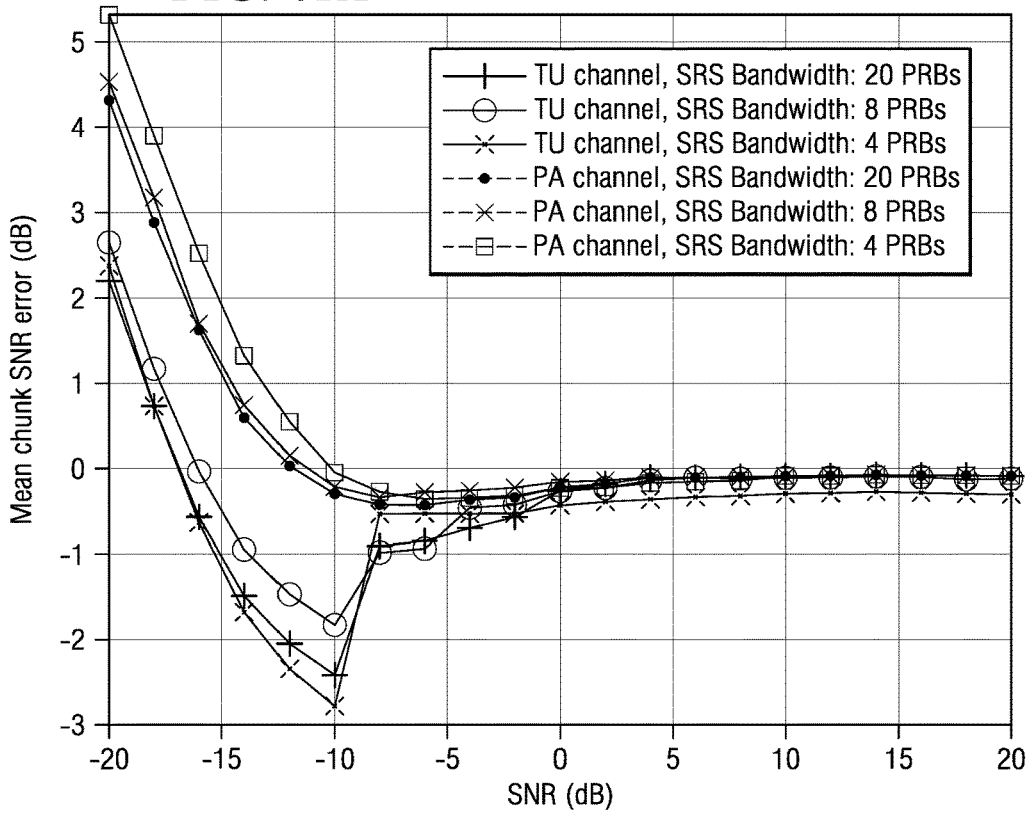
FIGS. 41A and 41B illustrate the impact of narrowing the SRS bandwidth down to 4 PRBs which further reduces the user cyclic shift window size, in presence of timing errors of ±0.5 µS.
Figure 41B:
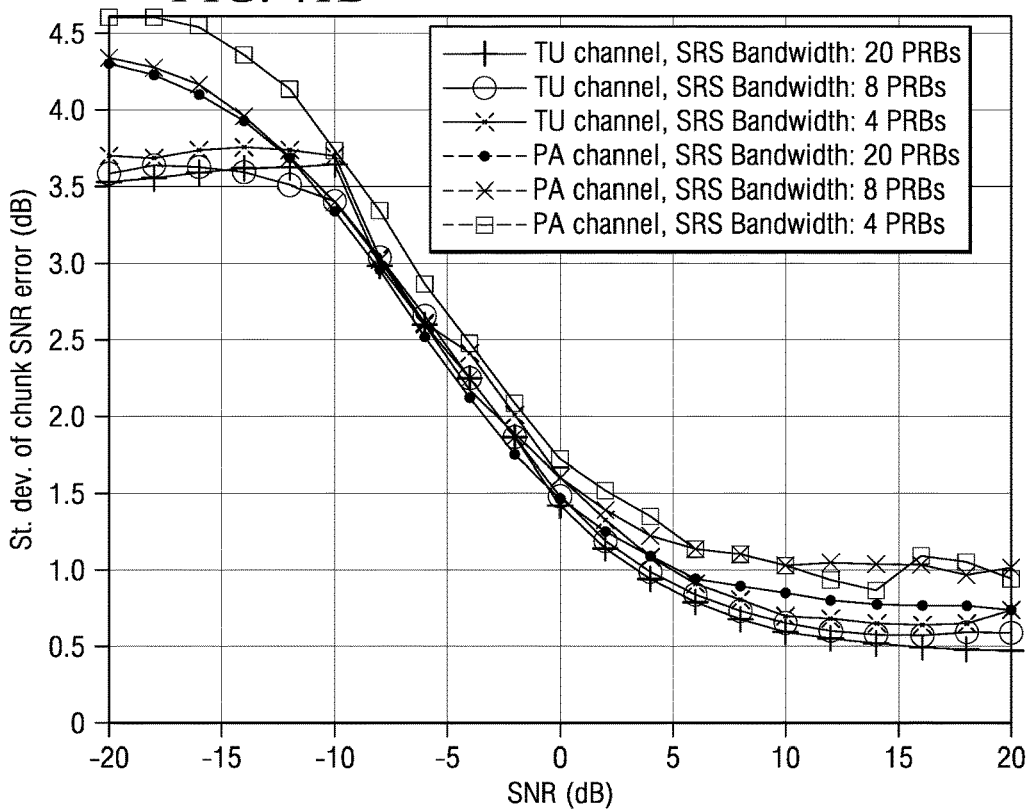

FIG. 41 illustrates the impact of narrowing the SRS bandwidth down to 4 PRBs which further reduces the user cyclic shift window size, in presence of timing errors of ±0.5 μS. FIG. 41 illustrates the mean chunk SNR error (FIG. 41A) and the standard deviation of the mean chunk SNR error (FIG. 41B) for various SRS bandwidths for both the TU channel and the PA channel. Both FIGS. 40A and 40B illustrate 6 curves: TU channel with an SRS bandwidth of 20 PRBs; TU channel with an SRS bandwidth of 8 PRBs; TU channel with an SRS bandwidth of 4 PRBs; PA channel with an SRS bandwidth of 20 PRBs; PA channel with an SRS bandwidth of 8 PRBs; and PA channel with an SRS bandwidth of 4 PRBs. In the worst-case an additional 0.5 dB loss can be seen in FIG. 41.

Timing Offset Estimation

Figure 42:
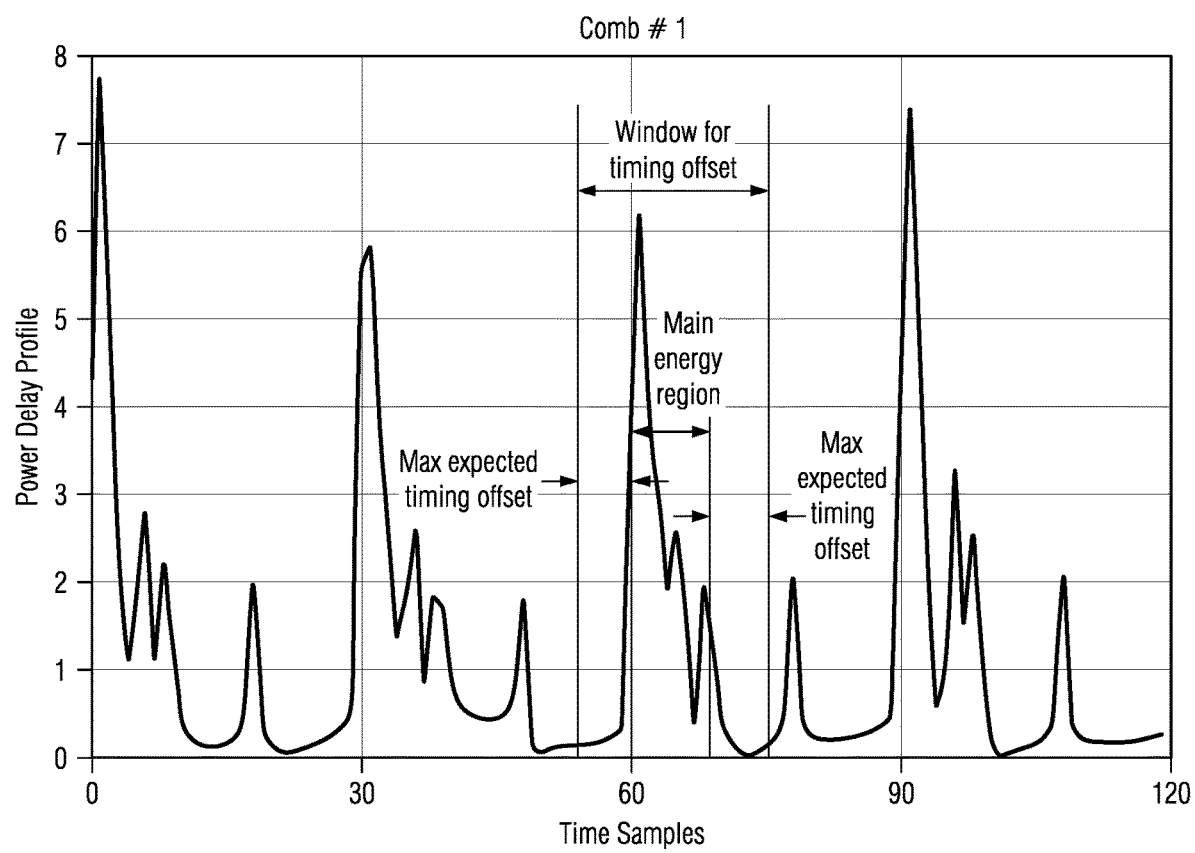
FIG. 42 show a plot of power delay profile versus time samples.

One additional benefit of the time-domain based channel estimation is that it allows implementing a simple timing offset estimator from the concatenated delay profiles sequence y by combining the amplitude delay profiles across antennas and searching for the highest peak in the user's timing offset window:

$$\begin{cases} \hat{i}_u = \operatorname*{argmax}_i \{p_i\}; \ i \in I_{\tau,u}; \ p_i = \sum_{a=1}^{A} |y_{i,a}|^2 \\ \hat{\tau}_u = (\hat{i}_u - C_u)T_S \end{cases} \quad (35)$$

where: A is the number of antenna; $C_u$ is the cyclic shift of user u; $T_s$ is the sampling period of sequence y; and $I_{\tau,u}$ is the timing offset window of user u, defined as:

$$\begin{cases} I_{\tau,u} = \{-N_{early}, \ldots, -1, 0, 1, \ldots, N_{late}\} \\ N_{early} = \lceil \max(0.5 \ \mu s, \tau_{max})/T_S \rceil \\ N_{late} = \lceil [W_M + \max(0.5 \ \mu s, \tau_{max})]/T_S \rceil \\ W_M = \min(1 \ \mu s, \tau) \end{cases} \quad (36)$$

where: $I_{\tau,u}(N_{early}+1)=0$ coincides with the first sample of the cyclic shift window of user u; $±\tau_{max}$ is the maximum expected timing error; $W_M$ is the main energy region within the user delay spread; and τ is the delay spread of the user. FIG. 42 illustrates this design principle of a user's timing offset window. FIG. 42 show a plot of power delay profile versus time samples. The main energy region is enlarged on both sides by the maximum expected timing offset. For the TU channel, the main energy region is the first 1 μS of the user's cyclic shift window. For the PA channel, the main energy region is the delay spread of the channel which is 0.9 μS.

Figure 43A:
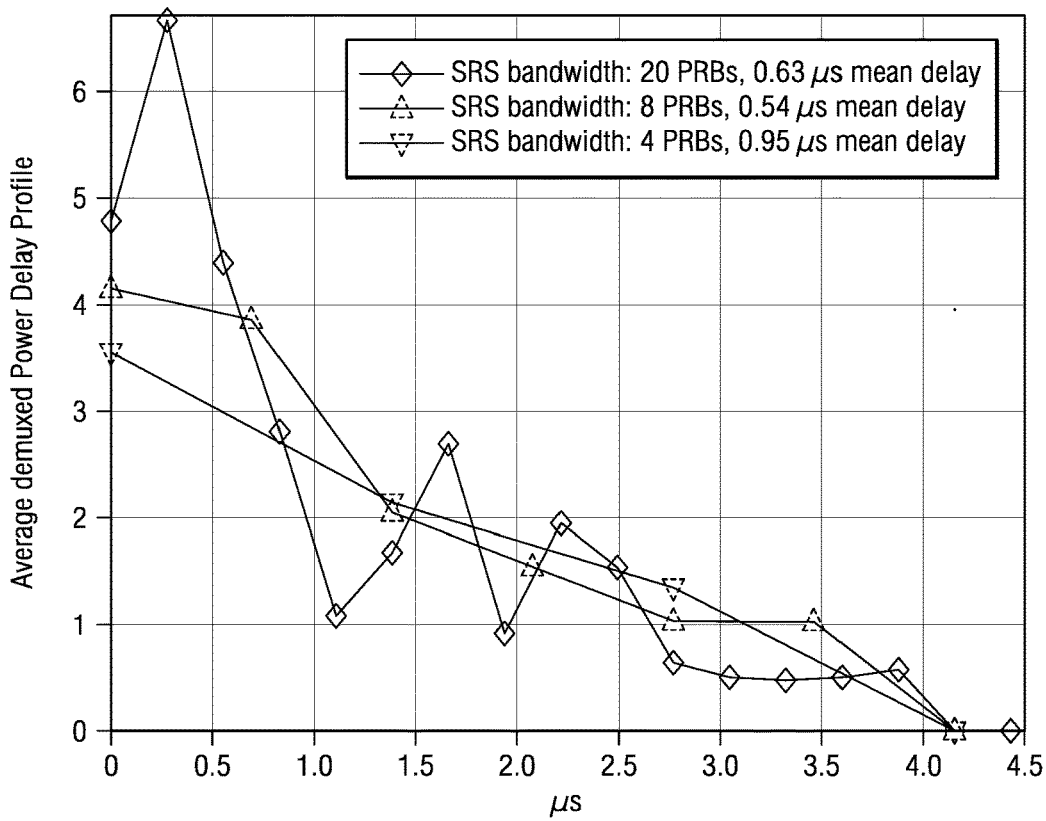
FIGS. 43A and 43B are the average demultiplexed power delay profile for the TU channel (FIG. 43A) and the PA channel (FIG. 43B) versus delay for various SRS bandwidths.
Figure 43B:
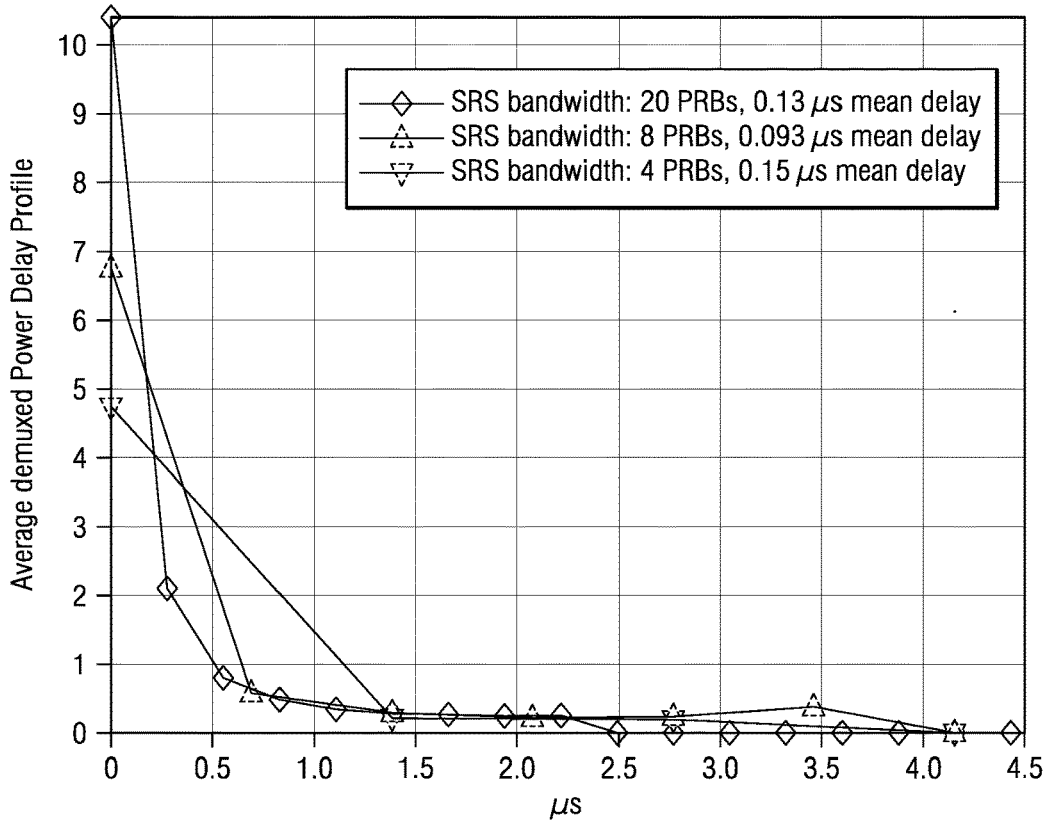

FIG. 43 is the power delay profiles (PDP) of both TU and PA channels as they would appear sampled after the IDFT and the cyclic shift demultiplex in the absence of noise, for 20, 8 and 4 PRBs SRS bandwidths. FIG. 43 is the average demultiplexed power delay profile for the TU channel (FIG. 43A) and the PA channel (FIG. 43B) versus delay for various SRS bandwidths. FIG. 43A includes three curves: a SRS bandwidth of 20 PRBs resulting in a 0.63 μS mean delay; a SRS bandwidth of 8 PRBs resulting in 0.54 μS mean delay; and a SRS bandwidth of 4 PRBs resulting in 0.95 μS mean delay. FIG. 43B includes three curves: a SRS bandwidth of 20 PRBs resulting in a 0.13 μS mean delay; a SRS bandwidth of 8 PRBs resulting in a 0.093 μS mean delay; and a SRS bandwidth of 4 PRBs resulting in a 0.15 μS mean delay. FIG. 43 illustrates that the narrower the SRS bandwidth, the coarser the power delay profile sampling. This affects the resulting mean delay, as measured from these samples.

Figure 44A:
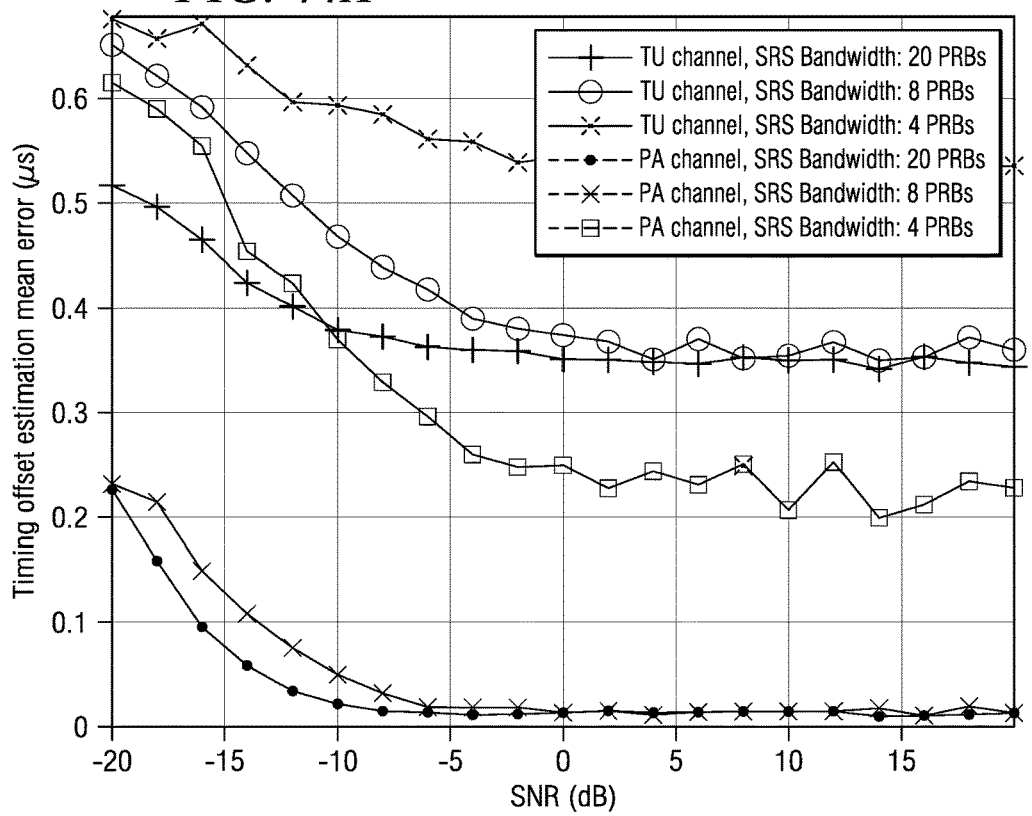
FIGS. 44A and 44B plot the timing estimation mean and standard deviation errors of the described algorithm for both the TU channel and the PA channel when varying the SRS bandwidth.
Figure 44B:
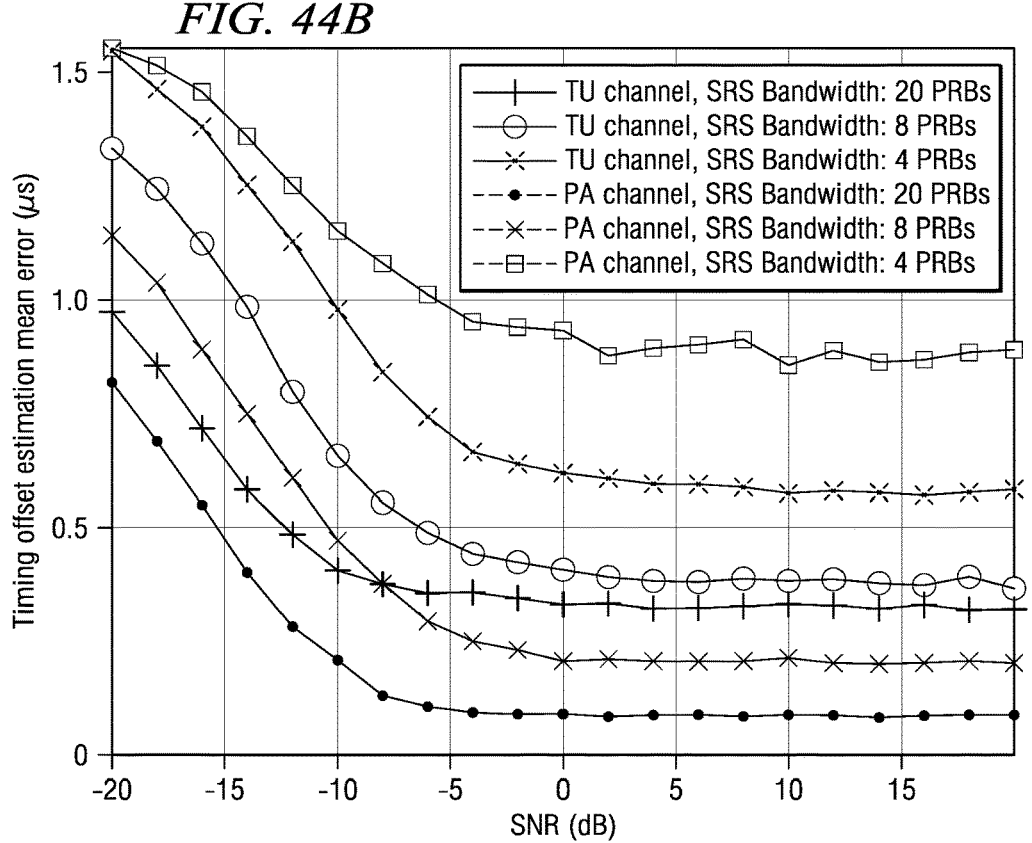
Figure 45A:
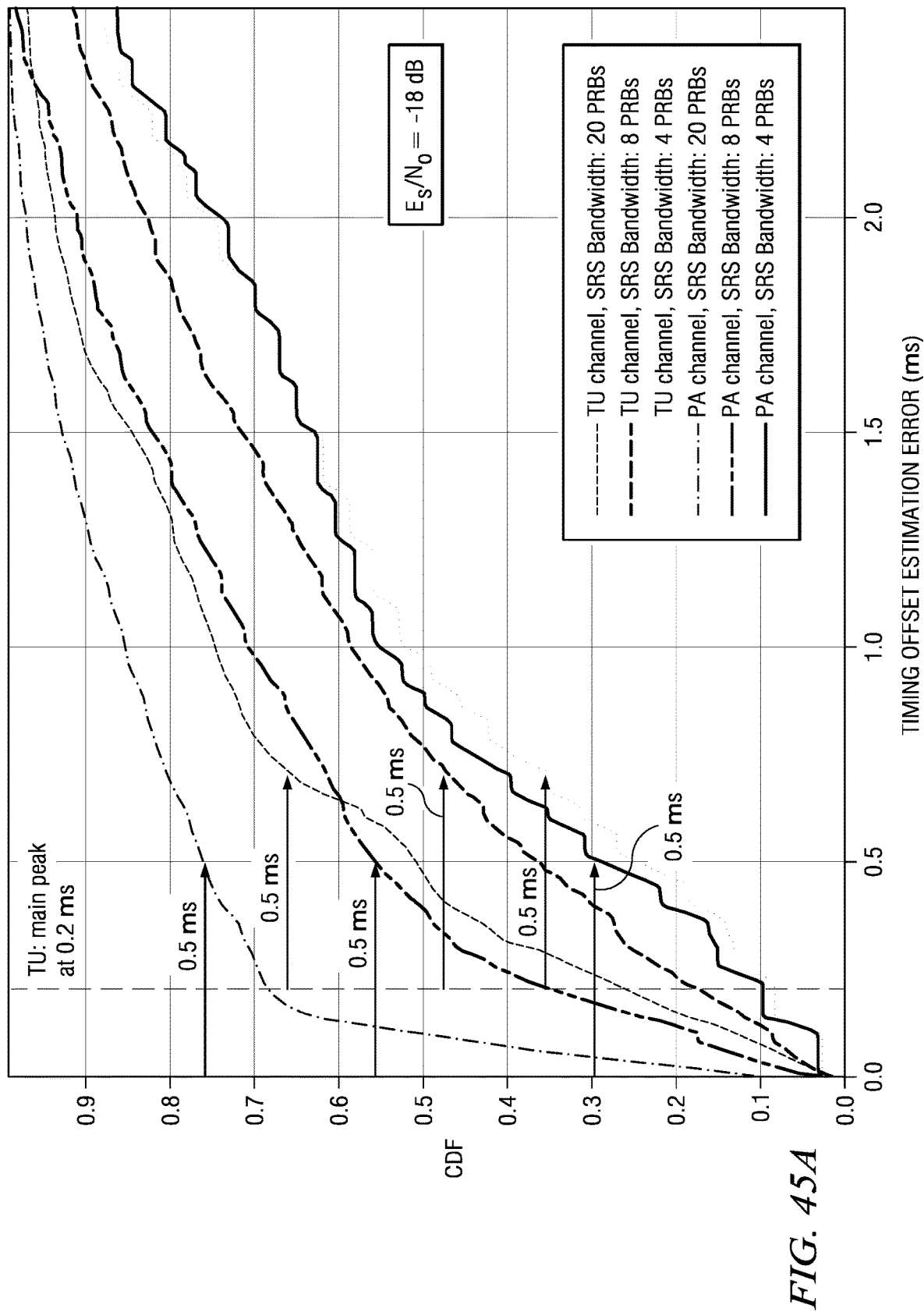
FIGS. 45A through 45D respectively plot the CDF of the timing estimation error from the described algorithm for both TU and PA channels at −18, −12, −6 and 0 dB $E_s/N_0$, when varying the SRS bandwidth.
Figure 45B:
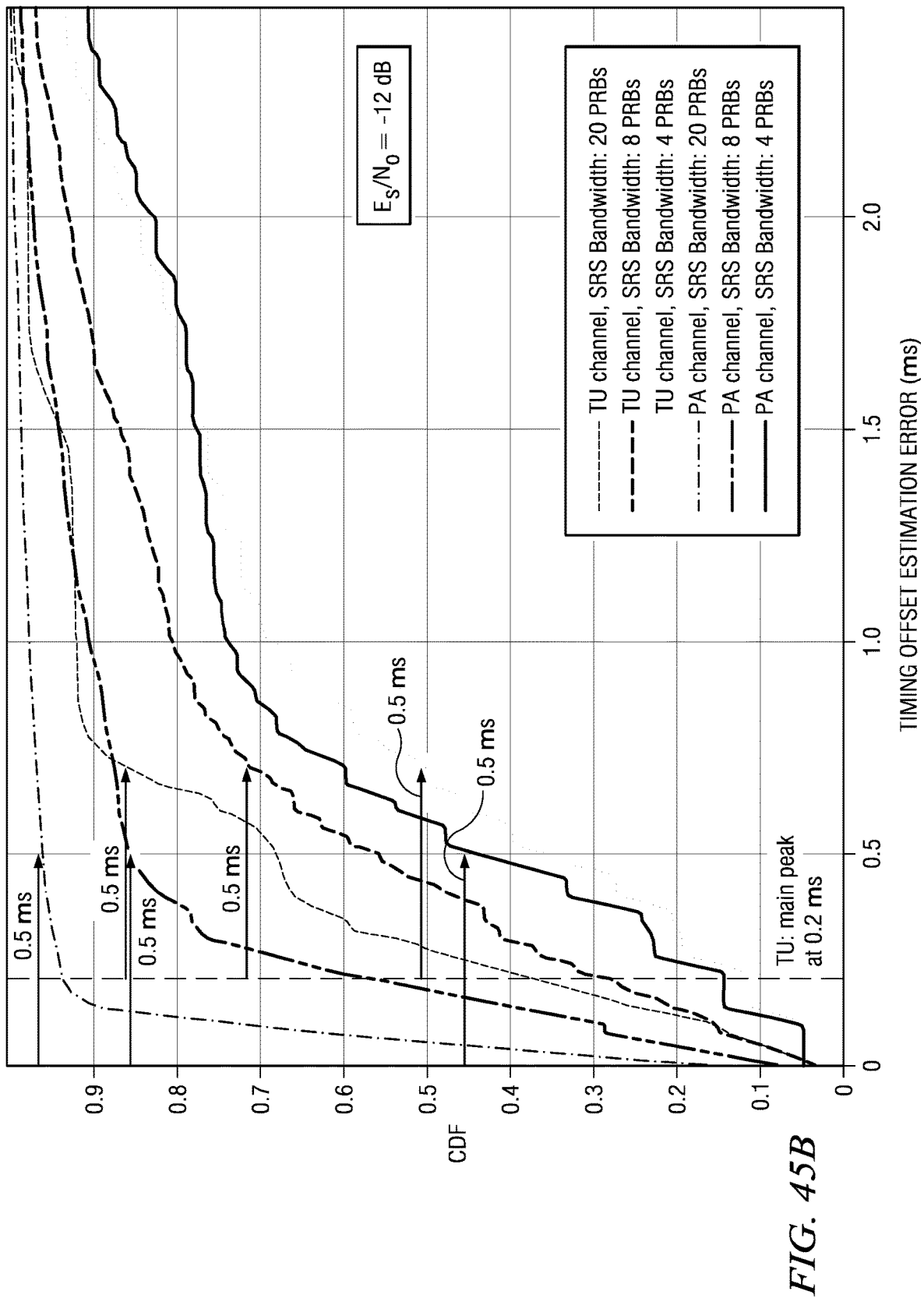
Figure 45C:
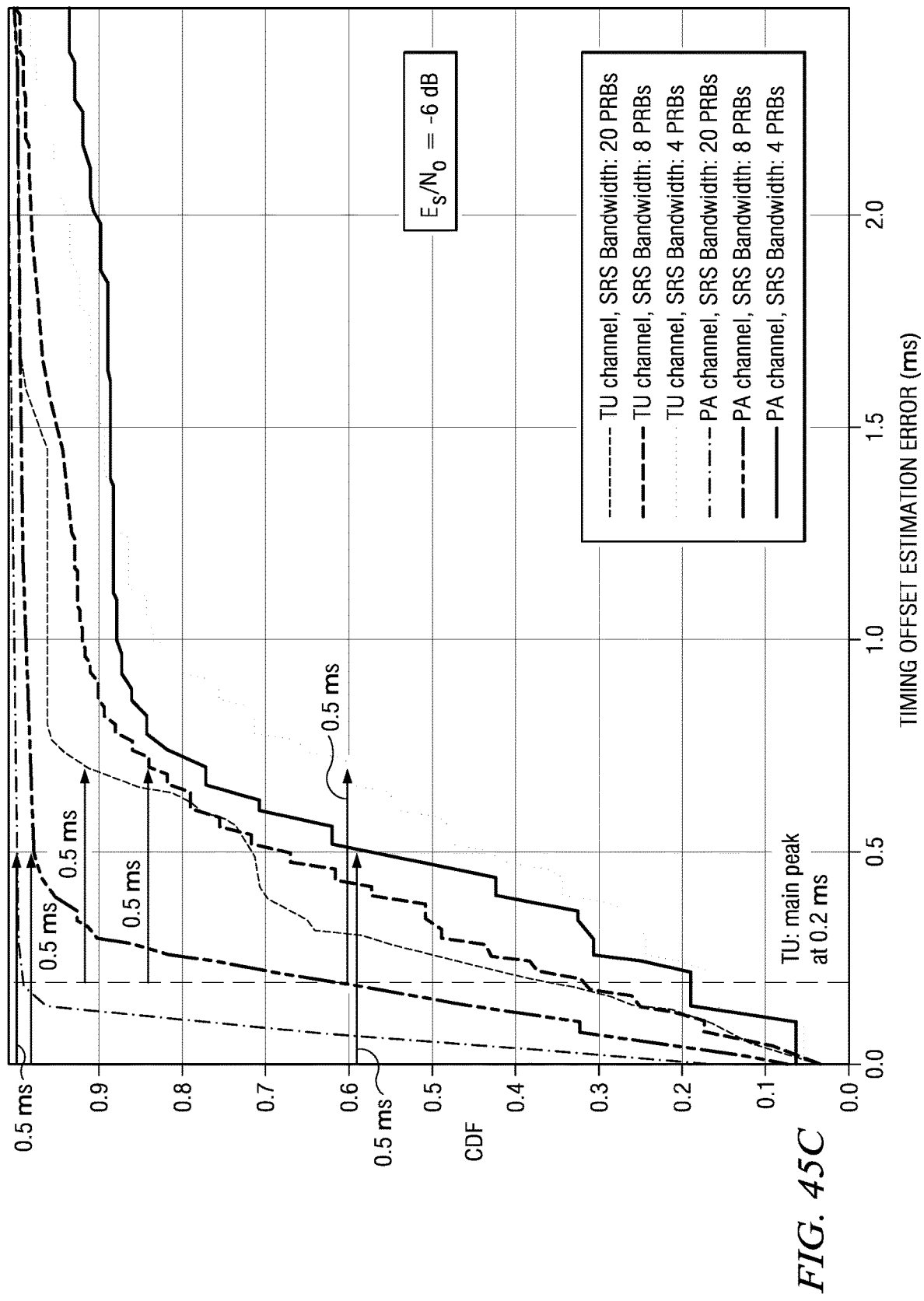
Figure 45D:
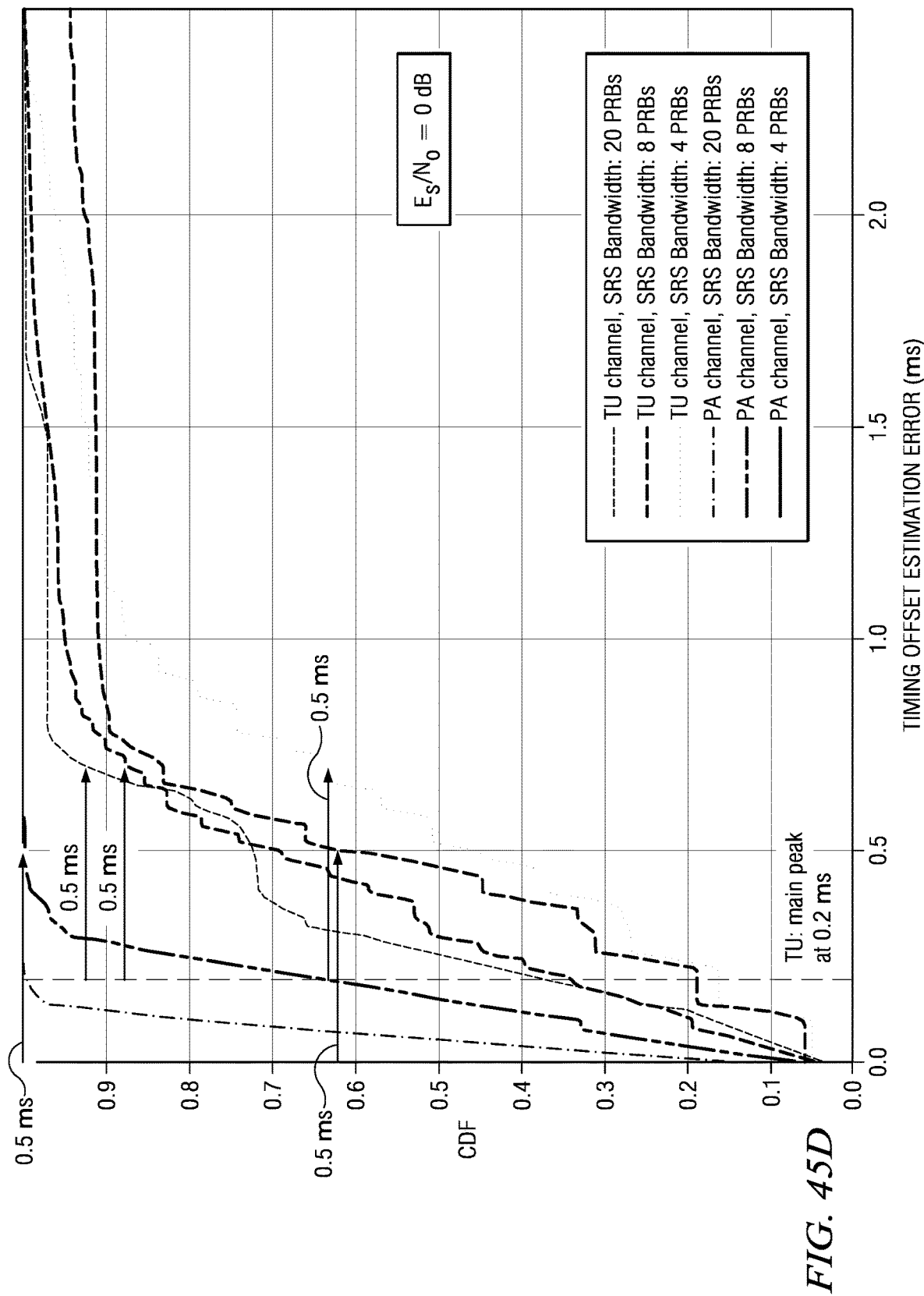

FIG. 44 plots the timing estimation mean and standard deviation errors of the described algorithm for both the TU channel and the PA channel when varying the SRS bandwidth. The timing uncertainty of the SRS users is within ±1 μS. FIG. 44A shows the timing offset mean versus signal to noise ration. FIG. 44B shows the timing offset standard deviation versus signal to noise ratio. Each of FIGS. 44A and 44B show six curves: TU channel with an SRS bandwidth of 20 PRBs; TU channel with an SRS bandwidth of 8 PRBs; TU channel with an SRS bandwidth of 4 PRBs; PA channel with an SRS bandwidth of 20 PRBs; PA channel with an SRS bandwidth of 8 PRBs; and PA channel with an SRS bandwidth of 4 PRBs. Six and 14 SRS users are multiplexed per symbol with the TU channel and the PA channel, assuming the reserved cyclic shift per comb for noise estimation. FIG. 44 shows for 20 and 8-PRB SRS bandwidths, the timing estimation mean converges as SNR increases to 0 and 0.35 μs for the PA channel and the TU channel respectively. In the latter case, this corresponds to the average delay of the TU channel in the main energy region, so that the estimator can be considered non-biased in the SNR region greater than or equal to −5 dB. Similarly, the standard deviation performance remains steady and below 0.5 μS in the same SNR region and for the same bandwidth configurations. With a 4-PRB SRS bandwidth, both mean and standard deviation performances are deteriorated due to the resulting coarse granularity of the PDP sampling. The effect of adjacent users' spill-over on the timing offset window generates false alarms resulting in wrong timing estimations irrespective of the SNR value. As a result, the following conclusions can be drawn:

The proposed low-complexity timing offset estimation algorithm is non-biased and shows quite steady performance in the SNR region where SNR is greater than or equal to −5 dB.

For SNRs below −5 dB, it is recommended to cumulate the PDPs of subsequent SRSs to achieve the steady state performance of the above SNR region.

The larger the SRS bandwidth, the better the estimation accuracy (standard deviation).

Tracking timing offsets as large as ±1 μS is impractical with SRS bandwidth as small as 4 PRBs.

FIG. 45 plots the CDF of the timing estimation error from the described algorithm for both TU and PA channels at −18, −12, −6 and 0 dB $E_s/N_0$, when varying the SRS bandwidth. From these curves, we extracted the % of timing offset estimates within 0.5 μS of the main peak. This is reported in Table 6. The above conclusions are further confirmed and it can be measured that in the steady SNR region (SNR greater than or equal to −5 dB) and for 20-PRB and 8-PRB SRS bandwidth, ~85% and close to 100% of timing offsets estimates are within 0.5 μS of the main peak for the TU channel and the PA channel.

TABLE 6

| SRS | −18 dB | | −12 dB | | −6 dB | | 0 dB | |
|---|---|---|---|---|---|---|---|---|
| BW | TU | PA | TU | PA | TU | PA | TU | PA |
| 20 PRBs | 66% | 76% | 87% | 97% | 92% | 100% | 93% | 100% |
| 8 PRBs | 48% | 56% | 72% | 86% | 84% | 98% | 88% | 100% |
| 4 PRBs | 35% | 30% | 51% | 46% | 60% | 59% | 63% | 62% |

This patent application describes in details the design choices for the LTE SRS channel, channel gain, noise variance and timing offset estimators, from theoretical derivations and performance evaluations. In particular, the proposed time-domain based channel estimation with group-UE cyclic shift de-multiplexing is a low-complexity approach that retains the inherent noise reduction performance on channel estimates while allowing sharing the same upfront computation for users' channels, timing offset estimations and noise variance estimation. The unbiased channel gain estimation requires estimating and removing the noise variance by means of one reserved cyclic shift per SRS comb. Different noise removal techniques with negative gain avoidance are assessed. Applying a simple clipping threshold of 0.01 provides the best performance compromise across configurations. Further noise reduction techniques are investigated showing that geometry-based selective cyclic shift window reduction outperforms other approaches such as LMS filtering. Different techniques to derive per-PRB SNR from the achieved per-antenna per-subcarrier channel gain estimates are evaluated and it is shown that low-complexity arithmetic averaging can be used on PA channel but should be restricted to very low SNR (less than −5 dB) on TU channel above which harmonic averaging is mandated. An SRS sub-carrier decimation factor per comb of up to 3 allows reducing the complexity in the harmonic averaging computation without noticeable performance degradation. Comprehensive channel gain and SNR performance results obtained from realistic multi-user link-level simulations over a wide SNR range are presented and can be used for further reference in system simulations to model the measurement errors from SRS. Reviewing the impact of timing errors on the above SNR estimator, a simple timing offset estimator is proposed providing for SNR greater than or equal to −5 dB and SRS bandwidths greater than or equal to 8 PRBs as more than 85% of timing offsets estimates within 0.5 μS of the main peak of the channel. Lower SNRs would need cumulating the Power Delay Profiles of subsequent SRSs to achieve the steady state performance of the above SNR region, and with 4-PRB SRS bandwidth, timing offset estimation should be employed with smaller than ±1 μS timing uncertainty to avoid erroneous estimates due to adjacent cyclic shift users' spill-over.

Figure 46:
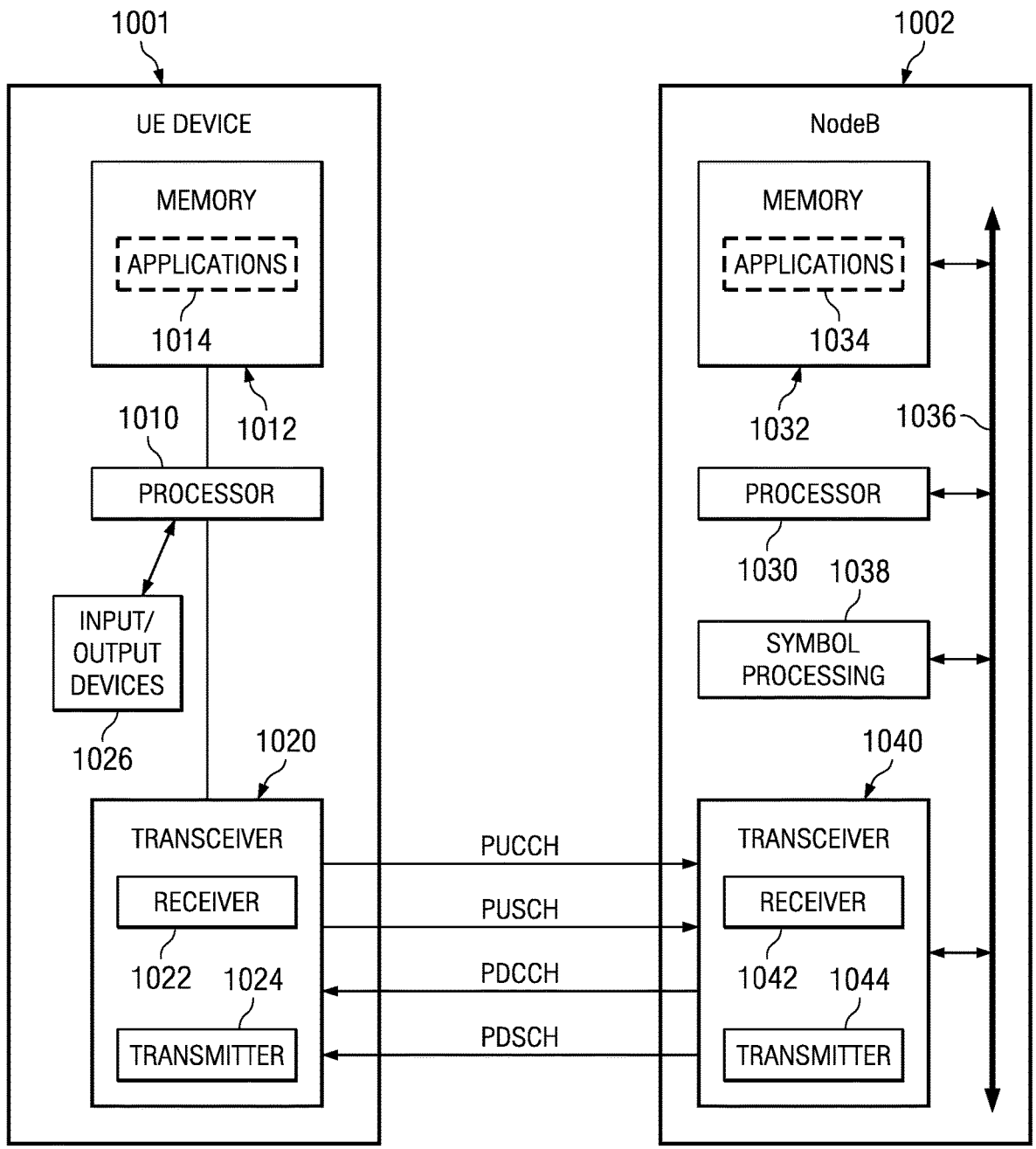
FIG. 46 is a block diagram illustrating internal details of a base station and a mobile user equipment in the network system of FIG. 1 suitable for implementing this invention.

FIG. 46 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a sounding reference signal from a UE 1001. The sounding reference signal is processed by receiver 1042 to estimate channel state, channel gain, noise power and timing error of UE 1001 according to the present invention. In this embodiment, the channel state, channel gain, noise power and timing error calculation is embodied by executing instructions stored in memory 1032 by processor 1030. In other embodiments, the channel state, channel gain, noise power and timing error calculation may be embodied by a separate processor/memory unit, by a hardwired state machine, or by other types of control logic, for example. In response to receiving the sounding reference signal, eNB 1002 may schedule an appropriate set of resources and notifies UE 1001 with a resource grant as well as a timing advance command.

What is claimed is:

1. A wireless communication receiver comprising:
    a serial to parallel converter receiving a radio frequency signal and generating N corresponding serial signals;
    a Fourier transform device connected to said serial to parallel converter receiving said N corresponding serial signals and converting said N corresponding serial signals from a time domain into a frequency domain;
    a EZC root sequence unit generating a set of root sequence signals;
    an element-by-element multiply unit connected to said Fourier transform device and said EZC root sequence unit, said element-by-element multiply unit forming a set of products including a product of each of said frequency domain signals from said Fourier transform device and a corresponding root sequence signal;
    an $N_{SRS}$-length IDFT unit connected to said element-by-element multiply unit performing a group cyclic-shift de-multiplexing of said products employing a sounding reference symbol Orthogonal Frequency Division Multiplexing Orthogonal Frequency Division Multiple Access symbol structure and a Constant Amplitude Zero Auto-Correlation sequence to compute an impulse response for each multiplexed channel through a frequency-domain computed periodic correlation; and
    a discrete Fourier transform unit connected to said IDFT unit and receiving cyclic shift de-multiplexing signals to convert them back to frequency-domain.

2. The wireless communication receiver of claim 1, wherein:
    said group cyclic shift de-multiplexing performed by said discrete Fourier transform unit includes:

$$Y = F_{N_{SRS}N} r$$
$$y = F_{N_{SRS}}^{-1} \text{diag}(X^* Y^T)$$

where: $F_{N_{SRS}N}$ is a $N_{SRS}$ by N matrix corresponding to an N-point Fourier transform and $N_{SRS}$ sub-carriers de-mapping; and $F_{N_{SRS}}$ is a $N_{SRS}$ by $N_{SRS}$ matrix, thereby producing for each SRS comb a concatenated Channel Impulse Response sequence y of all wireless communication receives multiplexed on a same root sequence.

3. The wireless communication receiver of claim 1, wherein:
    said group cyclic shift de-multiplexing performed by said discrete Fourier transform unit includes:

$$y_u = (0, \ldots, 0, y_{n_1(u)}, y_{n_2(u)}, \ldots, y_{n_L(u)}, 0, \ldots, 0)^T$$
$$\hat{H}_u = F_{N_{SRS}} y_u$$

where: $F_{N_{SRS}}$ is a $N_{SRS}$ by $N_{SRS}$ matrixes corresponding to $N_{SRS}$-point DFT; and $n_1(u), \ldots, n_L(u)$ are the samples defining the cyclic shift window of user u, involving zeroing-out y samples outside the cyclic shift window of user u and last stage $N_{SRS}$-length DFT-based frequency interpolation.

4. The wireless communication receiver of claim 1, wherein:
    said group cyclic shift de-multiplexing performed by said discrete Fourier transform unit includes performing Channel Impulse Response extraction and cyclic shift de-multiplexing simultaneously by selecting the appropriate user's cyclic shift window.

5. The wireless communication receiver of claim 4, wherein:
    selecting a cyclic shift window includes shrinking a SRS bandwidth by 10% to minimize the interpolation errors.

6. The wireless communication receiver of claim 1, further comprising:
    a non-biased per-antenna per-sub-carrier channel gain estimator performing $$\hat{G}_0(a) = |\hat{H}(a)|^2 - \hat{\sigma}_N^2$$

where: $\hat{\sigma}_N^2$ is an estimate of a noise variance $\sigma_N^2 = a^2 \sigma_H^2$, involving estimating and removing the noise variance.

7. The wireless communication receiver of claim 4, wherein:
    removing the noise variance includes a negative gain avoidance by applying a simple clipping threshold of 0.01 according to $$\hat{G}_{Clip}(a) = \max\{|\hat{H}(a)|^2 - \hat{\sigma}_N^2; G_{floor}\}.$$

8. The wireless communication receiver of claim 1, further comprising:
    a per-antenna time domain noise variance estimator reserving a cyclic shift per SRS comb and averaging squared noise samples across a noise window selected from the samples outside the cyclic shift windows of one or more users.

9. The wireless communication receiver of claim 8, wherein:
said per-antenna time domain noise variance estimator maximizes the number of noise samples while not including samples carrying adjacent users' energy in spill-over regions.

10. The wireless communication receiver of claim 8, wherein:
said per-antenna time domain noise variance estimator maximizes a UE-geometry-based selective cyclic shift window reduction as:

| NOISE REDUCTION TECHNIQUE | LMS FILTERING | | CYCLIC SHIFT WINDOW SHRINK | |
|---|---|---|---|---|
| Channel Model | TU | PA | TU | PA |
| Channel estimation MSE | 3 dB | 3 dB | 6 dB | 6 dB |
| Channel gain mean error | 2 dB | 1.2 dB | 2.1 dB | 2.5 dB |
| Channel gain standard deviation | 1 dB | 0.5 dB | 1 dB | 1.2 dB. |

11. The wireless communication receiver of claim 1, further comprising:
a per-chunk signal to noise ratio (SNR) estimator from the achieved per-antenna per-subcarrier channel gain estimates based on selectively using a selected one of low-complexity arithmetic averaging or harmonic averaging depending on both the channel type and the UE's SNR.

12. The wireless communication receiver of claim 1, further comprising:
a timing offset estimator combining amplitude delay profiles across antennas from concatenated delay profiles sequence y and searching for a highest peak in the user's timing offset window according to:

$$\begin{cases} \hat{i}_u = \underset{i}{\mathrm{argmax}}\{p_i\}; i \in I_{\tau,u}; p_i = \sum_{a=1}^{A} |y_{i,a}|^2 \\ \hat{\tau}_u = (\hat{i}_u - C_u)T_S \end{cases}$$

where: A is the number of antenna; $C_u$ is the cyclic shift of user u; $T_S$ is the sampling period of sequence y; and $I_{\tau,u}$ is the timing offset window of user u, defined as:

$$\begin{cases} I_{\tau,u} = \{-N_{early}, \ldots, -1, 0, 1, \ldots, N_{late}\} \\ N_{early} = \lceil \max(0.5\mu s, \tau_{max})/T_S \rceil \\ N_{late} = \lceil [W_M + \max(0.5\mu s, \tau_{max})]/T_S \rceil \\ W_M = \min(1\mu s, \tau) \end{cases}$$

where: $I_{\tau,u}(N_{early}+1)=0$ coincides with the first sample of the cyclic shift window of user u; $\pm\tau_{max}$ is the maximum expected timing error; $W_M$ is the main energy region within the user delay spread; and $\tau$ is the delay spread of the user.

* * * * *